(12) United States Patent
Liposky

(10) Patent No.: US 9,502,866 B1
(45) Date of Patent: Nov. 22, 2016

(54) CONFIGURABLE MODULAR POWER CONTROL SYSTEM

(71) Applicant: Lex Products Corporation, Shelton, CT (US)

(72) Inventor: Joshua Liposky, Seymour, CT (US)

( * ) Notice: Subject to any disclaimer, the term of this patent is extended or adjusted under 35 U.S.C. 154(b) by 0 days.

(21) Appl. No.: 14/541,615

(22) Filed: Nov. 14, 2014

Related U.S. Application Data

(63) Continuation-in-part of application No. 14/057,430, filed on Oct. 18, 2013, now Pat. No. 9,172,220.

(60) Provisional application No. 62/079,620, filed on Nov. 14, 2014, provisional application No. 61/715,358, filed on Oct. 18, 2012.

(51) Int. Cl.
*H02B 1/48* (2006.01)
*H02B 1/56* (2006.01)
*H02B 1/20* (2006.01)
*H02B 1/36* (2006.01)

(52) U.S. Cl.
CPC ........... *H02B 1/48* (2013.01); *H02B 1/20* (2013.01); *H02B 1/56* (2013.01)

(58) Field of Classification Search
CPC .... H05K 7/20; H05K 7/1432; H05K 7/1457; H05K 7/20572; H05K 5/00; H02M 7/003; H02B 1/565; H02B 1/04; G06F 1/16; G06F 1/20
USPC ....... 361/601, 605, 611, 614, 622, 624, 627, 361/641, 644, 631, 657, 679.46–679.5, 361/690–695, 715, 728, 730, 87, 93.1, 93.9, 361/103; 165/104.33, 185, 121–126; 363/161, 144; 174/17 R, 17 VA, 17 CT, 174/50, 520, 522, 526; 307/18, 42, 43, 147, 307/149; 315/112, 114, 115, 291, 312; 312/223.1, 223.2, 236
See application file for complete search history.

(56) References Cited

U.S. PATENT DOCUMENTS

| | | | | |
|---|---|---|---|---|
| 4,024,441 A * | 5/1977 | Coyle | ..................... | H02B 1/36 174/129 B |
| 4,180,845 A * | 12/1979 | Shariff | ..................... | H02B 1/21 174/133 B |
| 4,528,614 A * | 7/1985 | Shariff | ..................... | H02B 1/36 165/104.33 |
| 4,768,967 A * | 9/1988 | Fritsch | ..................... | H02B 1/36 439/152 |
| 6,002,563 A | 12/1999 | Esakoff | | |
| 6,270,239 B1 | 8/2001 | Sund | | |
| 6,628,089 B2 | 9/2003 | Suomi | | |
| D482,662 S | 11/2003 | Foster et al. | | |

(Continued)

*Primary Examiner* — Michail V Datskovskiy
(74) *Attorney, Agent, or Firm* — Steven M. McHugh

(57) ABSTRACT

A modular power control system is provided and includes an enclosure having an enclosure top, an enclosure bottom, an enclosure front, an enclosure rear, a first enclosure side and a second enclosure side, wherein the enclosure includes an input power connector. The MPCS further includes a module internal support, wherein the module internal support includes a first and module support connected to the enclosure sides, wherein the first module support includes a first module channel and the second module support includes a second module channel. The MPCS further includes at least one module, wherein the at least one module having module sides which define a module cavity, wherein the module sides include a side channel guide for interacting with the first and second module channels, wherein the module includes at least one module power connector configured to conductively associate with the input power connector.

19 Claims, 58 Drawing Sheets

(56) References Cited

U.S. PATENT DOCUMENTS

| | | | |
|---|---|---|---|
| 6,707,256 B2 | 3/2004 | Brunker et al. | |
| 6,849,943 B2 | 2/2005 | Thurk et al. | |
| 7,019,469 B1 | 3/2006 | Thurk et al. | |
| 7,233,112 B2 | 6/2007 | Burke et al. | |
| 7,304,834 B2 | 12/2007 | Schomaker et al. | |
| 7,358,463 B2 | 4/2008 | Mizuno et al. | |
| 7,369,386 B2 | 5/2008 | Rasmussen et al. | |
| 7,382,595 B2 | 6/2008 | Thurk et al. | |
| 7,405,923 B2 | 7/2008 | Kelly et al. | |
| 7,440,262 B2 | 10/2008 | Coffey et al. | |
| 7,606,014 B2 * | 10/2009 | Ziegler | H01R 13/6666 361/115 |
| 7,688,572 B2 * | 3/2010 | Yee | H02B 1/36 200/50.08 |
| 7,701,686 B2 | 4/2010 | Kato et al. | |
| 7,839,391 B2 | 11/2010 | Varian et al. | |
| 7,839,623 B2 | 11/2010 | Coffey et al. | |
| 7,855,518 B2 | 12/2010 | Xu | |
| 7,872,423 B2 | 1/2011 | Biery et al. | |
| 8,040,651 B2 | 10/2011 | Deml | |
| 2002/0021548 A1 * | 2/2002 | Muse | H02B 1/14 361/641 |
| 2003/0234619 A1 | 12/2003 | Brunker | |
| 2004/0246662 A1 | 12/2004 | Thurk | |
| 2005/0052152 A1 | 3/2005 | Suomi et al. | |
| 2005/0052872 A1 | 3/2005 | de Peralta | |
| 2005/0185353 A1 | 8/2005 | Rasmussen | |
| 2006/0267515 A1 | 11/2006 | Burke et al. | |
| 2006/0268484 A1 | 11/2006 | Thurk et al. | |

* cited by examiner

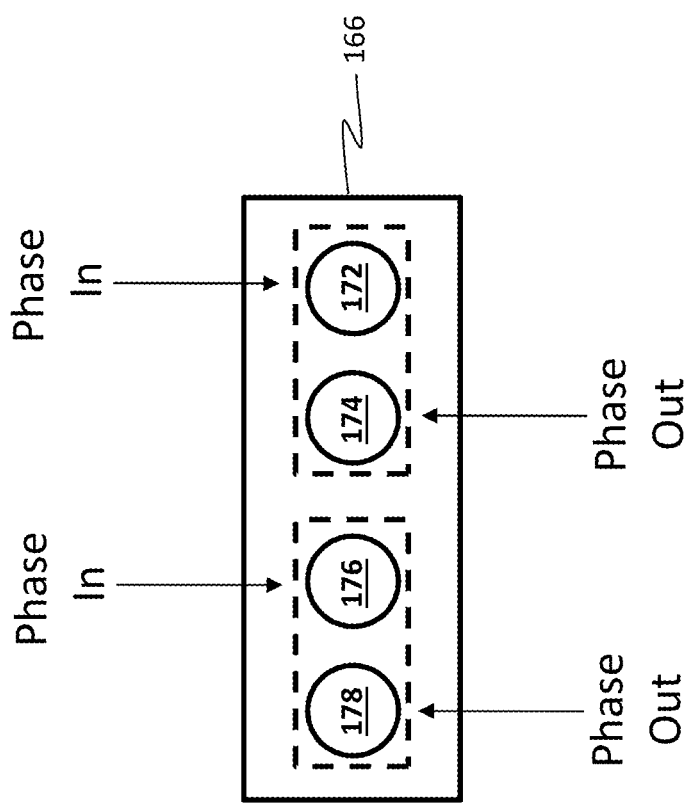

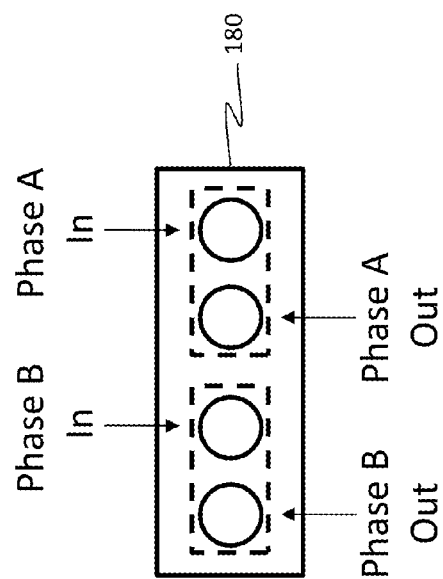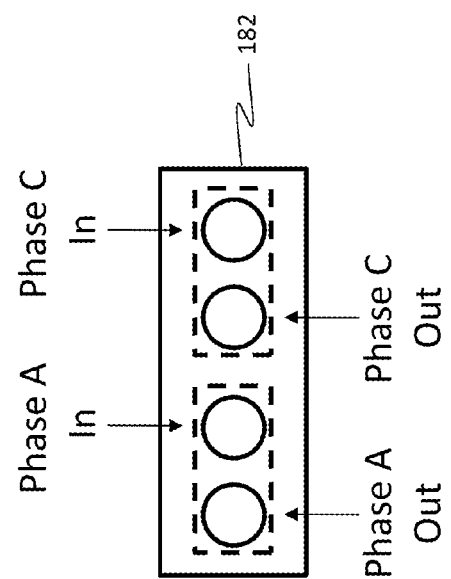
FIG. 4B

216
Two (2) SCR 120V
10A Dimmers
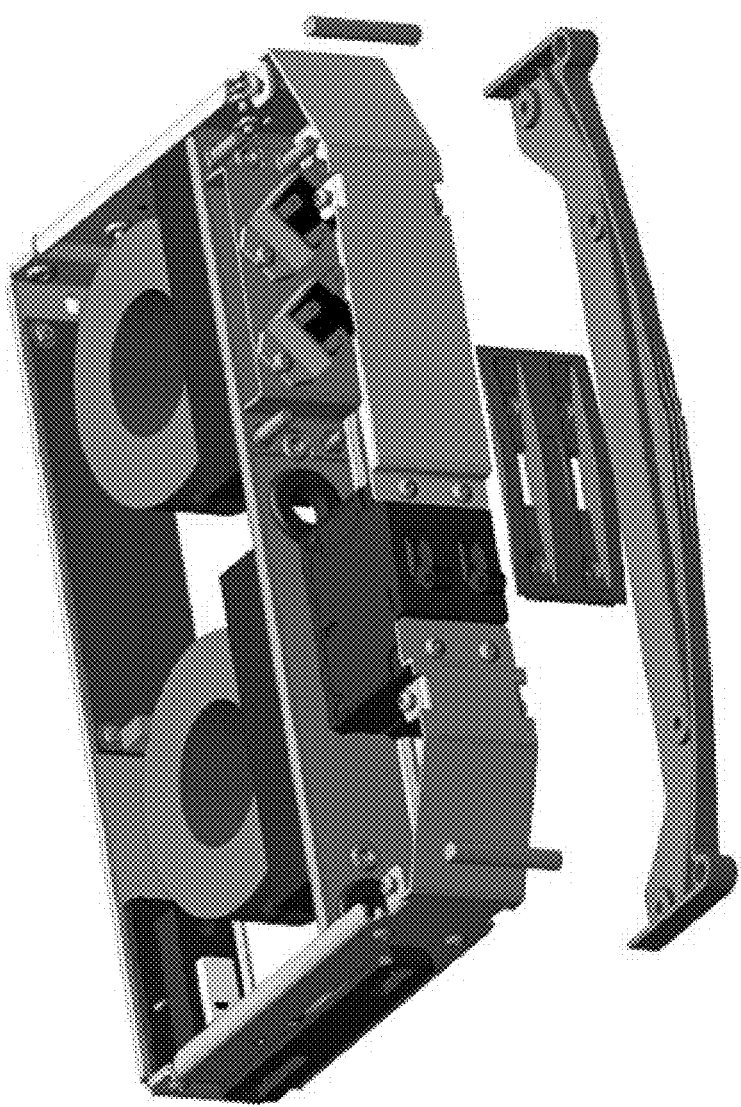
FIG. 8

| INSTALLATION PANELS | | | | |
|---|---|---|---|---|
| MODULE CAPACITY | HEIGHT | WIDTH | DEPTH | PANEL CAPACITY |
| 3 | 11.2" | 12.8" | 12.2" | 40A 3Ø 208Y/120V |
| 6 | 16.6" | 12.8" | 12.2" | 80A 3Ø 208Y/120V |
| 9 | 22.0" | 12.8" | 12.2" | 120A 3Ø 208Y/120V |
| 12 | 27.4" | 12.8" | 12.2" | 160A 3Ø 208Y/120V |
| 15 | 32.8" | 12.8" | 12.2" | 200A 3Ø 208Y/120V |

Figure 16

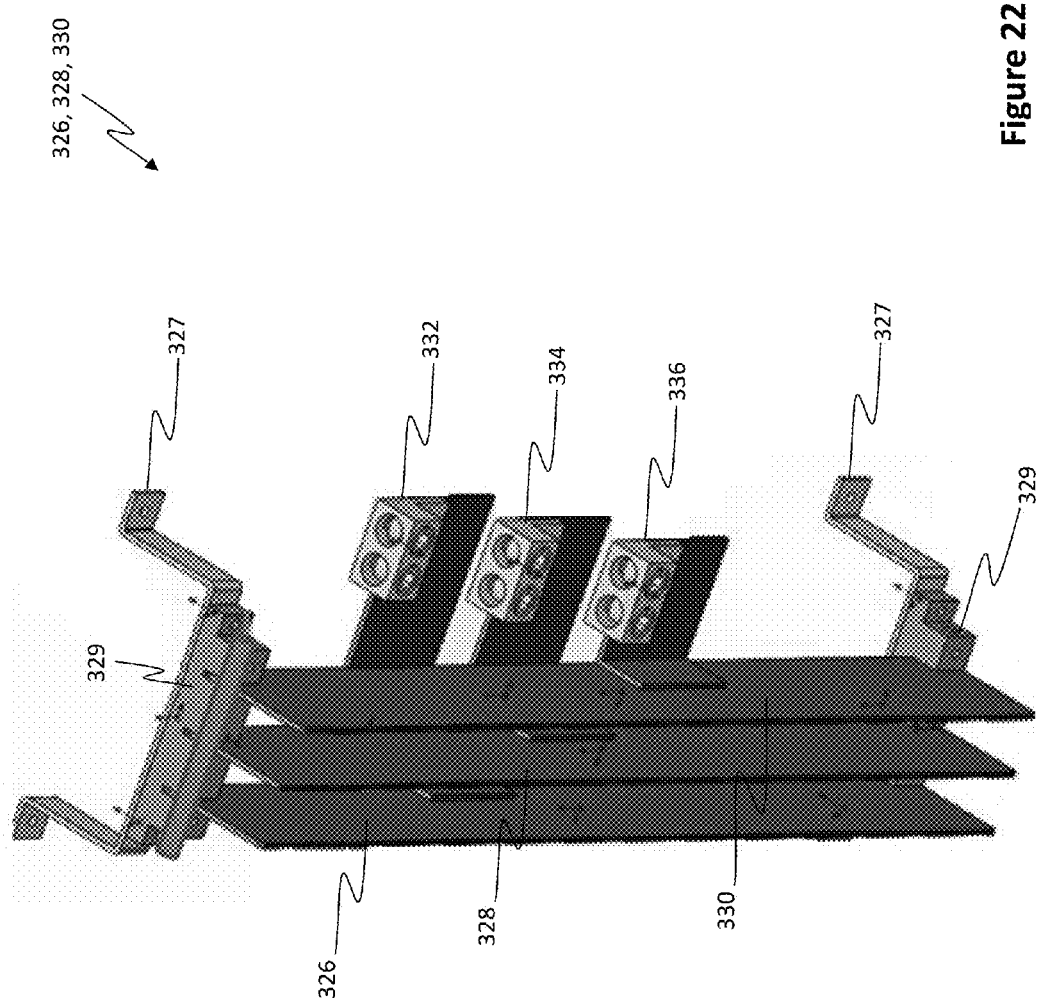

| | 208Y/120 VAC 3 Phase, 60Hz (H,H,H,N,G.) | 240 VAC Single Phase, 60Hz (H,H,N,G.) |
|---|---|---|
| TRIO-I-4 Four (4) | 80 Amps | 120 Amps |
| TRIO-I-8 Eight (8) | 160 Amps | 240 Amps |
| TRIO-I-16 Sixteen (16) | 310 Amps | 310 Amps |

Figure 33B

Section A-A

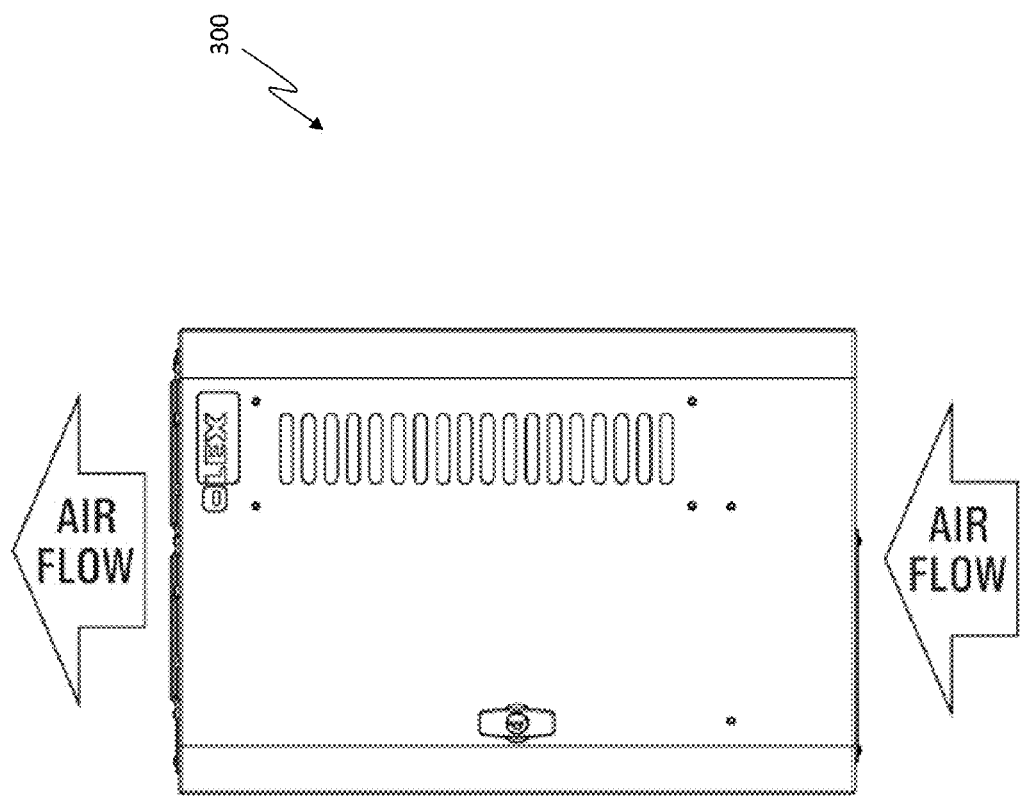

CONFIGURABLE MODULAR POWER CONTROL SYSTEM

RELATED APPLICATIONS

This application is a continuation-in-part application of U.S. Non-Provisional patent application Ser. No. 14/057,430 and claims the benefit of priority of U.S. Provisional Patent Application Ser. No. 62/079,620, U.S. Non-Provisional patent application Ser. No. 14/057,430 and U.S. Provisional Patent Application Ser. No. 61/715,358, the contents of all of which are incorporated by reference herein in their entireties.

FIELD OF THE INVENTION

The present invention relates generally to a system for controlling power and more particularly to a modular power control system that is configurable to accomplish various types of power control operations such as dimmer control and single-pole/double-pole relay requirements.

BACKGROUND OF THE INVENTION

Power control systems that control dimmer and power relay operations lighting and other devices are known in the art and are typically constructed using large enclosures that have exposed bus bars (one bus bar for each electrical phase) and other electrical connections. Moreover, the components used to accomplish the task of controlling dimmer and power relay functions are 'hardwired' into the enclosure and typically require a large amount of wiring which results in a virtual 'rats nest' of wires inside of the enclosure. Furthermore, as these systems deal with large power applications, the components used typically generate large amounts of heat.

Unfortunately however, current designs do little in the way of providing a safe environment for technicians that must work on these systems. The exposed bus bars and electrical connections create a safety hazard for people that have access the internal area of the enclosure. This is undesirable because electrocution and shock can not only occur when the components and bus bars are accidentally touch, but with high power devices such as relays, switches, circuit breakers, etc. if an individual gets to close an electric arc may occur. Accordingly, although a trained technician may have a reduced risk of electric shock, the exposed nature of the components and bus bars makes that risk more prevalent.

Additionally, the current enclosures are not designed to efficiently dissipate the heat generated by the components. Accordingly, the temperature within the enclosure typically rises to a high level and may result in failure of the components. This creates a tempting opportunity to leave the enclosure door open to help dissipate the heat. Unfortunately, this creates a furthermore safety hazard by allowing access into the system enclosure and exposing non-trained personnel to the electrical components within the enclosure.

SUMMARY OF THE INVENTION

A modular power control system, comprising: an enclosure having an enclosure top, an enclosure bottom, an enclosure front, an enclosure rear, a first enclosure side and a second enclosure side, wherein the enclosure defines an enclosure cavity and wherein the enclosure further includes an input power connector; a module internal support, wherein the module internal support includes a first module support connected to the first enclosure side and a second module support connected to the second enclosure side, wherein the first module support includes a first module channel and the second module support includes a second module channel; at least one module, wherein the at least one module includes a module rear, a module front and module sides which define a module cavity, wherein each of the module sides include a side channel guide for interacting with the first and second module channels to support the module, wherein the module includes at least one module power connector configured to conductively associate with the input power connector when the at least one module is located within the enclosure cavity.

A modular power control system, comprising: an enclosure defining an enclosure cavity, an input power Phase A bus bar, an input power Phase B bus bar, an input power Phase C bus bar; a first module support and a second module support located within the enclosure cavity and connected to the enclosure, wherein the first module support includes a first module channel and the second module support includes a second module channel; and a module, wherein the module includes a module rear, a module front and module sides, wherein each of the module sides include a side channel guide configured to slidingly interacting with the first and second module channels to support the module within the enclosure cavity and wherein the module rear includes a module power Phase A connector configured to conductively mate with the input power Phase A bus bar, a module power Phase B connector configured to conductively mate with the input power Phase B bus bar and a module power Phase C connector configured to conductively mate with the input power Phase C bus bar when the module is contained within the enclosure cavity.

BRIEF DESCRIPTION OF THE DRAWINGS

The foregoing and other features and advantages of the present invention will be better understood from the following detailed description of illustrative embodiments, taken in conjunction with the accompanying drawings in which:

FIG. 4A is a rear view of a power connector of the MPCS of FIG. 1 illustrating the pin configuration.

FIG. 4B is a rear view of the first and second power connectors of the MPCS of FIG. 1 illustrating the pin configuration.

FIG. 8 is top side isometric view of a dimmer module for use with the MPCS of FIG. 1 illustrating an 'open' design.

FIG. 16 is chart illustrating some embodiments of various sizes of the MPCS of FIG. 1.

FIG. 22B is a top down side perspective view of the input power bus bars used in the MPCS of FIG. 17, in accordance with one embodiment of the invention.

FIG. 33B is chart illustrating some embodiments of various power inputs of the MPCS of FIG. 17.

FIG. 48 is front view of the MPCS of FIG. 17 illustrating airflow into and out of system enclosure, in accordance with one embodiment of the invention.

DETAILED DESCRIPTION OF THE INVENTION

It should be appreciated that although the modular power distribution system of the present invention is described herein in terms of a dimmer array system, the concept of the invention may be used for any situation that requires power to be distributed. It should also be appreciated that the present invention may be a portable or permanently installed unit configurable for operation with single and multiple phase applications of up to 200 A (and in some cases greater than 200 A), such as power distribution application for LEDs, moving lights, traditional dimming, etc.

Figure 1:
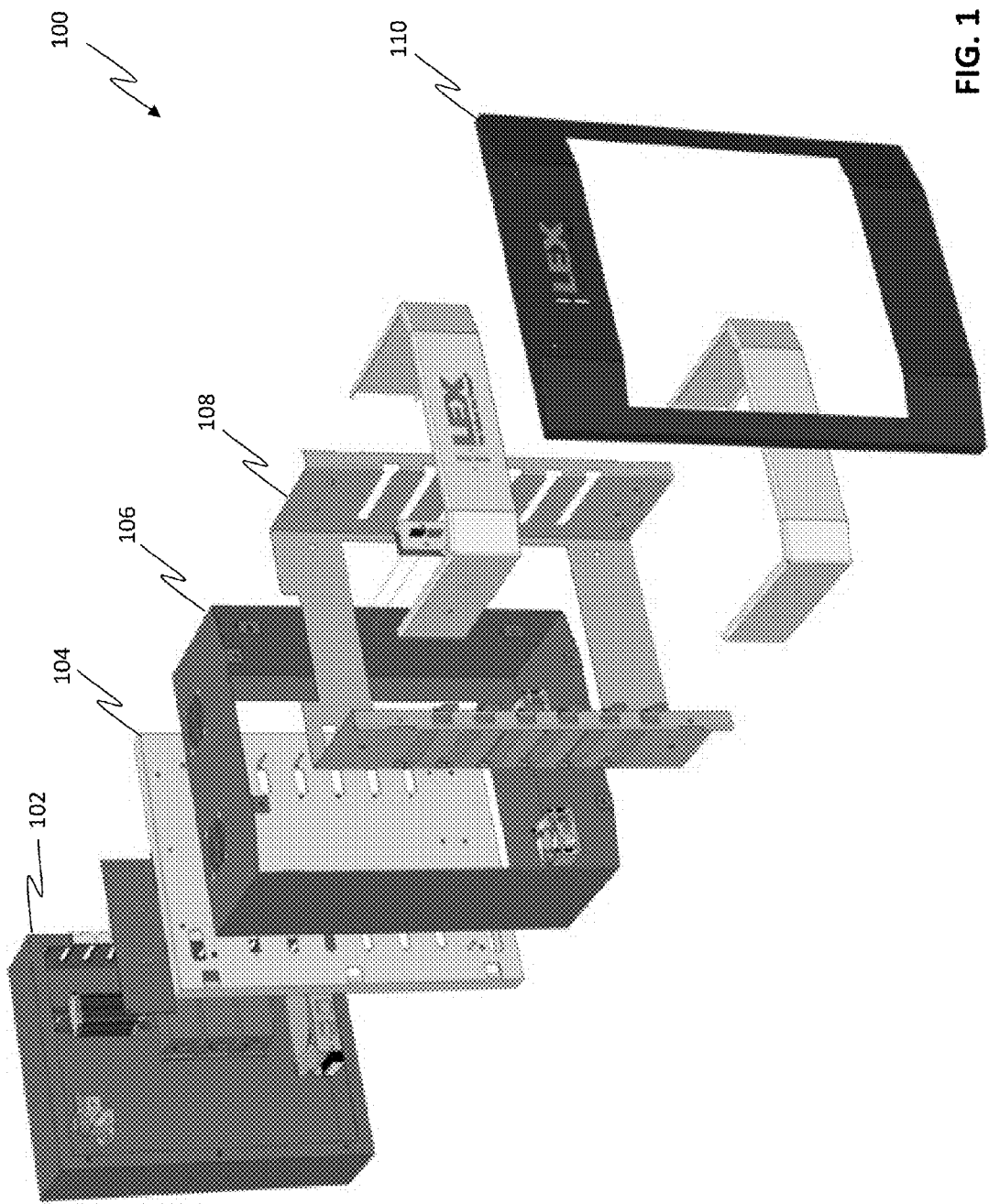
FIG. 1 is a top down perspective exploded view of a Modular Power Control System (MPCS), in accordance with one embodiment of the present invention.

Referring to FIG. 1, a Modular Power Control System (MPCS) 100 is shown and includes a base enclosure 102, a base enclosure door 104, a module enclosure 106, a module enclosure internal support 108 and a module enclosure front panel 110.

Figure 2A:
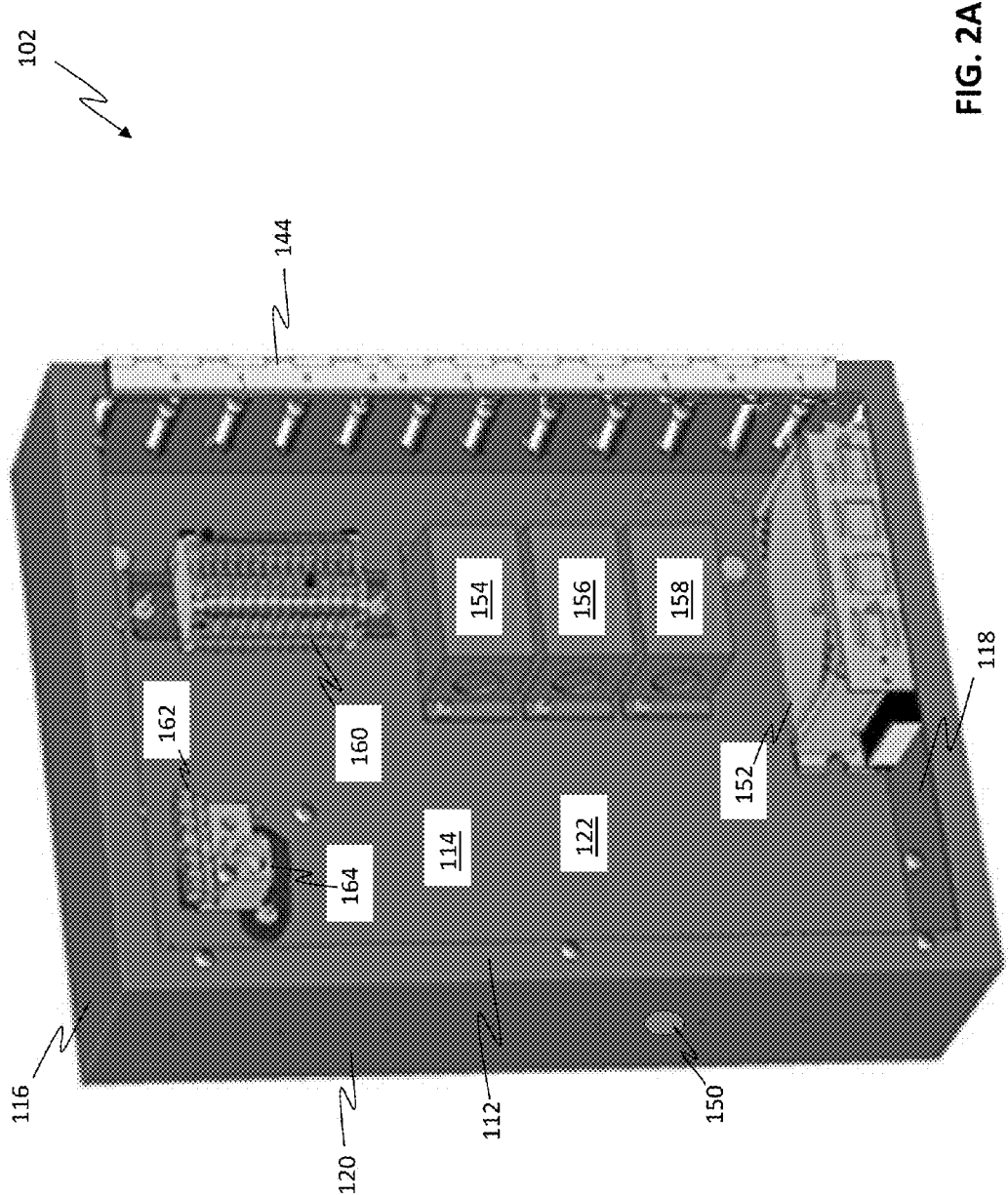
FIG. 2A is front isometric view of the base enclosure of the MPCS of FIG. 1.
Figure 2B:
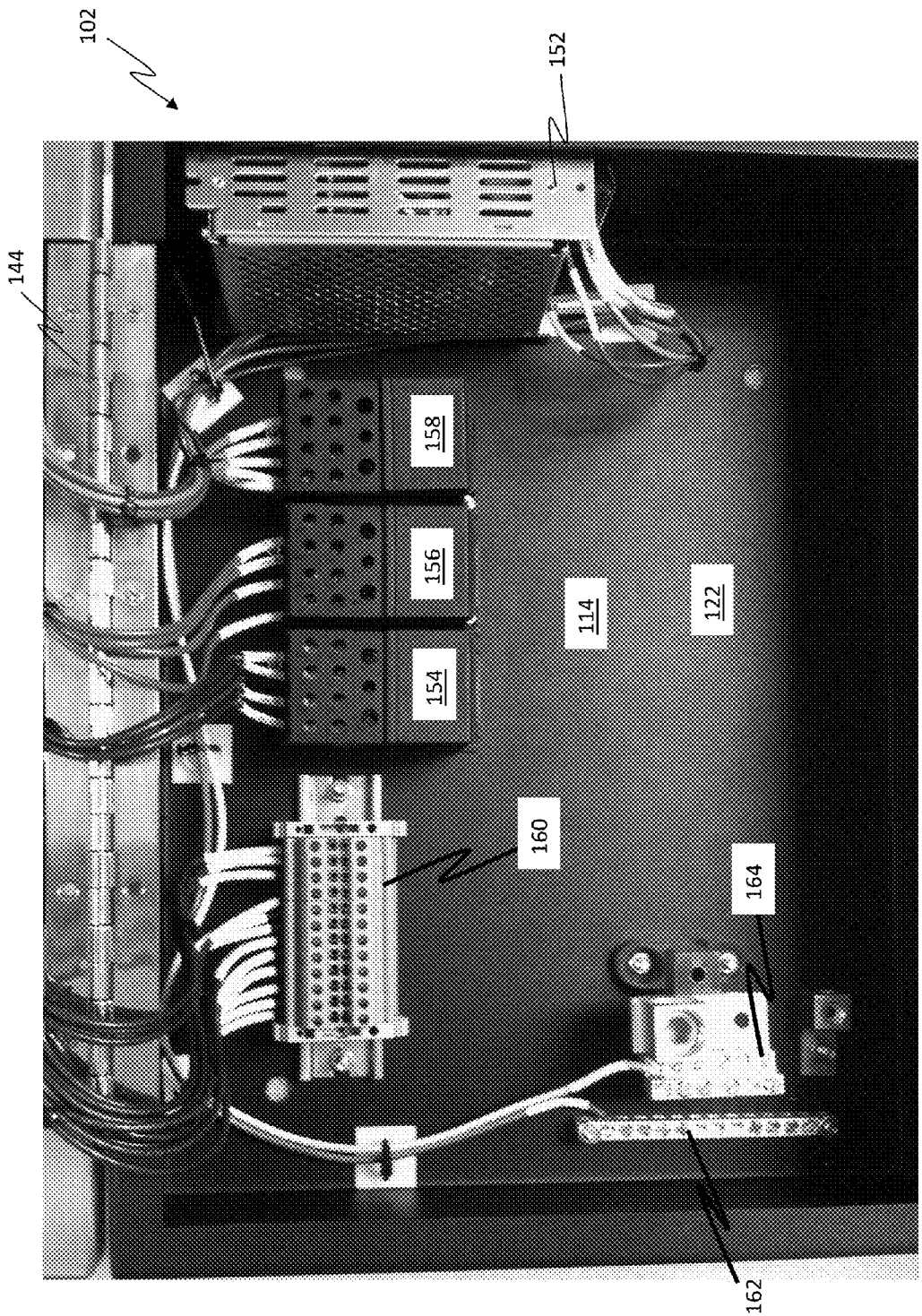
FIG. 2B is front view of the base enclosure of the MPCS of FIG. 1.
Figure 3A:
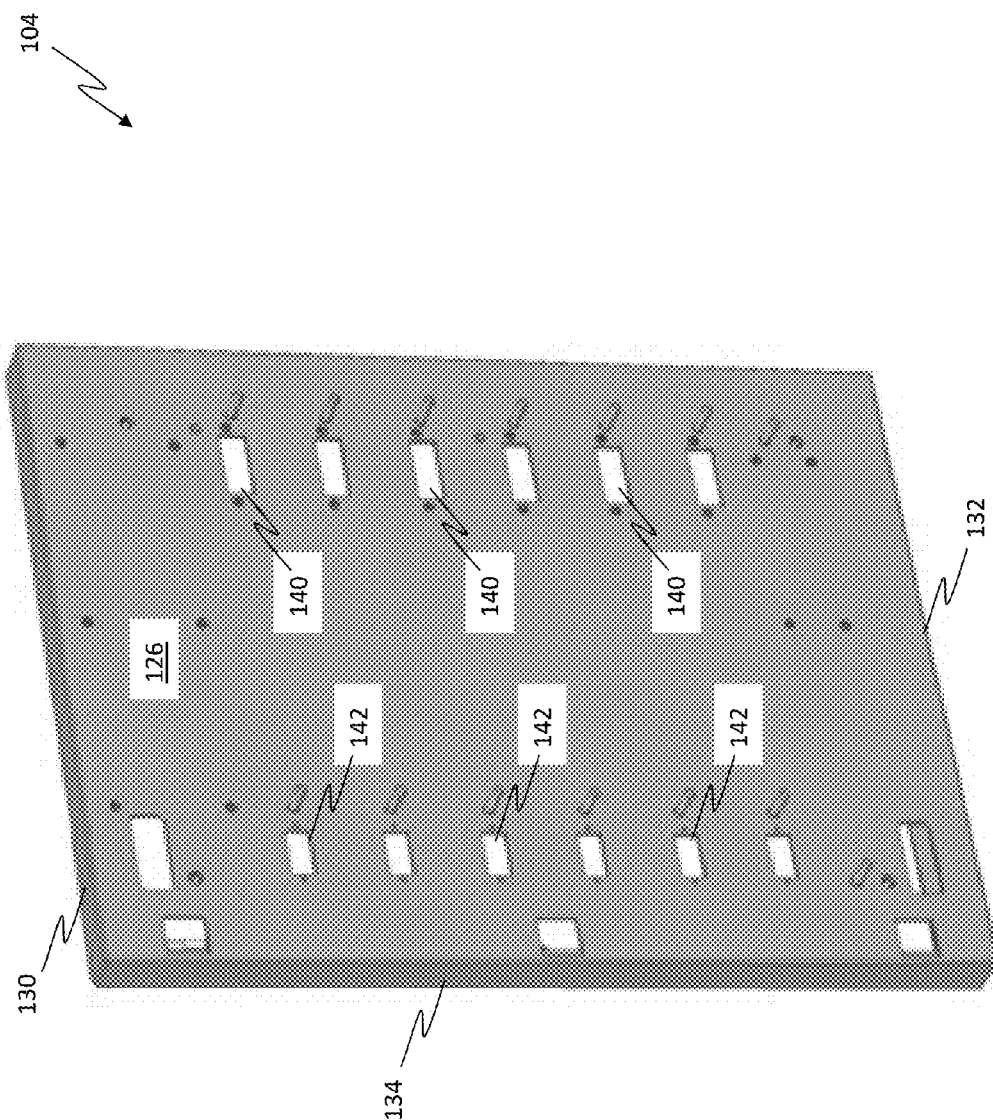
FIG. 3A is a front perspective view of the base enclosure door of the MPCS of FIG. 1.
Figure 3B:
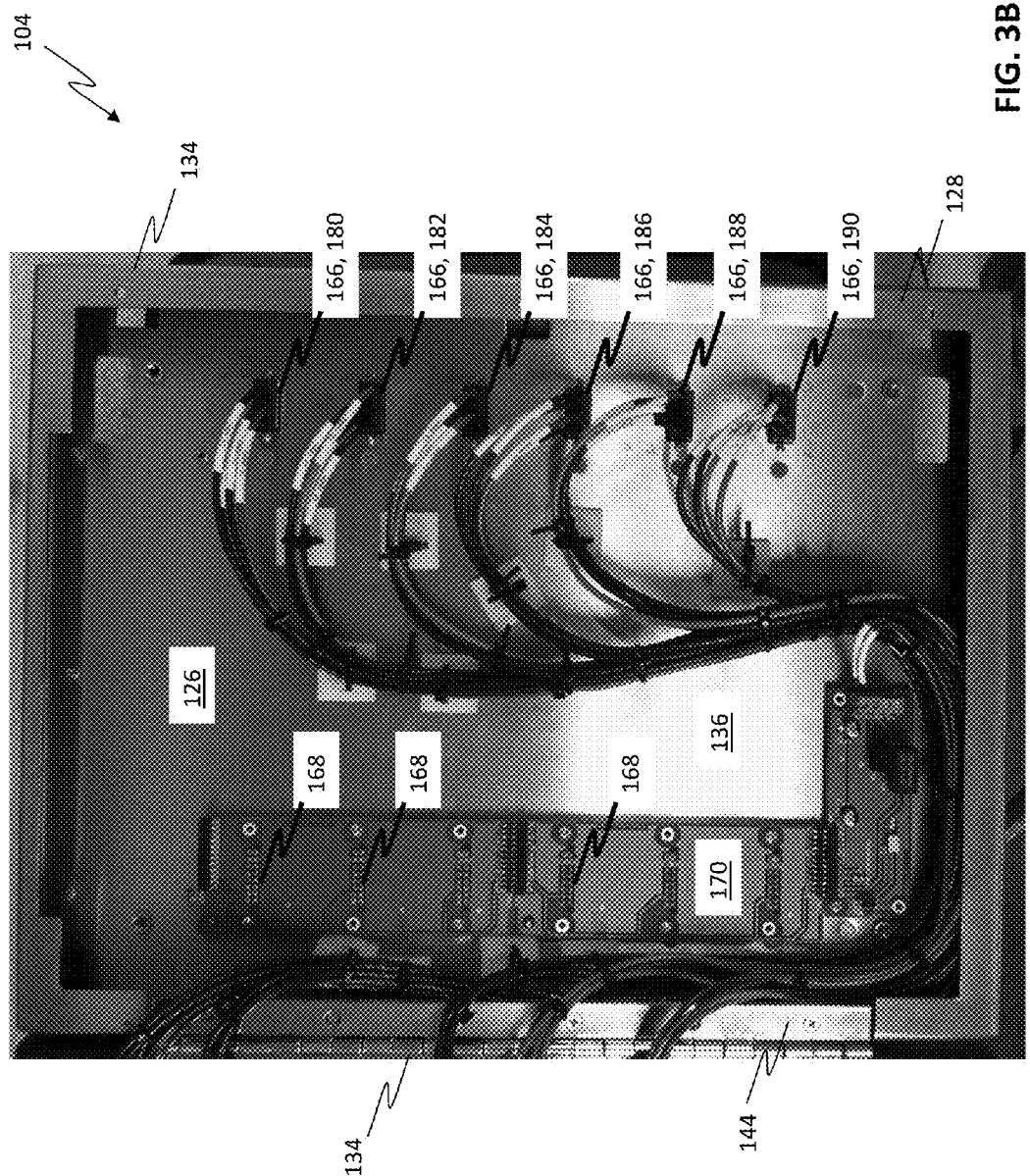
FIG. 3B is a rear view of the base enclosure door showing the base enclosure door cavity of the MPCS of FIG. 1.

Referring to FIG. 2A and FIG. 2B, the base enclosure 102 includes a base enclosure front 112, a base enclosure back 114, a base enclosure top 116, a base enclosure bottom 118 and two base enclosure sides 120, wherein the base enclosure front 112, base enclosure back 114, base enclosure top 116, base enclosure bottom 118 and base enclosure sides 120 define a base enclosure cavity 122. Additionally, the base enclosure front 112 includes a base enclosure opening 124 which allows access into the base enclosure cavity 122. Referring to FIG. 3A and FIG. 3B, the base enclosure door 104 includes a base enclosure door front 126, a base enclosure door back 128, a base enclosure door top 130, a base enclosure door bottom 132 and two base enclosure door sides 134, wherein the base enclosure door front 126, base enclosure door back 128, base enclosure door top 130, base enclosure door bottom 132 and base enclosure door sides 134 define a base enclosure door cavity 136. Additionally, the base enclosure door back 128 includes a base enclosure door opening 138 which allows access into the base enclosure door cavity 136. The base enclosure door also includes a plurality of power connector openings 140 and a plurality of signal connector openings 142.

It should be appreciated that the base enclosure door 104 is attached to the base enclosure 102 via a hinge 144 such that the base enclosure door 104 is rotatable between an open configuration and a closed configuration. When in the open configuration, the base enclosure cavity 122 and base enclosure door cavity 136 are accessible. When in the closed configuration, the base enclosure door back 128 aligns with the base enclosure front 112 to enclose the base enclosure cavity 122/base enclosure door cavity 136 and such that the base enclosure opening 124 and base enclosure door opening 138 are proximate each other. A base enclosure locking member may be included on at least one of the base enclosure 102 and the base enclosure door 104 to limit access to the base enclosure cavity 122 and the base enclosure door cavity 136.

Referring again to FIG. 2A and FIG. 2B, the MPCS 100 also includes a power input opening 150, a power supply 152, a Phase A power input terminal 154, a Phase B power input terminal 156, a Phase C power input terminal 158, a power output distribution block 160, a ground terminal 162 and a neutral terminal 164, wherein the power supply 152, Phase A power input terminal 154, Phase B power input terminal 156, Phase C power input terminal 158, power output distribution block 160, ground terminal 162 and neutral terminal 164 are securely located within the base enclosure cavity 122. Additionally, referring again to FIG. 3A and FIG. 3B, the MPCS 100 also includes a plurality of power connectors 166, a plurality of signal connectors 168 and PCB Backplane 170 which are located within the base enclosure door cavity 136. The plurality of power connectors 166 are associated with the plurality of power connector openings 140 and the plurality of signal connectors 168 are associated with the plurality of signal connector openings 142 such that the interface portion of the plurality of power connectors 166 and signal connectors 168 are accessible via the base enclosure door front 126. It should be appreciated that the number of power connectors 166 and signal connectors 168 may be dependent on the number of modules that the MPCS 100 can accommodate. Additionally, referring to FIG. 4A each of the power connectors 166 include a first power input port 172, a first power output port 174, a second power input port 176 and a second power output port 178.

It should be appreciated that the three-phase power is introduced into the MPCS 100 via the power input opening 150 and includes a Phase A conductor that is connected to the Phase A power input terminal 154, a Phase B conductor that is connected to the Phase B power input terminal 156 and a Phase C conductor that is connected to the Phase C power input terminal 158. The three-phase power also includes a neutral conductor that is connected to the neutral terminal 164 and a ground conductor that is connected to the ground terminal 162. Additionally, the power supply 152 may be powered via the three-phase power by connecting the power input of the power supply 152 to at least one of the Phase A power input terminal 154, Phase B power input terminal 156 or Phase C power input terminal 158.

Figure 4C:
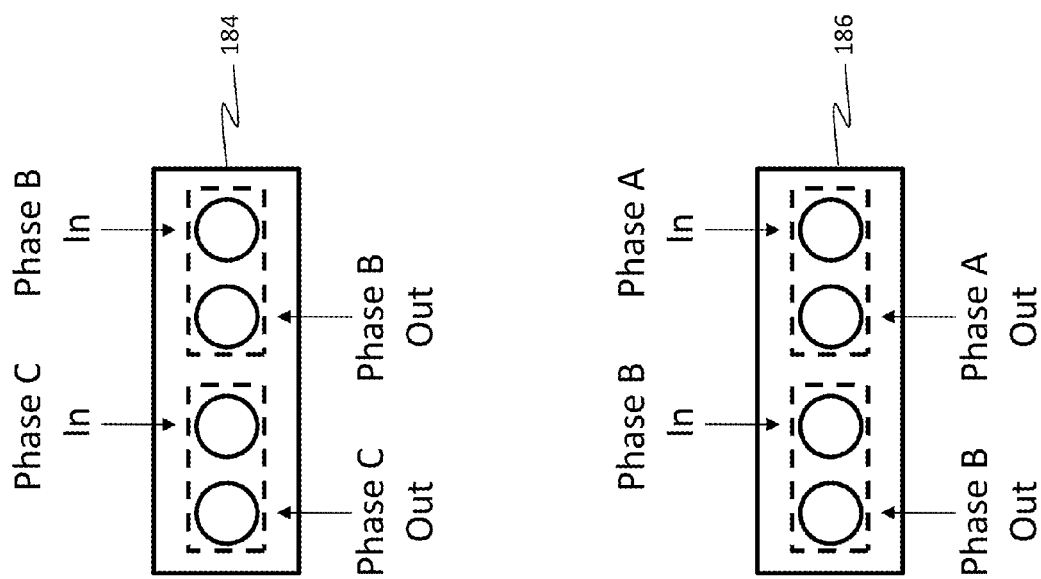
FIG. 4C is a rear view of the third and fourth power connectors of the MPCS of FIG. 1 illustrating the pin configuration.
Figure 4D:
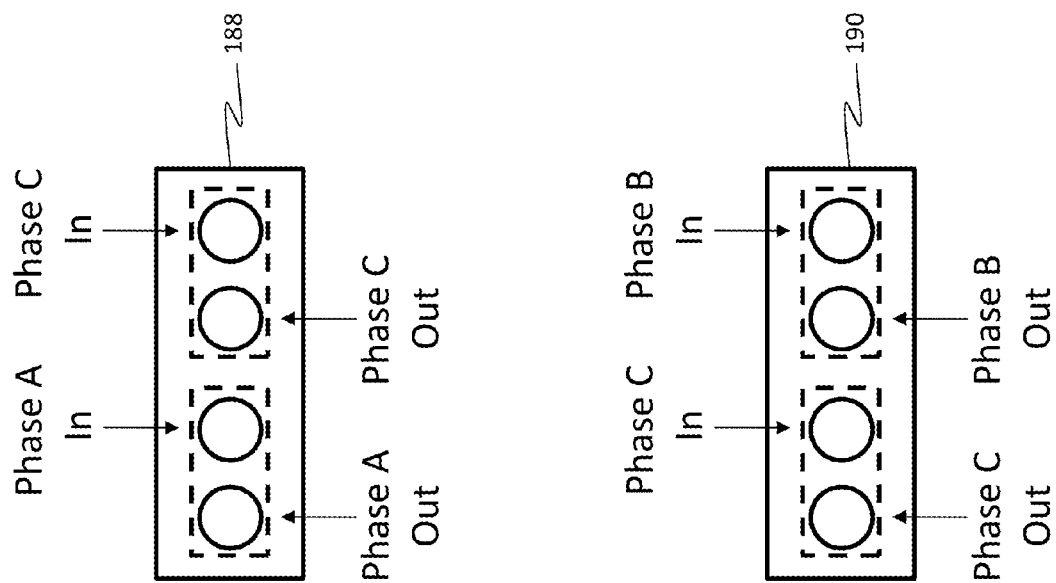
FIG. 4D is a rear view of the fifth and sixth power connectors of the MPCS of FIG. 1 illustrating the pin configuration.

Referring to FIG. 4B, FIG. 4C and FIG. 4D, one embodiment of the connection of the power phases to the plurality of power connectors 166 is illustrated. As shown, the MPCS 100 is configured to accommodate six (6) modules and thus includes a first power connector 180, a second power connector 182, a third power connector 184, a fourth power connector 186, a fifth power connector 188 and a sixth power connector 190. The first power connector 180 is configured to have a Phase A power input and output and a Phase B power input and output, the second power connector 182 is configured to have a Phase C power input and output and a Phase A power input and output, the third power connector 184 is configured to have a Phase B power input and output and a Phase C power input and output, the fourth power connector 186 is configured to have a Phase A power input and output and a Phase B power input and output, the fifth power connector 188 is configured to have a Phase C power input and output and a Phase A power input and output and the sixth power connector is configured to have a Phase B power input and output and a Phase C power input and output. It should be appreciated that the phase power inputs of the plurality of connectors 166 are connected to the appropriate Phase power input terminal and the and the phase power outputs of the plurality of connectors 166 are connected to the power output distribution block 160 for distribution to external loads. The signal connectors 168 are connected to the PCB Backplane 170. Moreover, power conductors from the power supply 152 are also connected to the PCB Backplane 170 to provide power to the PCB Backplane 170.

Figure 4E:
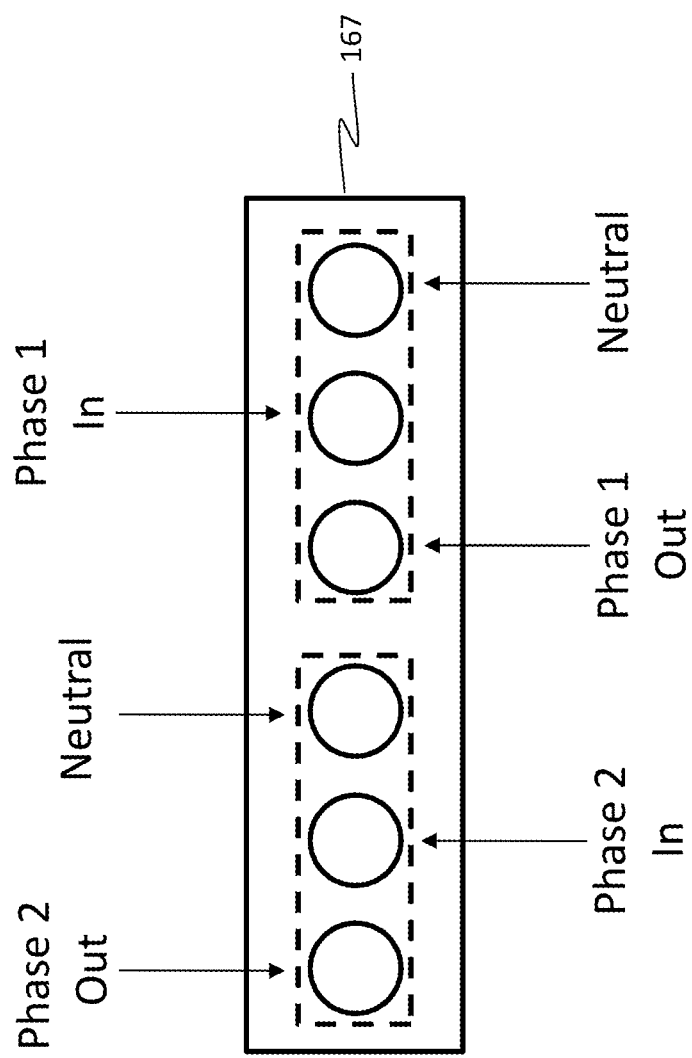
FIG. 4E is a rear view of a power connector illustrating the pin configuration in accordance with an additional embodiment.

It should be appreciated that various types of power connectors 166 may be used in response for different configurations. For example, the power connectors 166 may vary from a four (4) pin configuration (See FIG. 4A) and may include a six (6) (or more) pin connector 167 (See FIG. 4E). In this embodiment, the six (6) pin connector 167 includes pins for two phases, where each phase includes a power phase output pin, a power phase input pin and a neutral pin. Other connector configurations are also contemplated and are responsive to the application.

Figure 5:
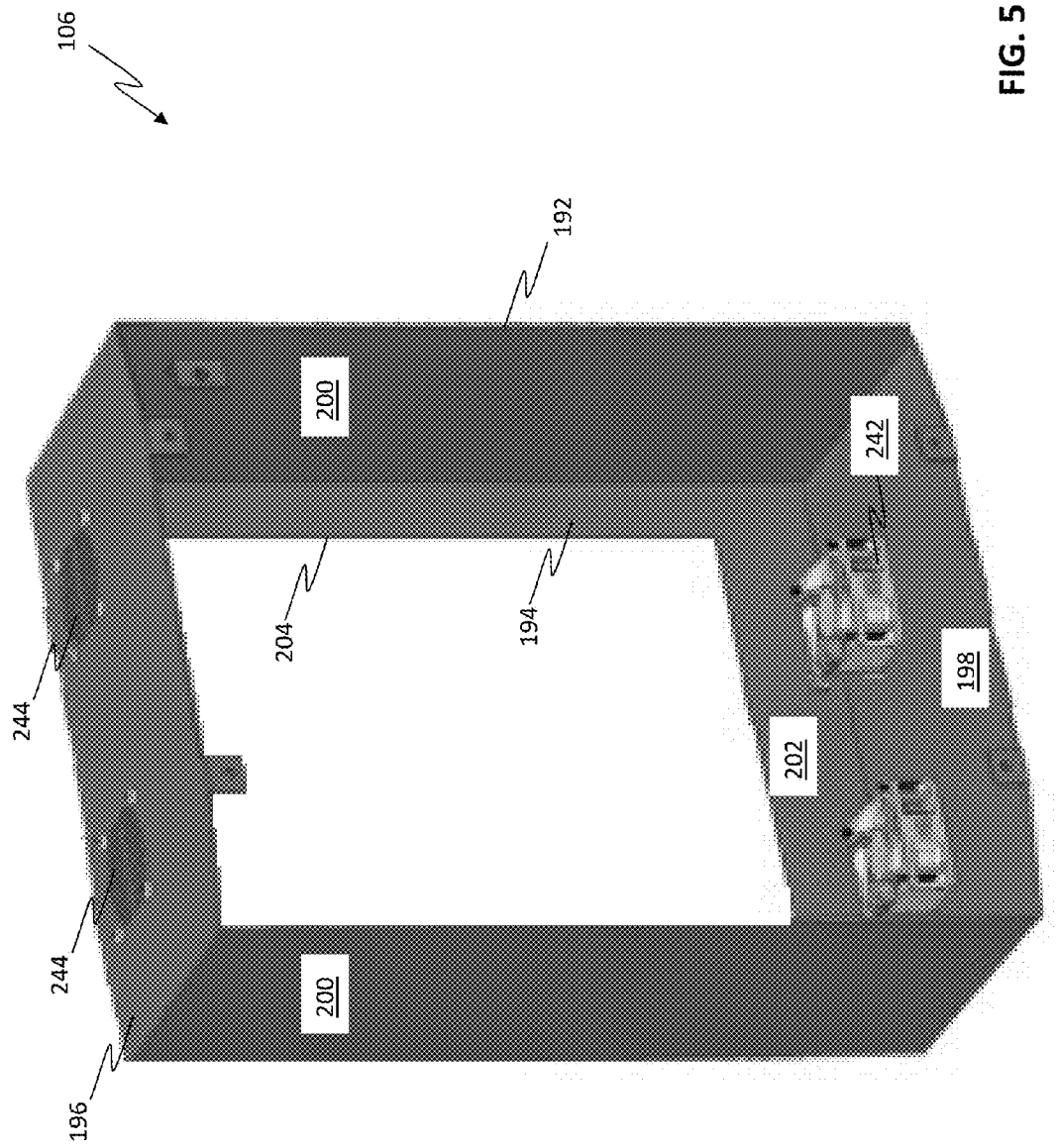
FIG. 5 is a front side isometric view of the module enclosure of the MPCS of FIG. 1.
Figure 6:
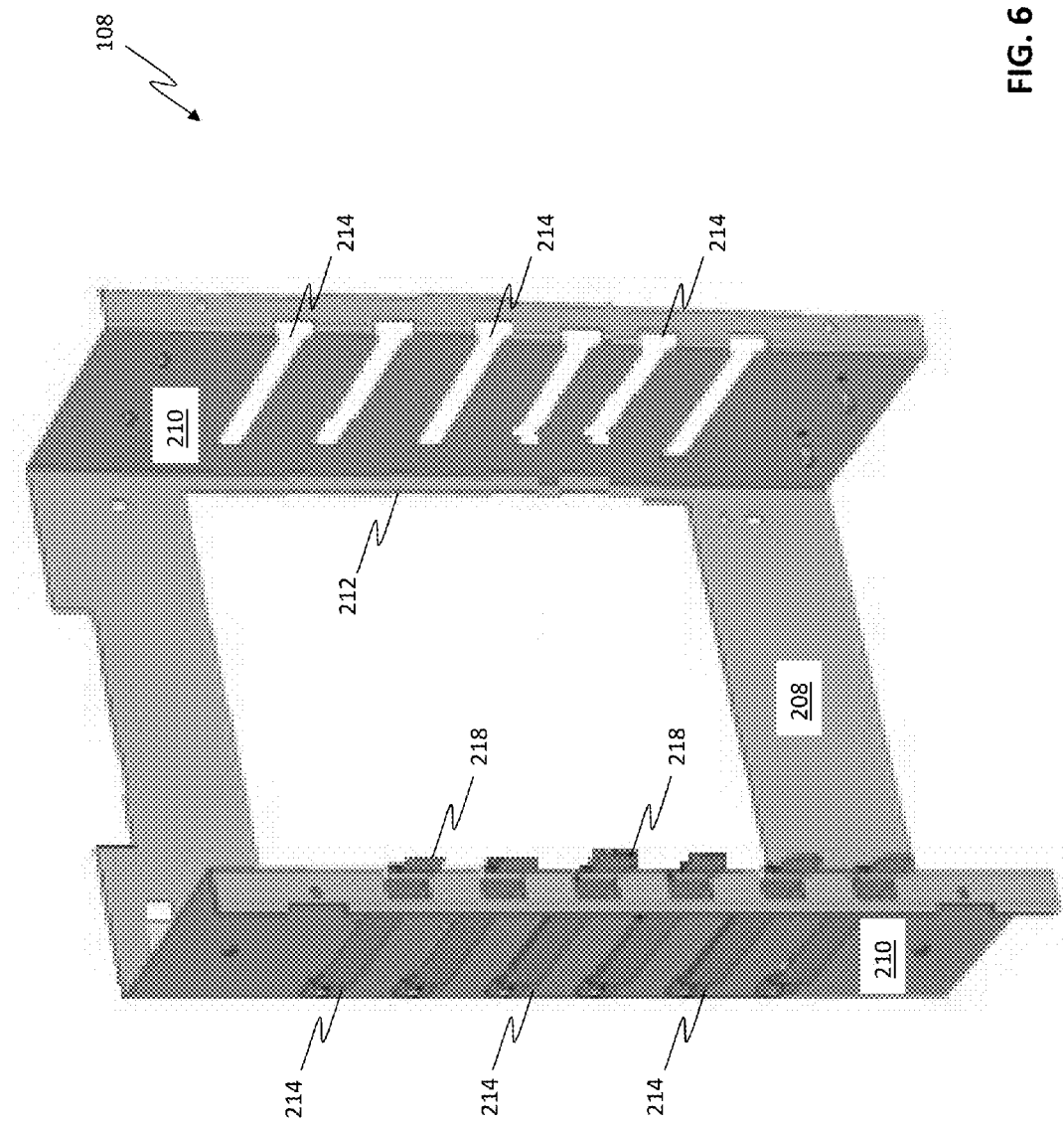
FIG. 6 is a front side isometric view of the module enclosure internal support of the MPCS of FIG. 1.

Referring to FIG. 5, the module enclosure 106 includes a module enclosure front 192, a module enclosure rear 194, a module enclosure top 196, a module enclosure bottom 198 and two module enclosure sides 200, wherein the module enclosure rear 194, module enclosure top 196, module enclosure bottom 198 and module enclosure sides 200 define a module enclosure cavity 202. Additionally, the module enclosure rear 194 includes a module enclosure rear opening 204 and the module enclosure front 192 includes a module enclosure front opening 206 to allow access to the module enclosure cavity 202 from both the module enclosure front 192 and the module enclosure rear 194. Referring to FIG. 6, the module enclosure internal support 108 includes a module enclosure internal support rear 208 and two module enclosure internal support sides 210, where the module enclosure internal support rear 208 includes an internal support opening 212. The module enclosure internal support 108 is securely located within the module enclosure cavity 202 such that the internal support opening 212 is aligned with the module enclosure rear opening 204. It should be appreciated that the module enclosure internal support 108 is securely attached to the module enclosure rear 194 and/or the module enclosure sides 200 via screws. The module enclosure internal support 108 further includes a plurality of module guide channel pairs 214, where one of the channels of the module guide channel pair 214 is located on one side of the module enclosure internal support sides 210 and the other of the channel of the module guide channel pair 214 is located on the other side of the module enclosure internal support sides 210. These module guide channel pairs 168 are configured to slidingly receive and contain a module 216 within the module enclosure 106, where one channel of the module guide channel pairs 214 include a resilient member 218 which interacts with the module 216 as discussed further hereinafter to lockingly and securely contain the module 216 within the module guide channel pair 214.

Figure 7A:
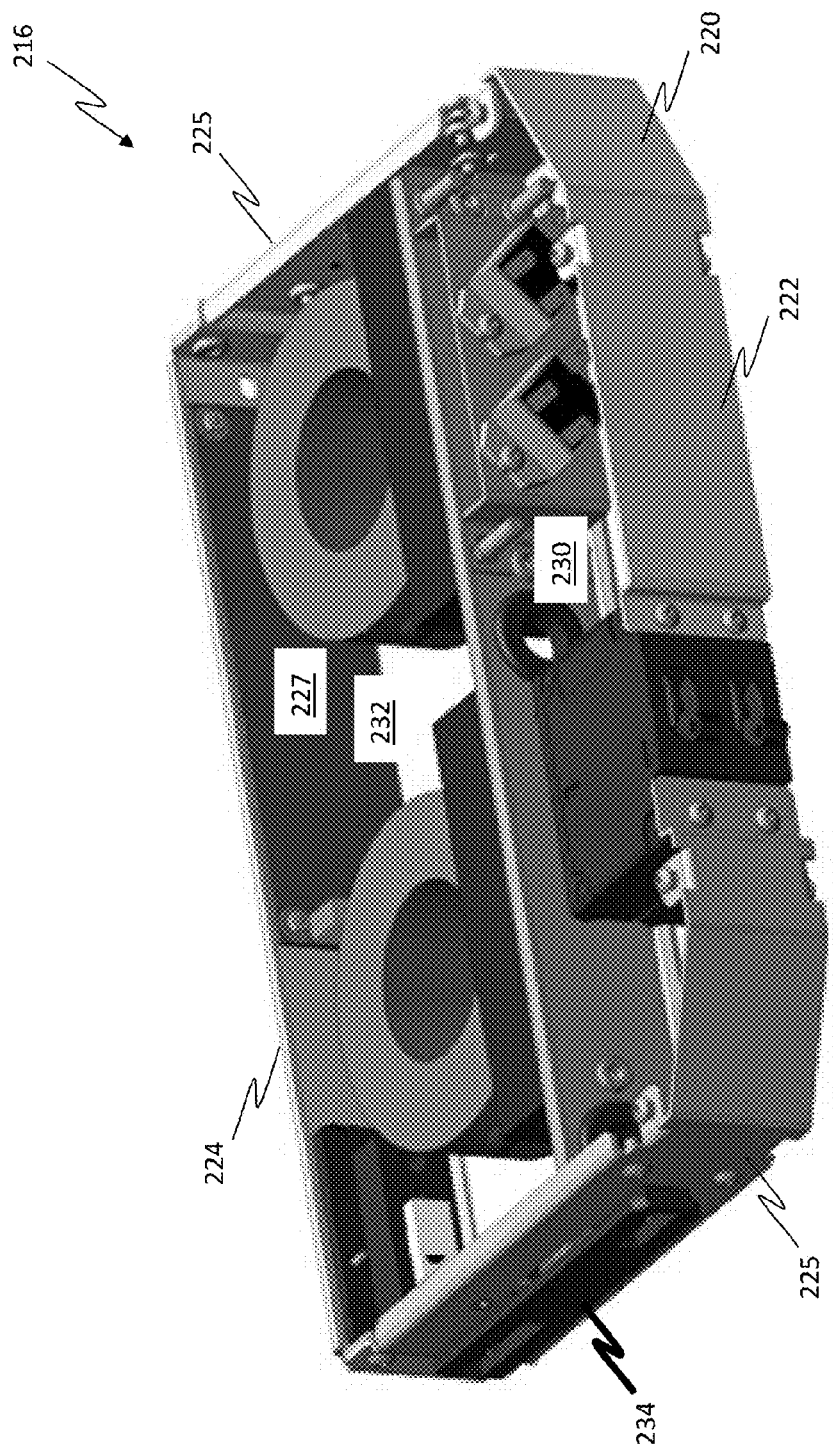
FIG. 7A is top side isometric view of one embodiment of a module for use with the MPCS of FIG. 1 illustrating an 'open' design.
Figure 7B:
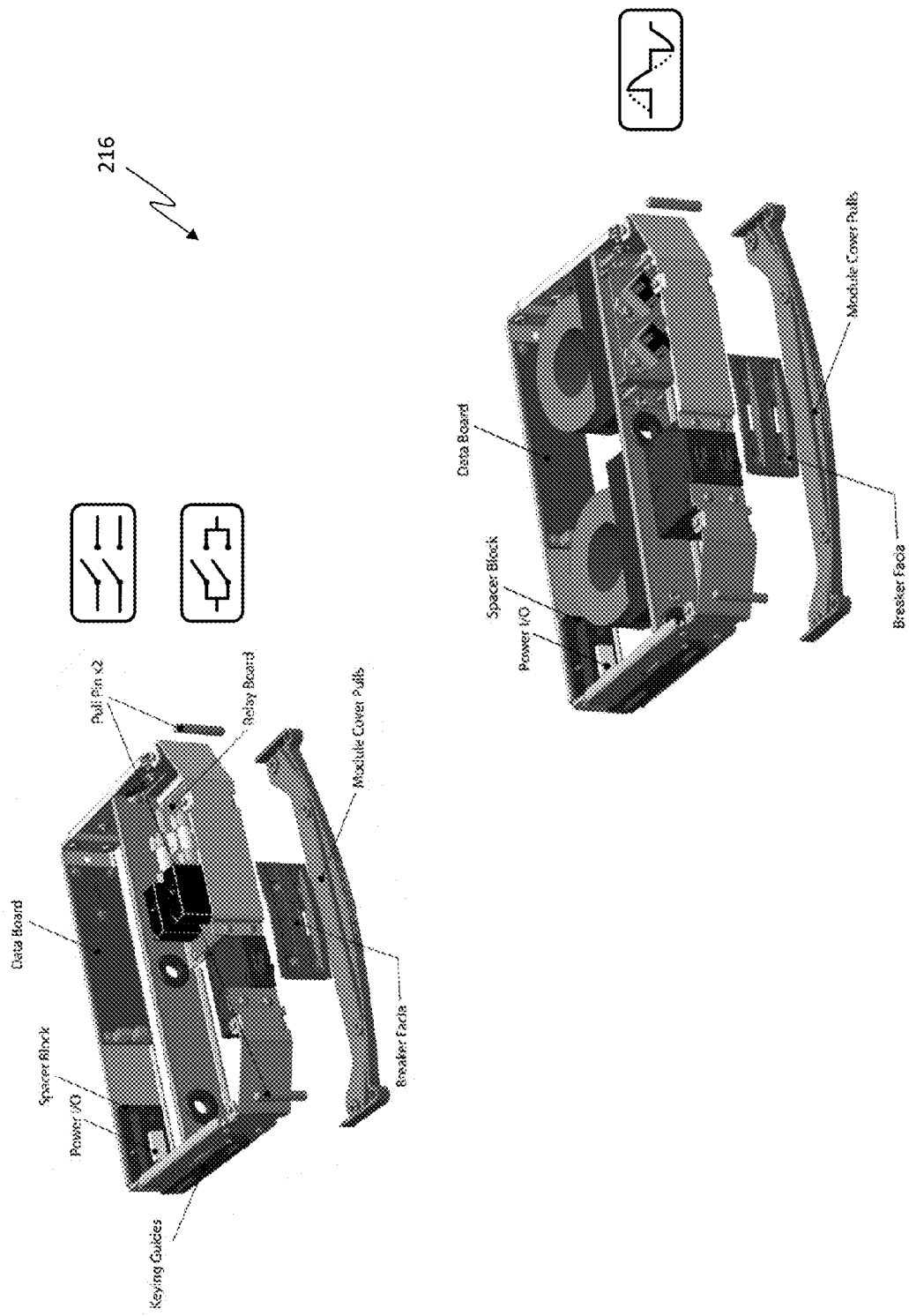
FIG. 7B is top side isometric view of multiple embodiments of modules for use with the MPCS of FIG. 1.
Figure 9:
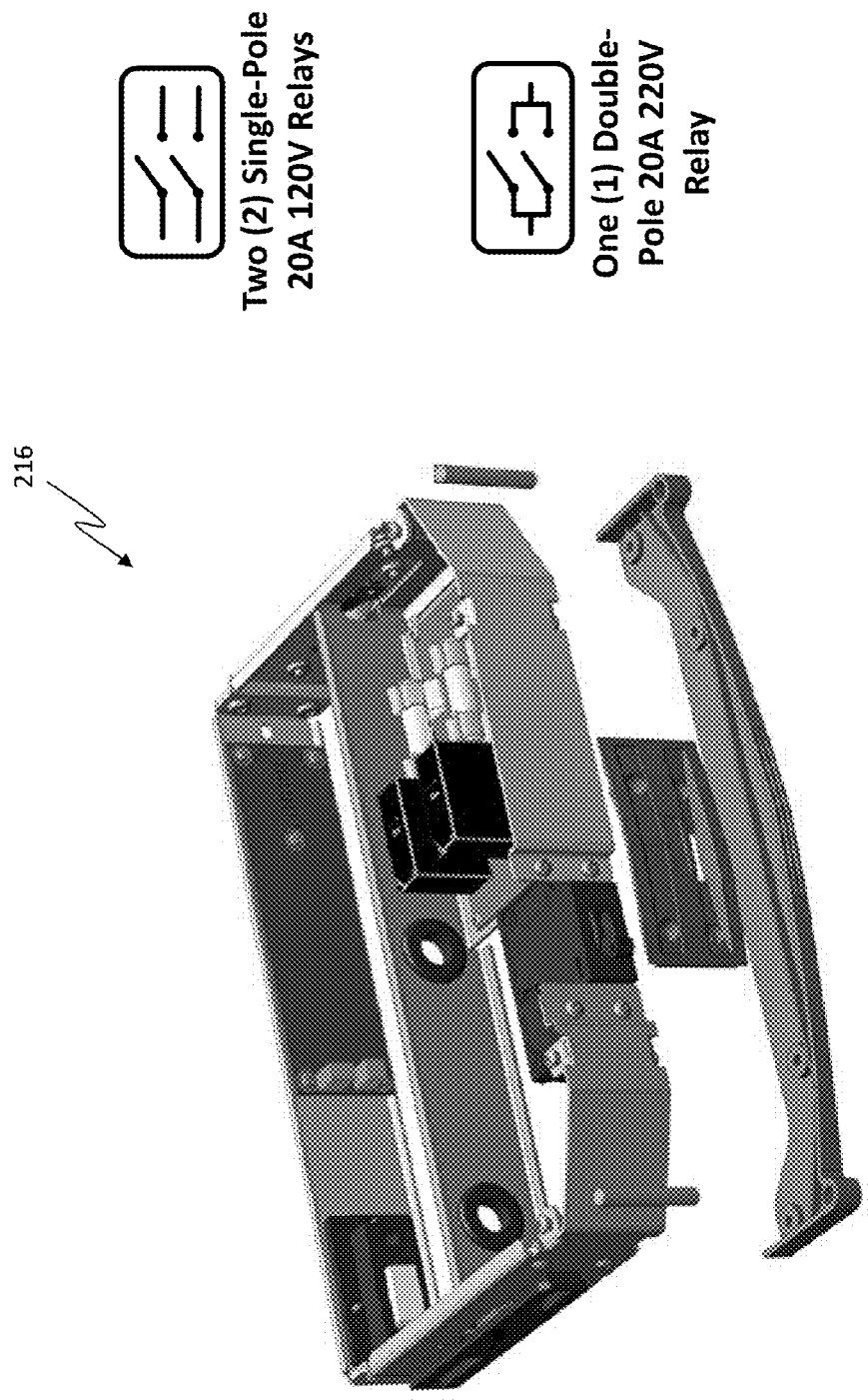
FIG. 9 is top side isometric view of a relay (single-pole/double-pole) module for use with the MPCS of FIG. 1 illustrating an 'open' design.

Referring to FIG. 7A and FIG. 7B, one embodiment of the module 216 is shown and includes a module housing 220 having a module housing front 222, a module housing rear 224 and module housing sides 225, wherein the module housing front 222, module housing rear 224 and module housing sides 225 define a module housing cavity 227 for containing module components. It should be appreciated that the module components are dependent upon the function of the module 216. For example, in one embodiment referring to FIG. 8 if the module 216 is a dimmer module, then the module 216 may contain dimmer power components (such as two (2) or more SCR 120V 10 A dimmers) as well as dimmer control circuitry. In another embodiment, referring to FIG. 9 if the module 216 is a relay module, then the module 216 may contain single-pole (such as two (2) Single-Pole 20 A 120V relays) or double-pole (such as one (1) Double-Pole 20 A 220V relay) relays as well as relay control circuitry/switches. It is contemplated that the modular power control system (MPCS) 100 may include any mix of different type modules 216. For example, although the MPCS 100 is described herein as using relay and dimmer modules, any type of modules that may be used for power distribution applications (i.e. for architectural, entertainment, etc.) may be used, such as modules that provide power and control of fluorescent ballasts and various other dimming techniques. Also, the modules may be used for power distribution and control to various other types of electronic/electrical equipment. It should be appreciated that the present invention advantageously provides access to all power phases as desired without having to reconfigure the entire system.

Figure 7C:
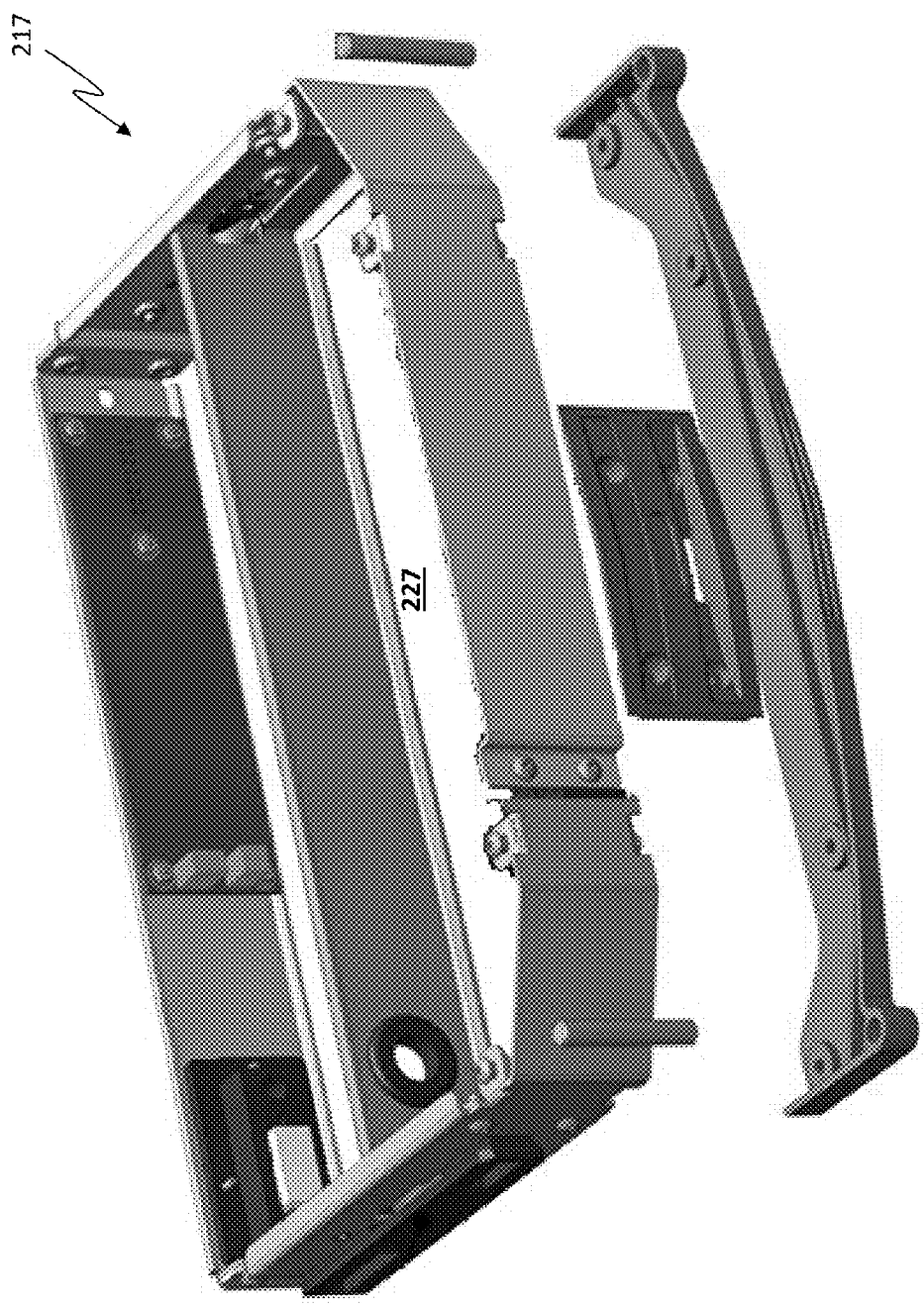
FIG. 7C is top side isometric view of a chimney airflow module for use with the MPCS of FIG. 1.

Additionally, referring to FIG. 7C, it should be appreciated that module 216 may be configured as a chimney airflow module 217, where the module housing cavity 227 is left unpopulated and substantially free of obstruction. The configuration of the chimney airflow module 217 advantageously acts as a flow path guide to direct airflow between the module enclosure bottom 198 and the module enclosure top 196. This is discussed in further detail hereinafter.

Furthermore, the module housing cavity 227 may be divided into a front cavity portion 230 and a rear cavity portion 232. The module housing sides 225 include a side channel guide 234 that is configured (i.e. size and shape) to slidingly and supportingly interact with the module guide channel pair 214, where the side channel guide 234 on one module housing side 225 fits into one of the channels of the module guide channel pair 214 and the side channel guide 234 on the other module housing side 225 fits into the other of the channels of the module guide channel pair 214. It should be appreciated that one (or more) of the side channel guides 234 are sized such that when the side channel guides 234 are contained within the module guide channel pair 214, the resilient member 218 prevents the module 216 from being removed from the module guide channel pair 214. When the resilient member 218 is compressed, the module 216 may be removed from the module guide channel pair 214.

Figure 10:
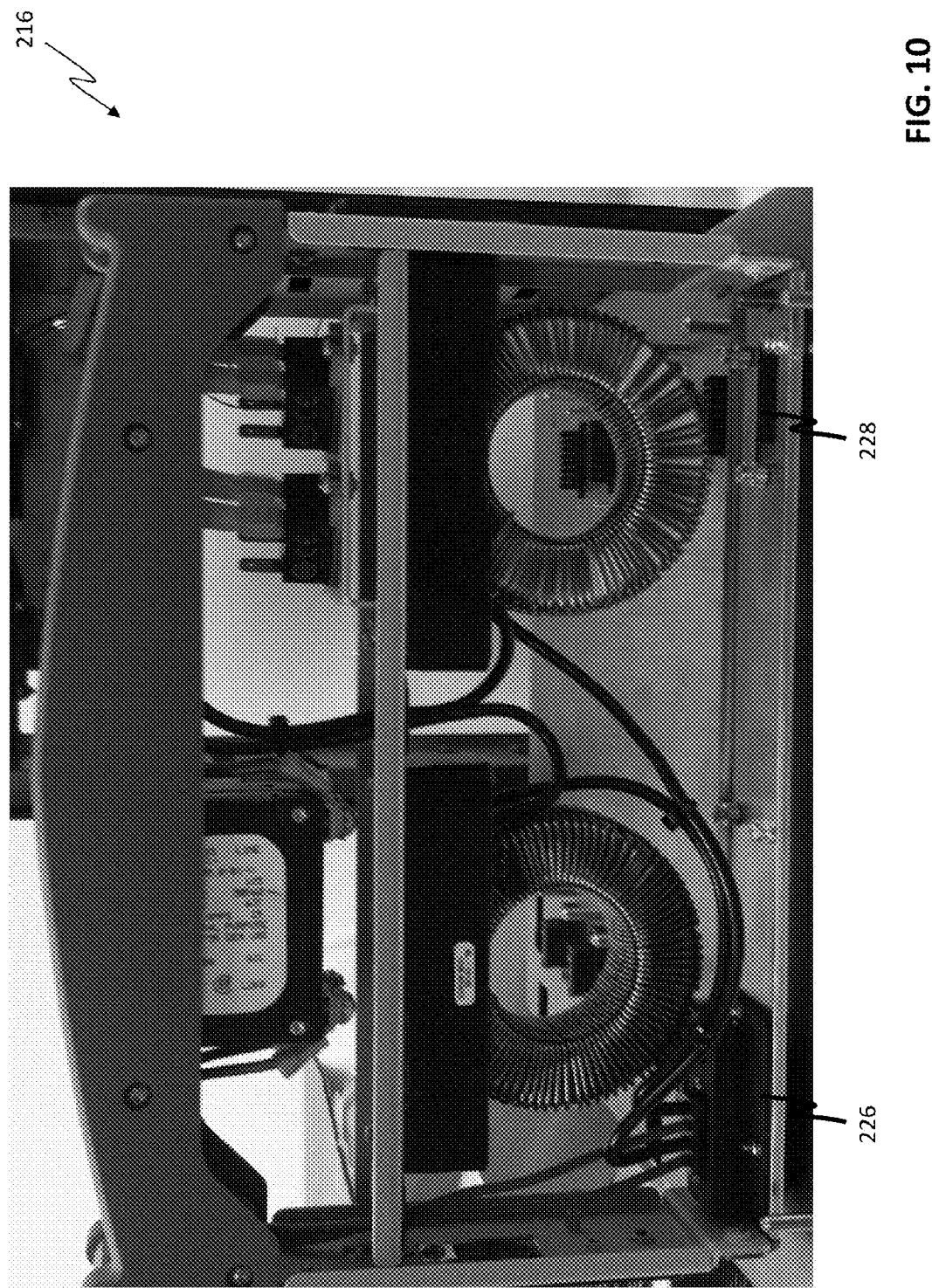
FIG. 10 is bottom up view of one embodiment of a module for use with the MPCS of FIG. 1 illustrating an 'open' design.

Moreover, referring to FIG. 10, the module housing rear 224 includes a module housing power connector 226 for providing input and output phase power to and from the module 216 and a module housing signal connector 228 for providing control signals to and from the module 216. The module housing power connector 226 is configured to mate with a power connector of the plurality of power connectors 166 and the module housing signal connector 228 is configured to mate with a signal connector of the plurality of signal connectors 168. As discussed further hereinafter, in one embodiment there is a power connector 166 and a signal connector 168 for each of the modules 216 and the power connector 166 and signal connector 168 are located on the base enclosure door front 126, such that when the module 216 is located within the module enclosure 106, the power connector 166 is mated to and connected with the module housing power connector 226 and the signal connector 168 is mated to and connected with the module housing signal connector 228.

It should be appreciated one advantage of the present invention involves the physical distribution of the phases (Phase A, Phase B, Phase C) to the power connectors 166 (See FIG. 4A-FIG. 4D) which advantageously allows availability of and access to multiple phases for applications (via the module 216) that use single or multiple phases (for example, single-pole or double-pole devices). Accordingly, while the invention is discussed herein as being used with dimmers and relays, a module of any functionality that incorporates single-pole or double-pole devices can be used with the present invention.

Figure 11:
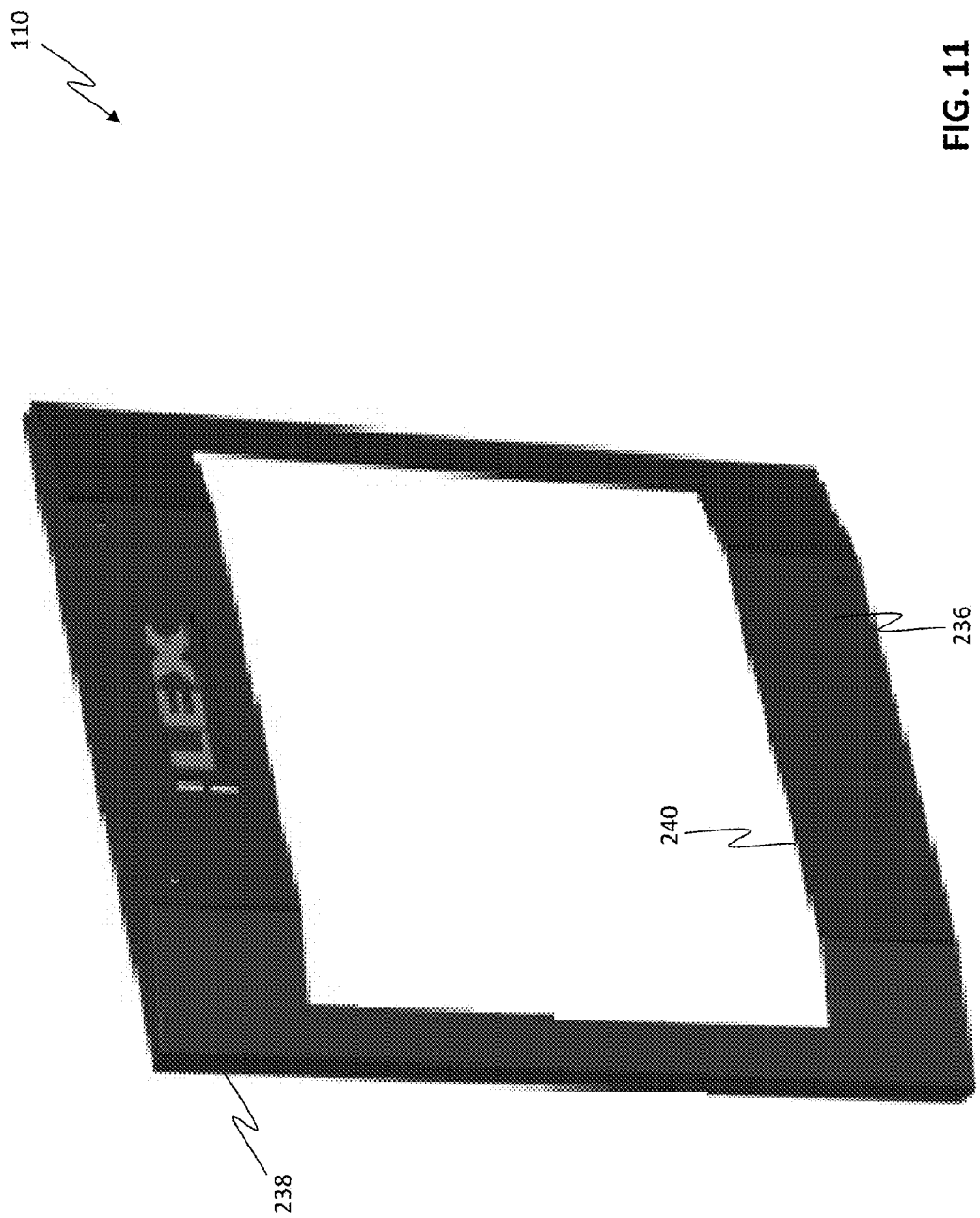
FIG. 11 is a top side isometric view of the module enclosure front panel of the MPCS of FIG. 1.

Referring to FIG. 11, the module enclosure front panel 110 is shown and includes a module enclosure front panel front 236, a module enclosure front panel rear 238 and a module enclosure front panel opening 240. The module enclosure front panel 110 is configured to securely associate with the module enclosure front 192 such that when modules 216 are located within the module enclosure 106 (i.e. within the module guide channel pairs 214) the module housing front 222 is accessible to allow circuit breaker switches to be turned on and off.

Figure 12:
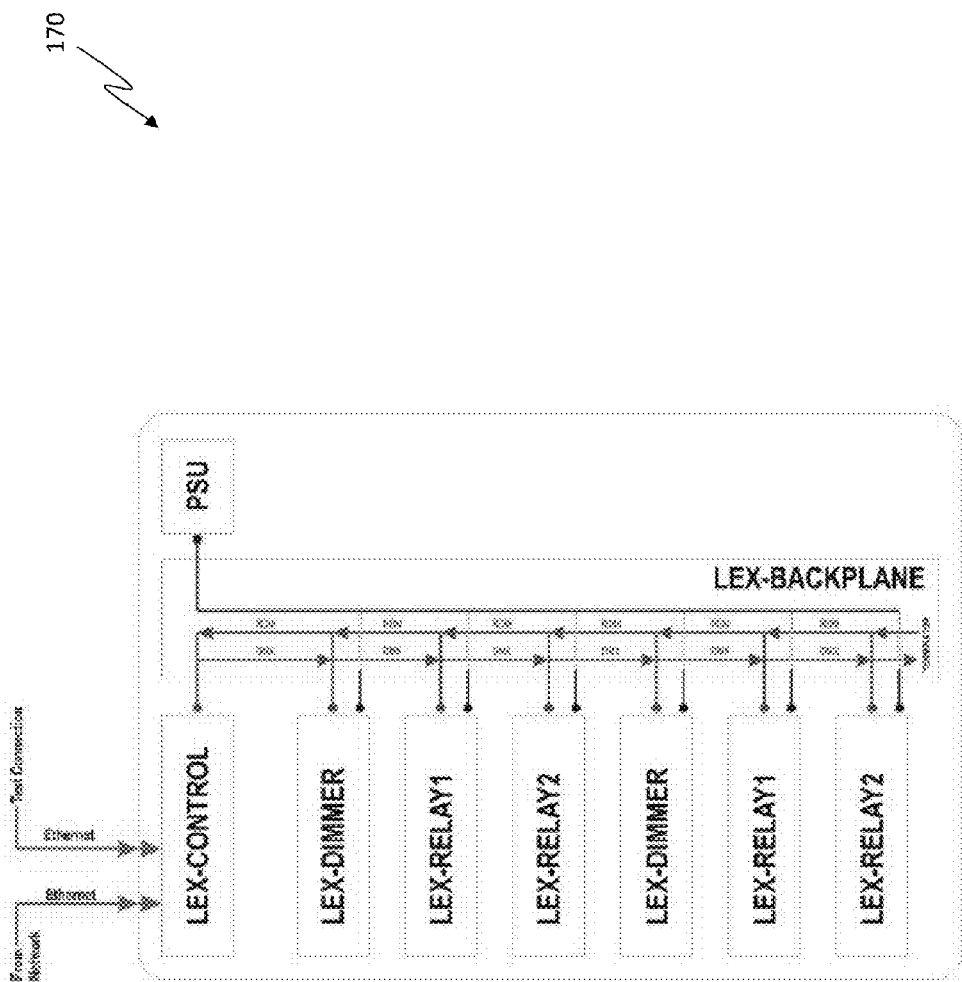
FIG. 12 is block diagram illustrating one embodiment of the PCB Backplane configured for Ethernet capability for use with the MPCS of FIG. 1.
Figure 13:
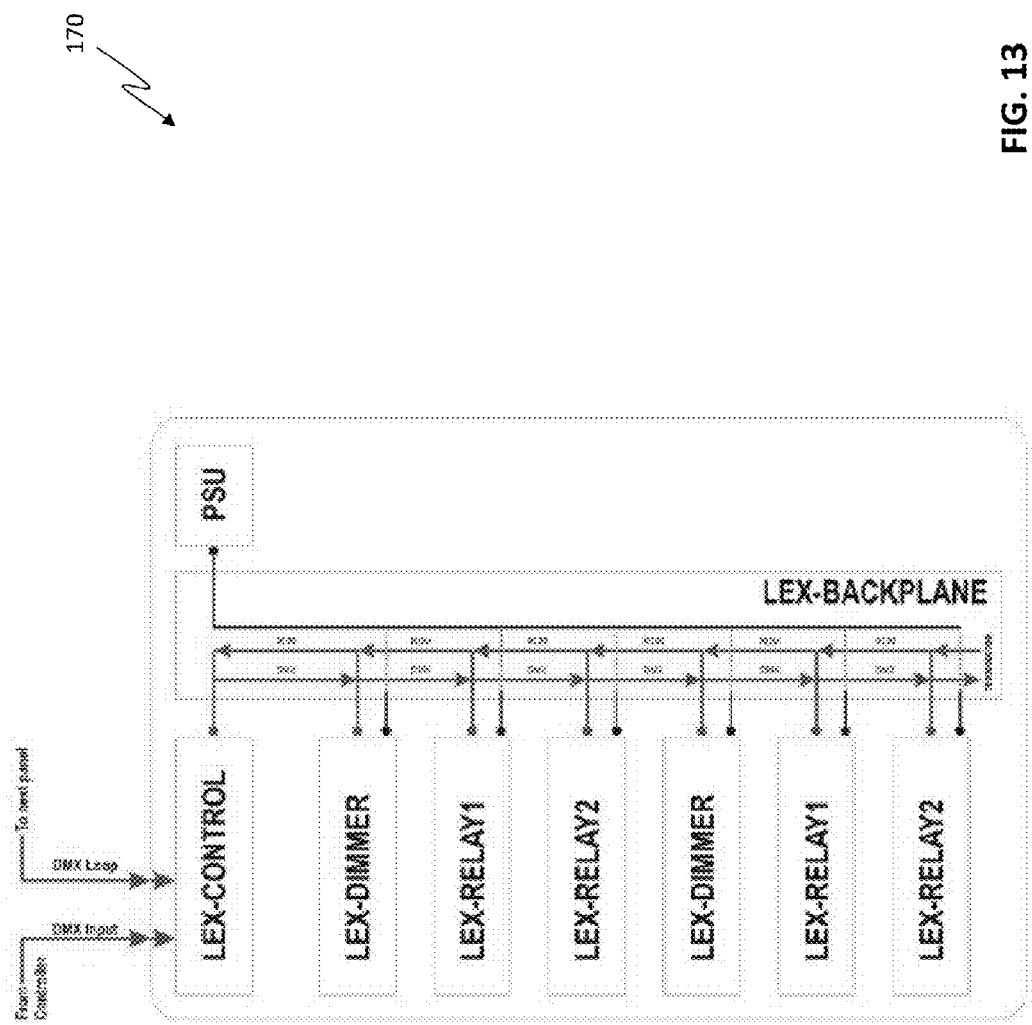
FIG. 13 is block diagram illustrating another embodiment of the PCB Backplane configured for DMX capability for use with the MPCS of FIG. 1.
Figure 14:
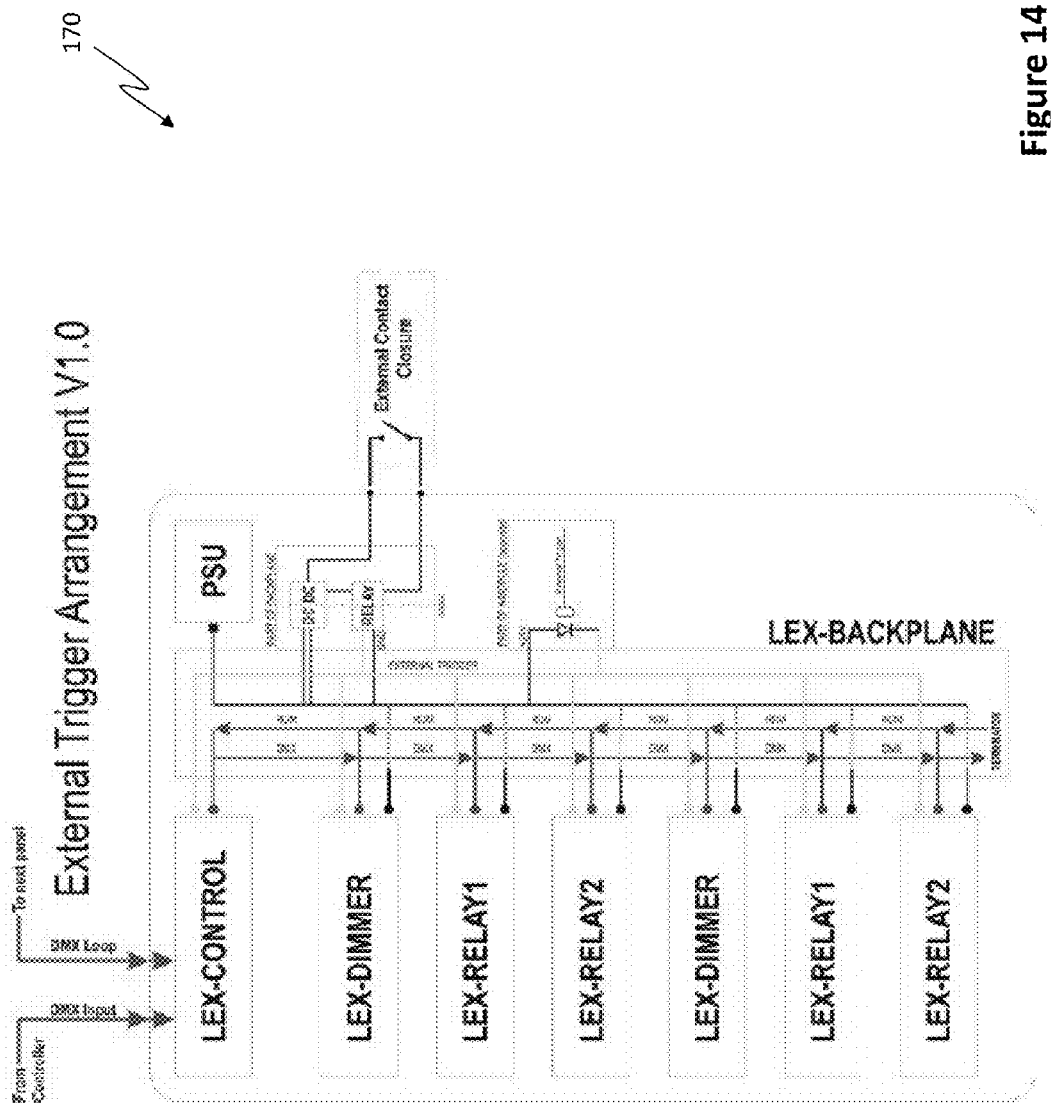
FIG. 14 is block diagram illustrating still yet another embodiment of the PCB Backplane configured for DMX capability for use with the MPCS of FIG. 1.

It should be appreciated that the PCB Backplane 170 may be a modular PCB that includes circuitry to connect the Modules 216 together and to supply power and to provide DMX/RDM and external control trigger capabilities. Referring to FIG. 12, one embodiment of the PCB Backplane 170 which is configured for use with network capability (sACN and ArtNET) is shown. Referring to FIG. 13, another embodiment of the PCB Backplane 170 which is configured for use with DMX/RDM ("daisy chain") capability is shown. Referring to FIG. 14, still yet another embodiment of the PCB Backplane 170 which is configured for use with DMX/RDM and External Trigger Arrangement capability is shown. Additionally, other PCB Backplanes may be used that are configured for use with sACN and ArtNET protocols.

Accordingly, the present invention allows for multiple levels of control. For example, in one configuration control may be accomplished using Streaming ACN or ArtNet and provides a full range of feedback and control abilities, such as providing amperage, temperature and lamp hours and the ability to check the status of any channel in any module in any panel in the system. In another configuration control may be provided using DMX or RDM and may provide the ability to check the status of any channel 'downstream' of the plug-in point. Additionally, all of the modules/devices used in the MPCS 100 may be UL924-compliant devices.

In accordance with one embodiment of the present invention, the MPCS 100 (which may a self support structure or may be mounted to a structure) may be assembled as follows. The base enclosure 102 is obtained and the power supply 152, Power Phase input terminals 154, 156, 158, power output distribution block 160, neutral terminal 164 and ground terminal 162 are secured within the base enclosure cavity 122. This may be accomplished via any method suitable to the desired end purpose such as screws, adhesive, clips, etc. Three-phase power conductors are introduced into the base enclosure cavity 122 via an opening (not shown) where the Phase A conductor is connected to the Phase A input terminal 154, the Phase B conductor is connected to the Phase B input terminal 156 and the Phase C conductor is connected to the Phase C input terminal 158. Additionally, the neutral conductor of the input power is connected to the neutral terminal 164 and the ground conductor of the input power is connected to the ground terminal 162. The power supply may be powered by the input power by connecting the power lead of the power supply to one of the Phase input terminals 154, 156, 158. Additionally, the base enclosure door 104 is obtained and the plurality of power connectors 166 (where the number of power connectors 166 being used is dependent upon the number of modules the system can accommodate) are secured to the base enclosure door 104 such that the mating portion of the power connectors are protruding through the plurality of power connector openings 140 such that the mating portion of the power connectors are accessible via the base enclosure door front 126. The PCB Backplane 170 is connected to the base enclosure door 104 to be located within the base enclosure door cavity 136 such that the plurality of signal connectors 168 are protruding from the plurality of signal connector openings 142.

The base enclosure door 104 is connected to the base enclosure 102 (such that the base enclosure opening 124 is proximate to the base enclosure door opening 138) via a hinge 144 which allows the base enclosure door 104 to rotate between a closed configuration (where the base enclosure door 104 covers and encloses the base enclosure cavity 122) and an open configuration (where the base enclosure door 104 is rotated away from the base enclosure 102). A locking device (not shown) may be provided to secure and/or lock the base enclosure door 104 in the closed configuration to limit and/or prevent access to the base enclosure cavity 122 for safety and/or security purposes. It should be appreciated that the locking device may be any type of locking device suitable to the desired end purpose, such as a lock/catch combination or the locking device may simply be one or more screws that secure the base enclosure door 104 to the base enclosure 102. The power phases at each of the Phase input terminals 154, 156, 158 are then connected to the power input pins of the power connectors 166 to be configured as shown in FIG. 4B, FIG. 4C and FIG. 4D and the output pins of the power connectors 166 are connected to the power output distribution block 160. Moreover, the power from the power supply 152 is connected to the PCB Backplane 170. The base enclosure door 104 is then configured into the closed configuration to enclose and isolate the base enclosure cavity 122 and the base enclosure door cavity 136 from the external environment. This configuration advantageously secures the base enclosure cavity 122 and the base enclosure door cavity 136 from unwanted access but also provides a high degree of safety by preventing unintended contact with high power components.

The module enclosure 106 is securely mounted to the base enclosure door 104 such that that the module enclosure rear opening 204 is adjacent the base enclosure door front 126. Guide pins may be provided on the on the base enclosure door front 126 and guide holes may be provided on the module enclosure rear 194 to help position the module enclosure 106 for mounting. It should be appreciated that the module enclosure rear opening 204 allows access to the plurality of power connectors 166 and plurality of signal connectors 168 via the module enclosure front opening 206. The module enclosure internal support 108 is located within the module enclosure cavity 202 and mounted to the module enclosure sides 200 and/or module enclosure rear 194. The module enclosure 106 may be secured to the base enclosure door 104 and the module enclosure internal support 108 may be secured to the module enclosure 106 via any device or method suitable to the desired end purpose, such as screws, clips, adhesive, etc. It should be appreciated that the design of the module enclosure 106 and module enclosure internal support 108 allow for the module enclosure cavity 202 to be substantially open. It should be further appreciated that one or more airflow fans 242 (powered by the power supply 152) may be mounted (via screw, clip, adhesive, etc.) on the module enclosure bottom 198 under the modules 216 and vent openings 244 may be included on the module enclosure top 196. Additionally, it should be appreciated that the chimney airflow module 217 may be associated with the module enclosure internal support 108 to be located proximate the module enclosure bottom 198.

Figure 15:
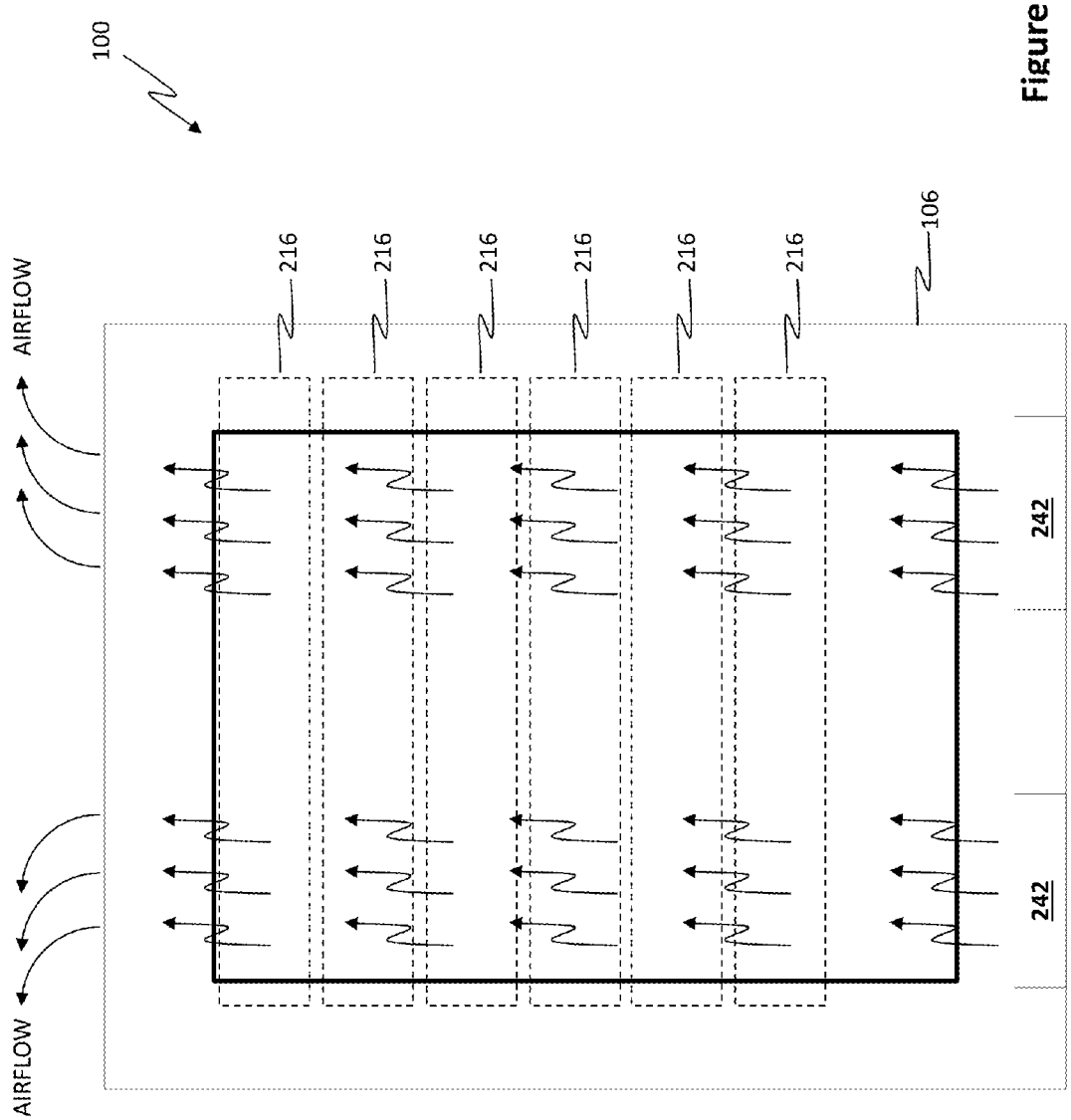
FIG. 15 is front view of the module enclosure of FIG. 1 illustrating airflow within the module enclosure cavity.
Figure 17:
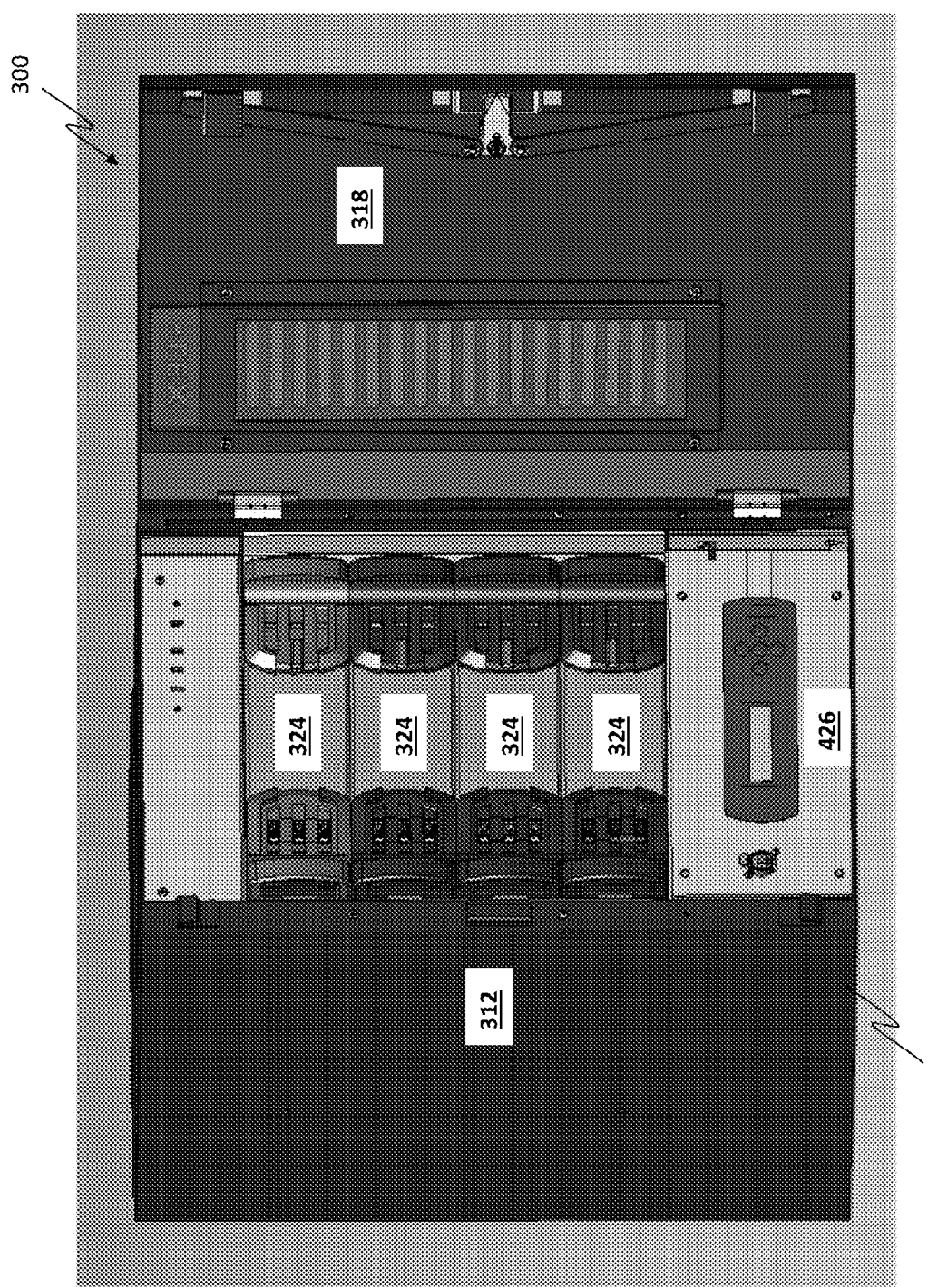
FIG. 17 is a front side view of a Modular Power Control System (MPCS), in accordance with another embodiment of the invention.
Figure 18:
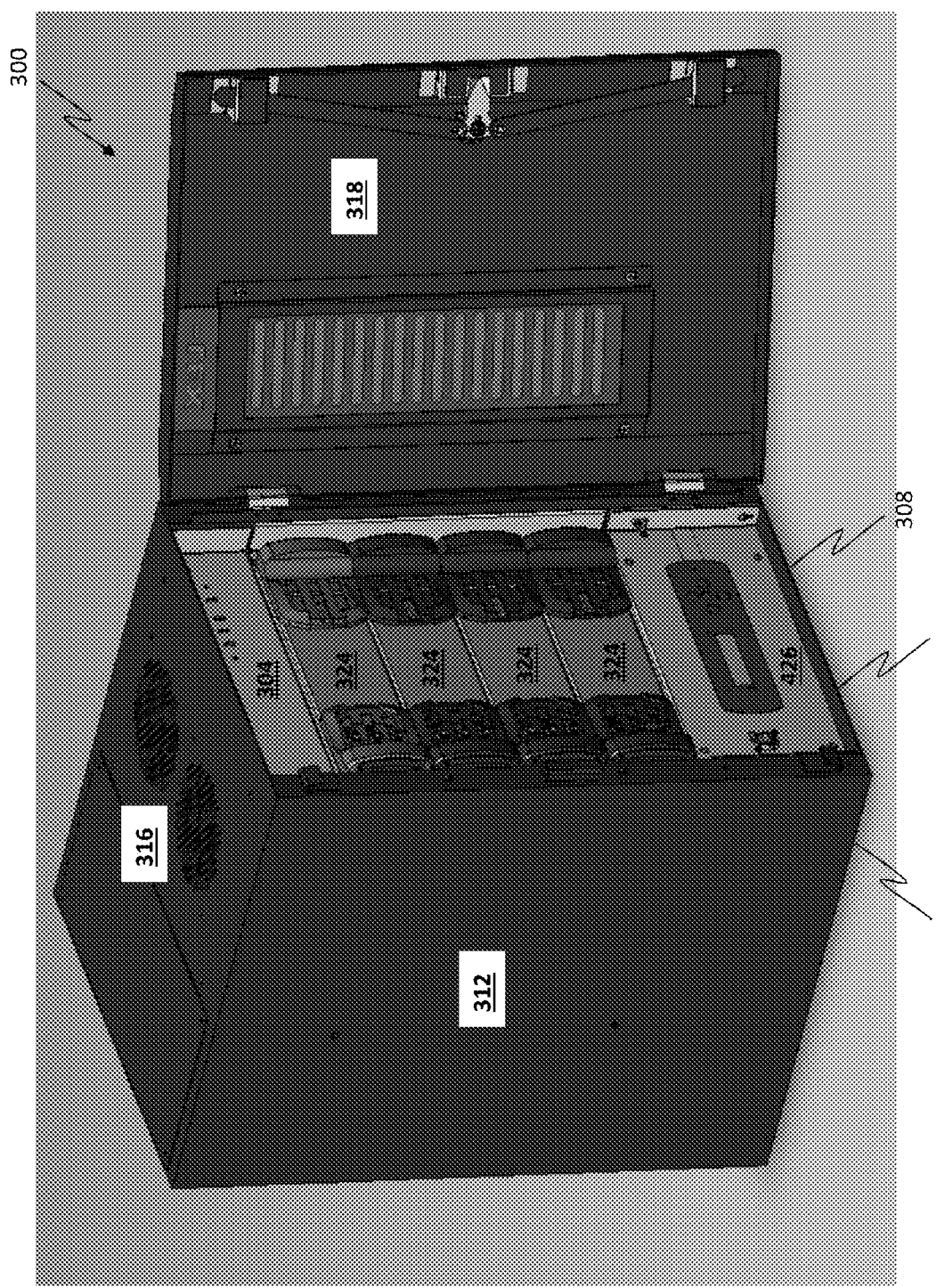
FIG. 18 is a top front side view of the MPCS of FIG. 17.
Figure 19:
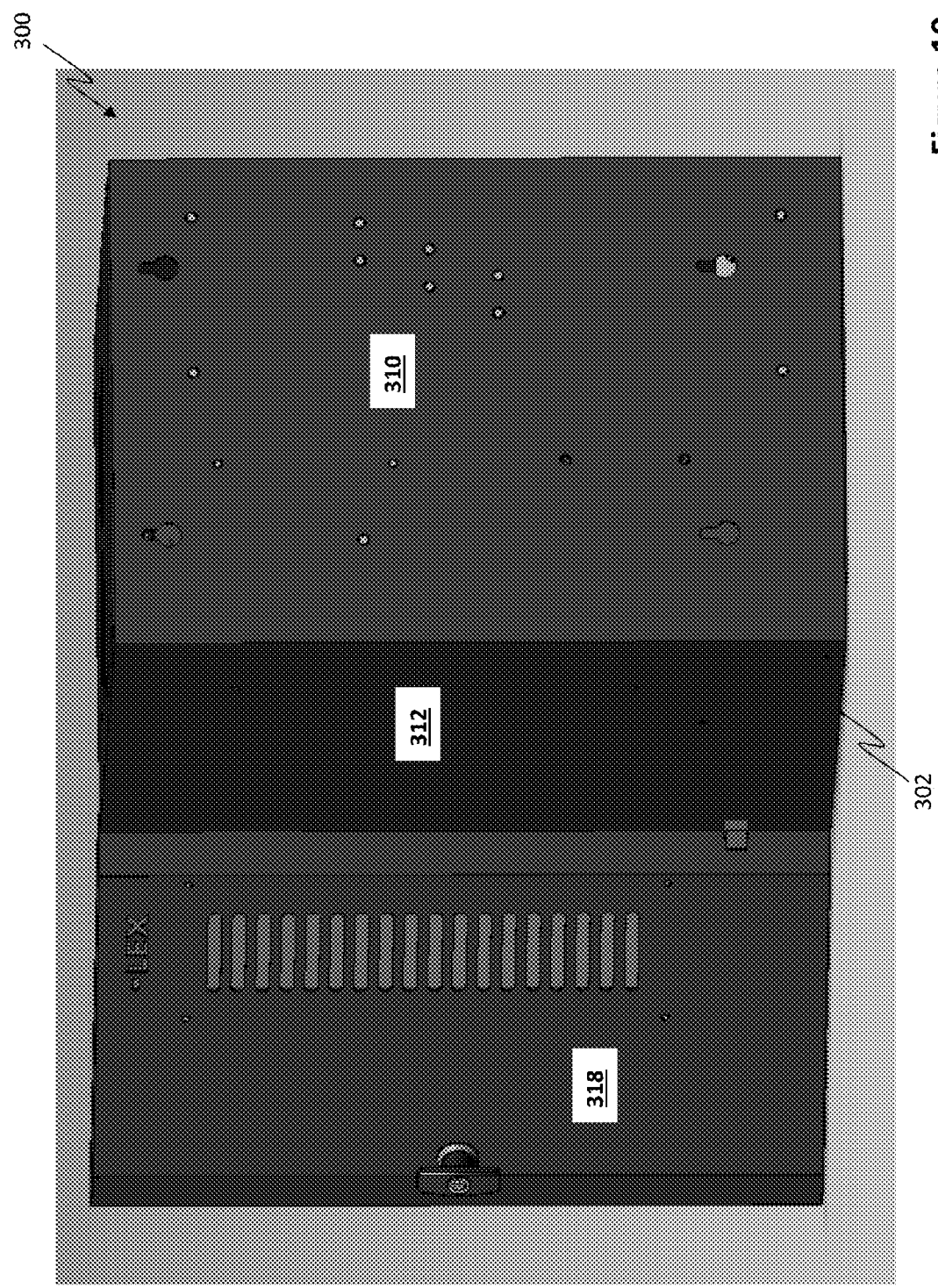
FIG. 19 is rear view of the MPCS of FIG. 17.

Referring to FIG. 15, this configuration advantageously creates and functions as a "heat chimney" within the module enclosure, with the chimney airflow module 217 directing the air flow from the airflow fans 242 upward toward the modules 216 and out of the vent openings 244. Additionally, the modules 216 are configured as an 'open' design (See FIG. 7A) where the top and bottom of the module 216 is open (or includes openings) to accommodate airflow through the module 216 to flow between the top of the module 216 and the bottom of the module 216. This advantageously allows the airflow to contact the components within the module 216 and thus any heat generated from the module component is directed up and out of the module enclosure 106 via the vent openings 244. It should be appreciated that the Modular Power Control System (MPCS) 100 may or may not include (one or more) chimney airflow modules 217 as desired. For example, in a Modular Power Control System (MPCS) 100 which is filled with modules 216 a chimney airflow module 217 may not be used. Moreover, in a Modular Power Control System (MPCS) 100 which is not completely filled with modules 216, the empty module locations may be kept empty as desired.

At this point, one or more modules 216 may be located within the module enclosure 106 by inserting the side channel guides 234 of the module 216 within the module guide channel pairs 214 and sliding the module 216 along the module guide channel 214 toward the back of the module enclosure cavity 202. As the module 216 approaches the back of the module enclosure cavity 202, the module housing power connector 226 and the module housing signal connector 228 contact the power connector 166 and signal connector 168, respectively and mate together such that the power and signal leads from the module housing power connector 226 is connected to the power connector 166 and such that the module housing signal connector 228 is connected to the signal connector 168. This advantageously provides power and signal connection between the module 216 and the base enclosure 102.

Accordingly, when the airflow fans 242 are activated, the air flow path is directed upward toward the vent openings 244. As discussed above the chimney airflow module 217 may be used to further direct the airflow to the modules 216. This advantageously creates and operates as a "heat chimney" directing the airflow over the module component and directing heat from the modules components up and out of the vent openings 244.

In accordance with one embodiment of the present invention, a method for reducing heat within a module enclosure is provided and includes creating and/or receiving an airflow into the enclosure, directing the airflow through the enclosure such that the airflow is at least partially incident on at least one of the heat generating and/or non-heat generating components and directing the airflow out of the enclosure, where the airflow may be created/directed using active methods (i.e. fans) and/or passive methods (guides).

It should be appreciated that the enclosure proportions may be based on airflow and/or Ampacity requirements. This advantageously allows for the enclosures to be reduced in size. For example, FIG. 16 shows one embodiment of different sizes for an MPCS 100 relative to Ampacity with varying number of modules. Additionally, the configuration of the present invention advantageously provides a degree of isolation between the internal components of the MPCS 100 and the external environment, resulting in a safer system and reducing/eliminating the introduction of dust and other debris into the MPCS 100. Furthermore, the fan(s) 242 may be operated on a continuous basis (no on/off noise transitioning) to advantageously allow the MPCS 100 to be used in noise sensitive environments. Moreover, the communication ability of the modules may allow the modules 216 to have the ability to report operational characteristics. For example, the module may be configured to report the temperature and amperage present at each channel. Or the module may be configured to check amperage, temperature or lamp hours of any other module from anywhere in the system. Also, modules may have zero-cross sensing to prevent arcing and extend the life of all the relays, whether they are single, double or dimming.

Additionally, it is contemplated that multiple MPCS's 100 may be connected together to create a larger control array. Furthermore, the design of the MPCS 100 allows modules with single-pole devices and modules with double-pole devices to be used in the same system. Also, the design allows modules to be stacked in numerical order (if desired) and do not require balancing.

It should be appreciated that although the MPCS 100 of the present invention is discussed herein as having six (6) modules, the MPCS 100 of the present invention is preferably configured to accommodate any number of modules (in multiples of three (3)) suitable to the desired end result, such as 3, 6, 9, 12 or 15 modules. This is because the power phases (Phase A, Phase B, Phase C) are distributed across three (3) of the power connectors 166. For example, as discussed hereinabove, the first power connector 180 provides a connection to power Phase A and power Phase B, the second power connector 182 provides a connection to power Phase C and power Phase A and the third power connector 184 provides a connection to power Phase B and power Phase C. Accordingly, this configuration advantageously helps to ensure that the loads connected to the power phases are as balanced as possible across all three (3) phases (Phase A, Phase B, Phase C). It should be appreciated that in the above configuration the power phase-connector pattern (A-B, C-A, B-C) may be repeated every third power connector 166. However, it should be appreciated that although the modules are discussed herein as being in groups of three (3, 6, 9, 12, 15, 18, etc. . . . ) for load balancing purposes, any number of modules may be used as desired, such as 4, 5, 7, etc. . . . . In this case, the system would operate, but would be unbalanced and thus less stable.

Referring to FIGS. 17-22, a Modular Power Control System (MPCS) 300 is shown in accordance with another embodiment and includes a system enclosure 302 defining an enclosure cavity 304 and having an enclosure front 306 defining a front opening 308 communicated with the enclosure cavity 304. The system enclosure 302 includes an enclosure rear 310, enclosure sides 312, enclosure bottom 314 and an enclosure top 316. The system enclosure 302 further includes an enclosure door 318 which is attached to at least one of the enclosure front 304 and/or enclosure side 312, where the enclosure door 318 is configurable (for example by rotating) to cover and/or uncover the front opening 308 to allow or prevent access to the enclosure cavity 304. Additionally, the MPCS 300 further includes at least one first module internal support 320, at least one second module internal support 322, at least one module 324 and a MPCS controller 426. It should be appreciated that the MPCS 300 is configurable to include one or more modules 324 as desired. Additionally, for each module 324, the MPCS 300 includes one first module internal support slot 321 and one second module internal support slot 323, wherein the first module internal support 320 and one side of the module 324 engage with each other and the second module internal support 322 and the other side of the module 324 engage with each other such that the module 324 is securely and removably contained within the enclosure cavity 304.

Figure 22A:
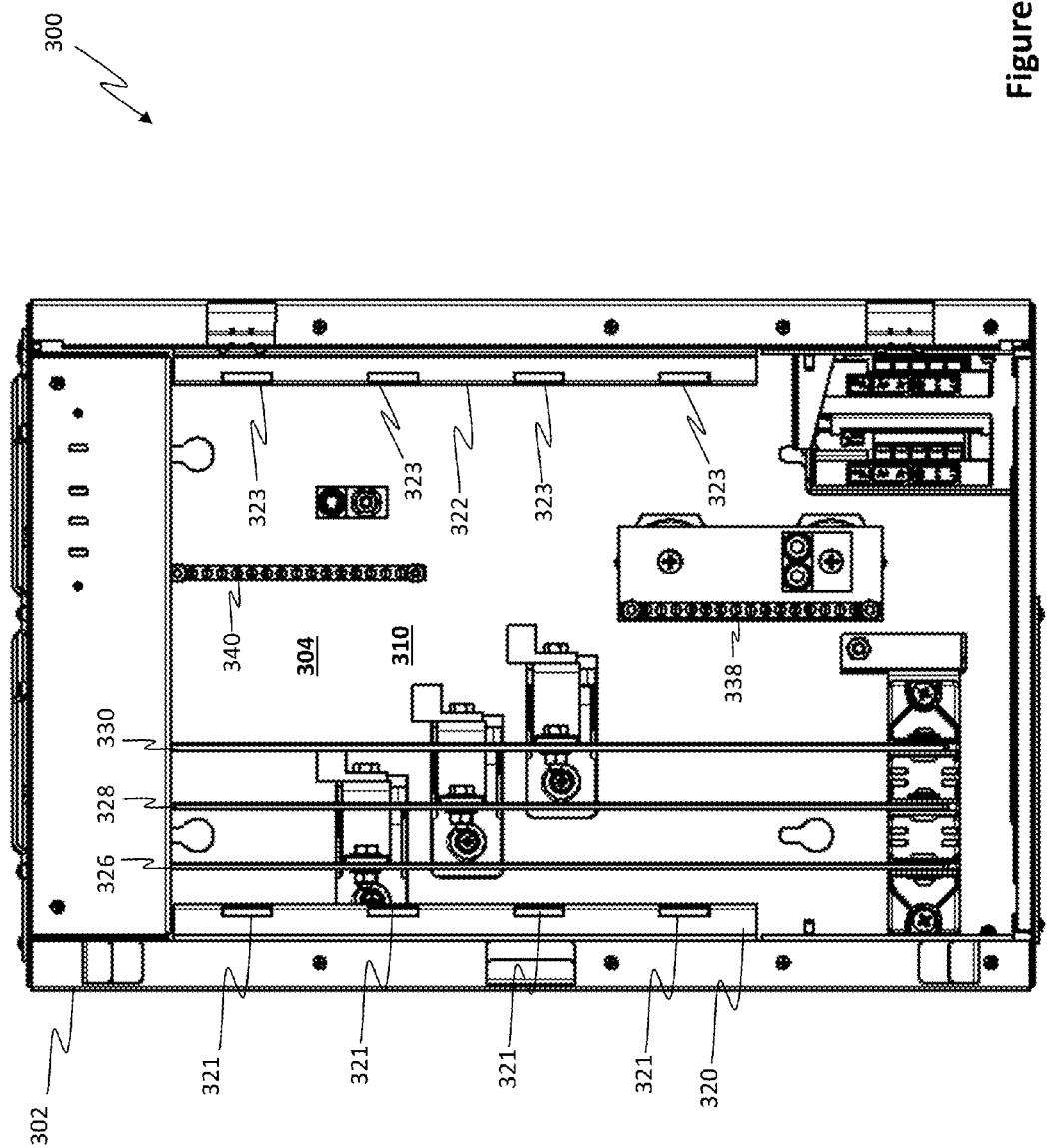
FIG. 22A is a front view of the MPCS of FIG. 17 showing the enclosure cavity.
Figure 23:
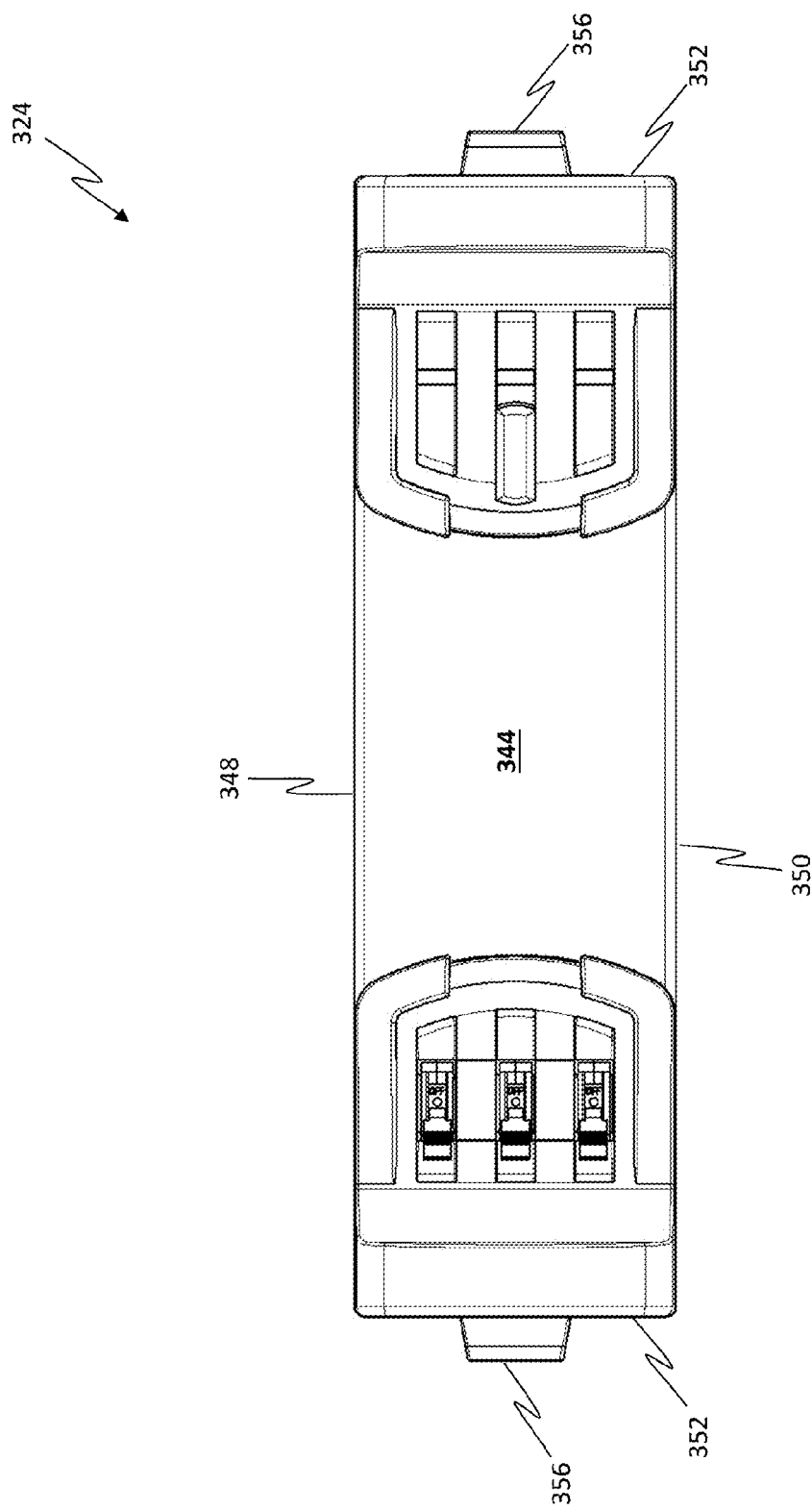
FIG. 23 is a front view of a module for use in the MPCS of FIG. 17, in accordance with one embodiment of the invention.
Figure 24:
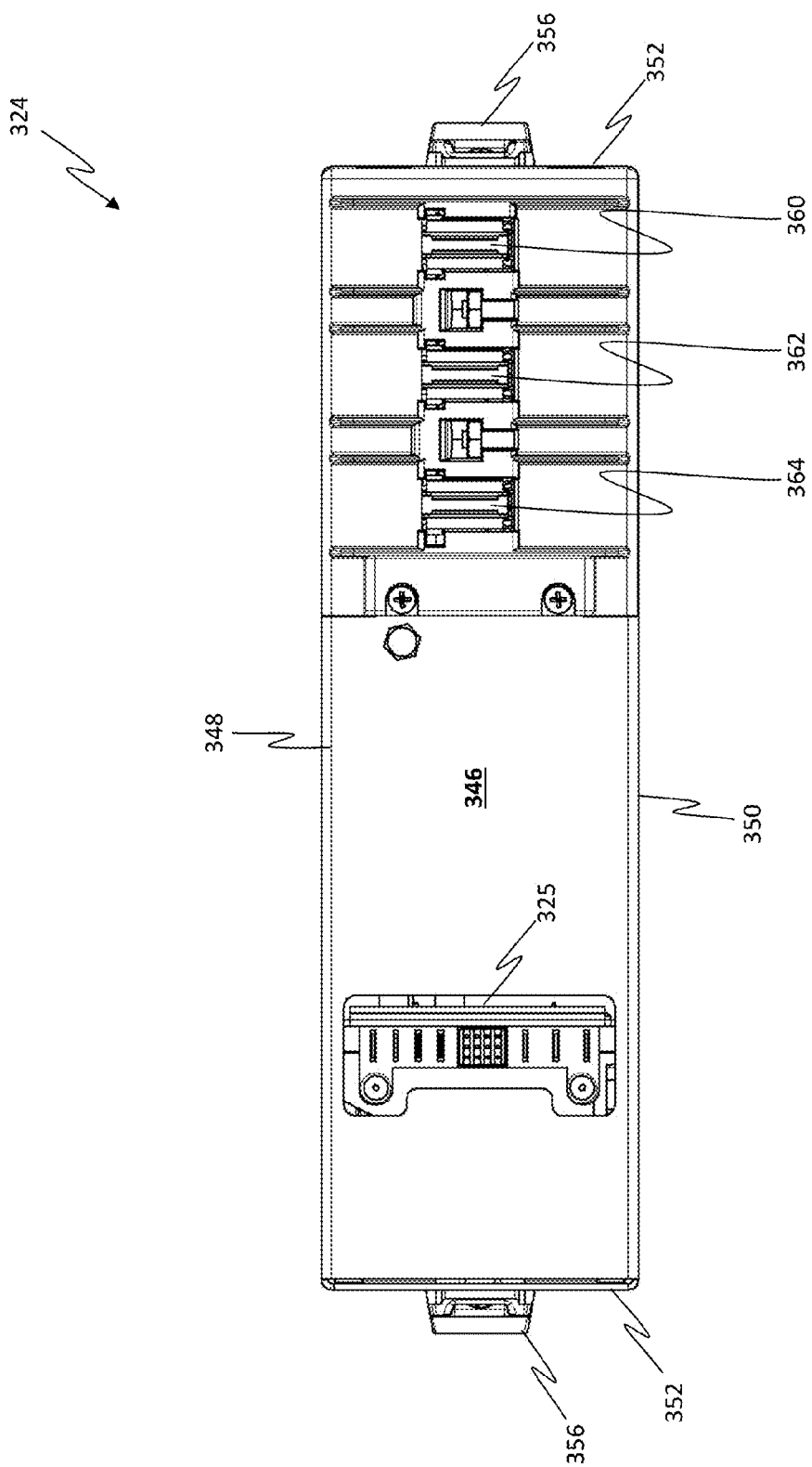
FIG. 24 is a rear view of the module of FIG. 23.
Figure 25:
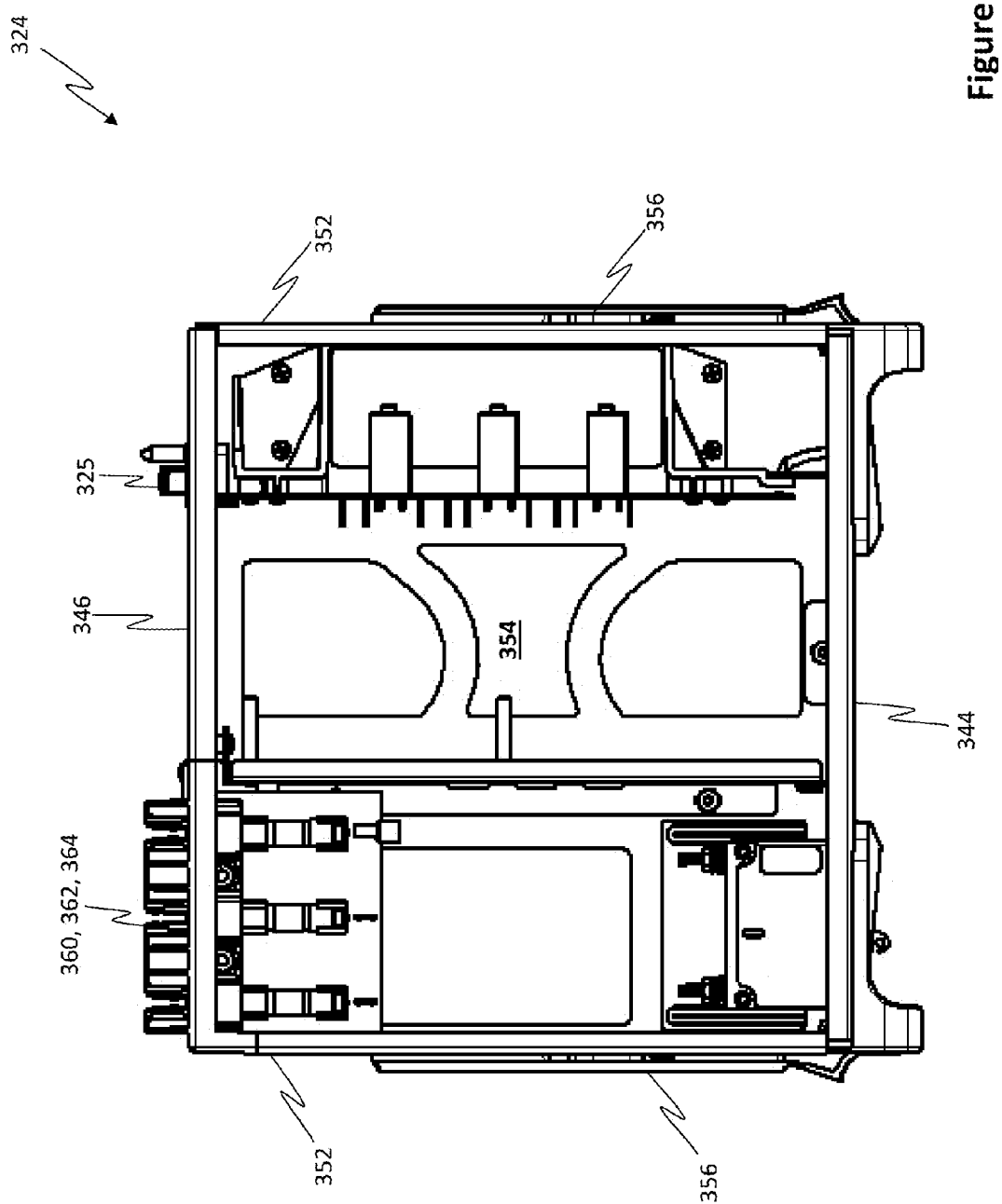
FIG. 25 is a top down view of the module of FIG. 23 illustrating the module cavity.
Figure 26:
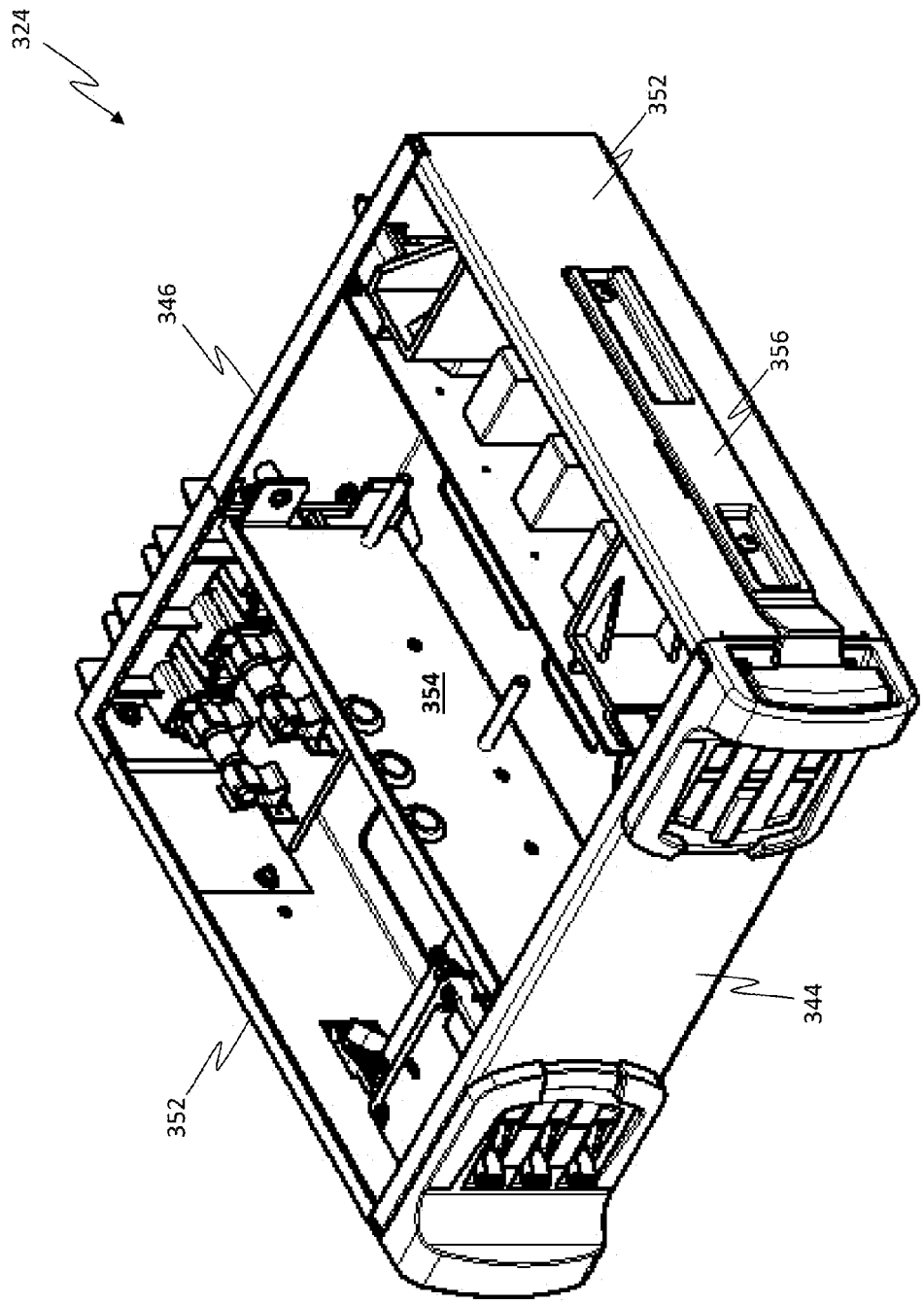
FIG. 26 is a top down perspective view of the module of FIG. 23 illustrating the module cavity.
Figure 27:
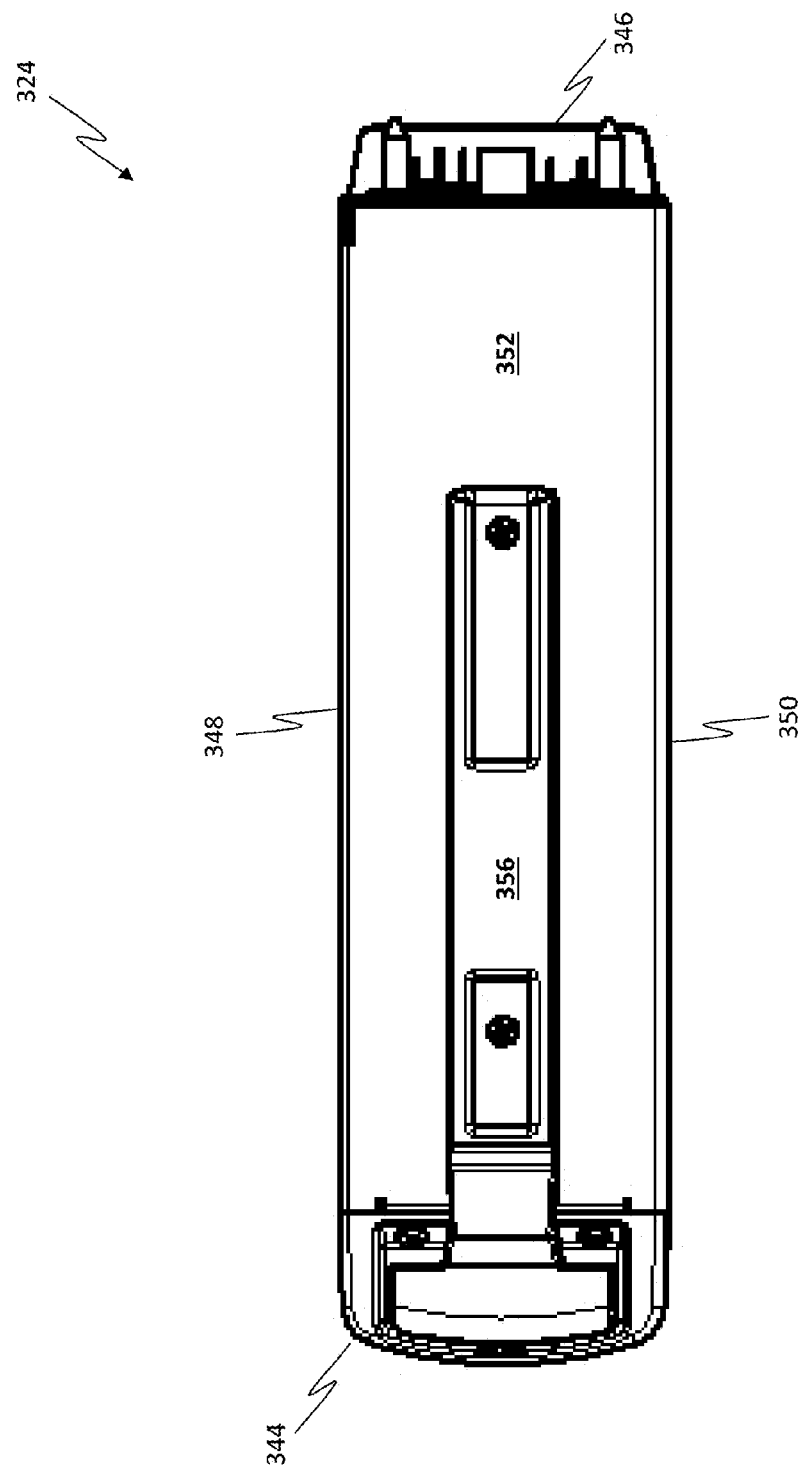
FIG. 27 is a side view of the module of FIG. 23.
Figure 28:
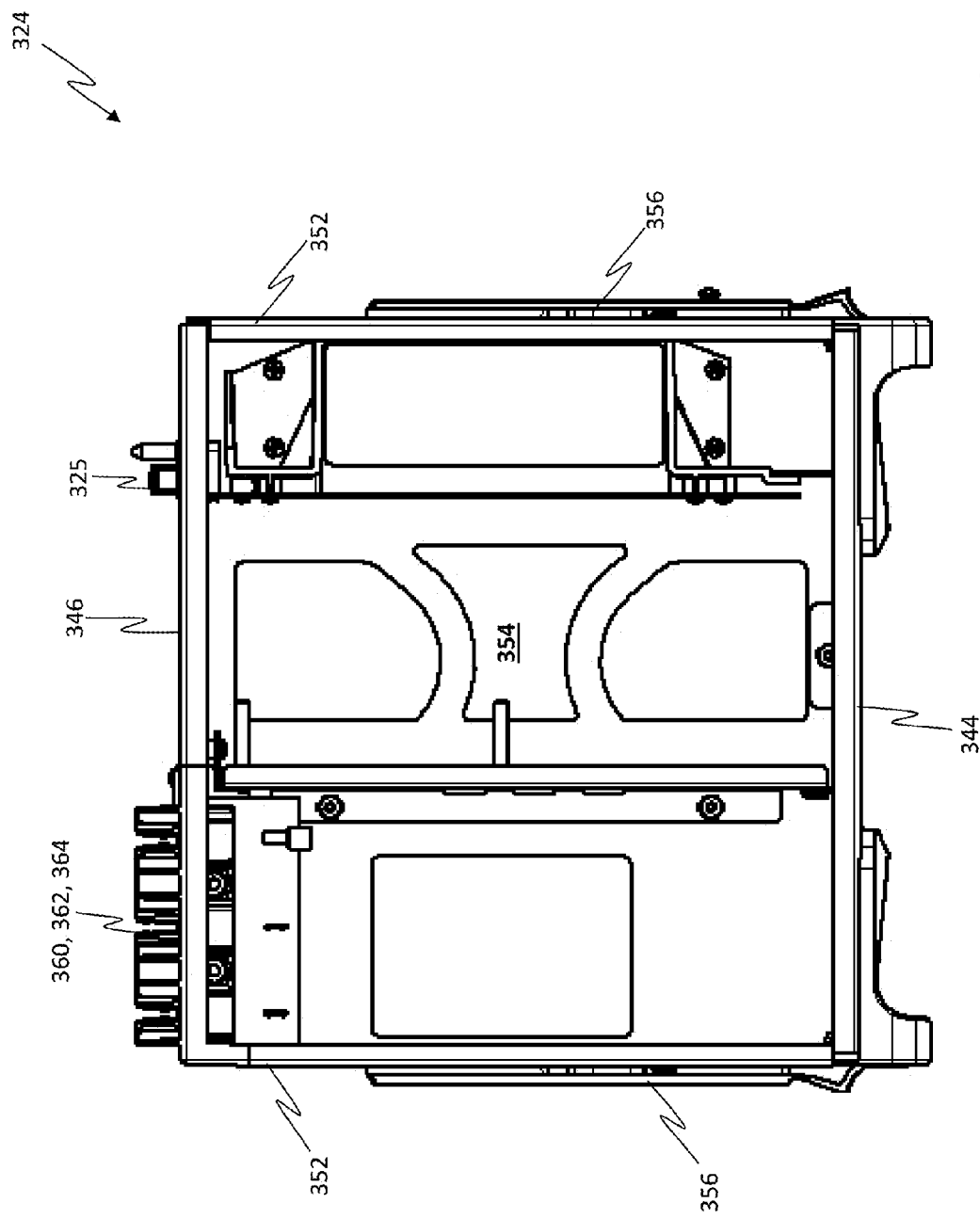
FIG. 28 is a top down view of a module for use in the MPCS of FIG. 17 illustrating the module cavity, in accordance with another embodiment of the invention.
Figure 29:
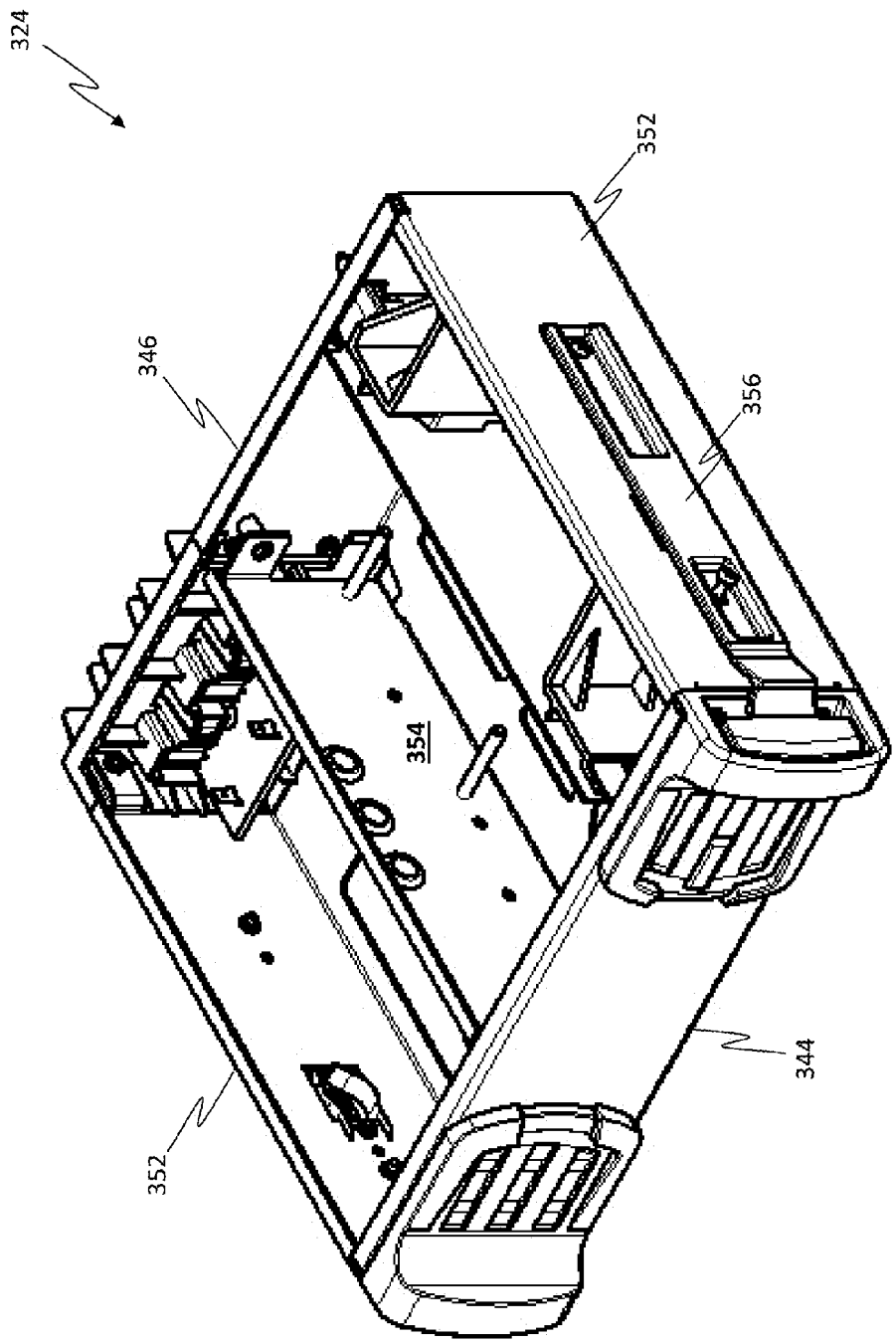
FIG. 29 is a top down perspective view of the module of FIG. 28 illustrating the module cavity.
Figure 30:
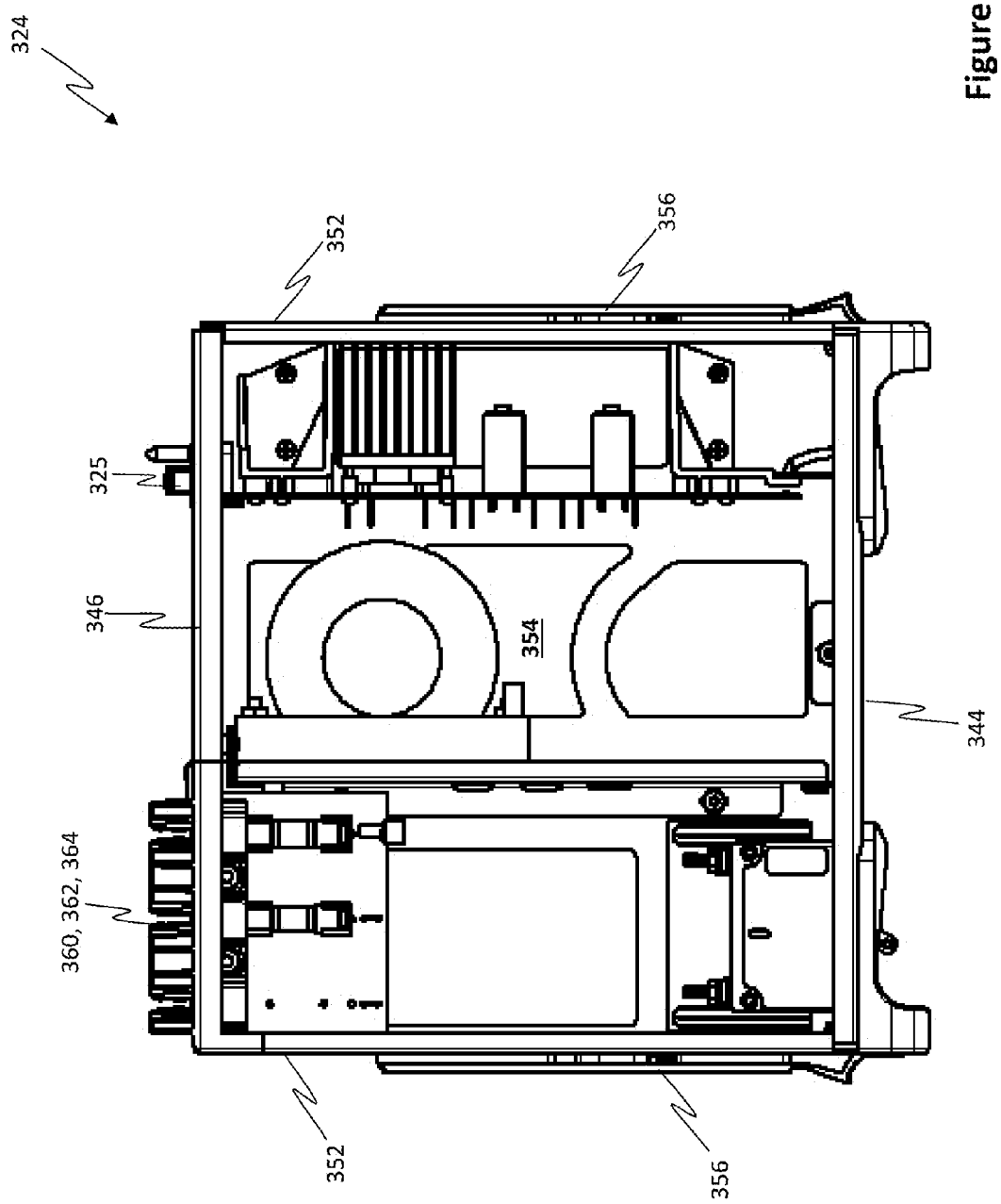
FIG. 30 is a top down view of a module for use in the MPCS of FIG. 17 illustrating the module cavity, in accordance with still yet another embodiment of the invention.
Figure 31:
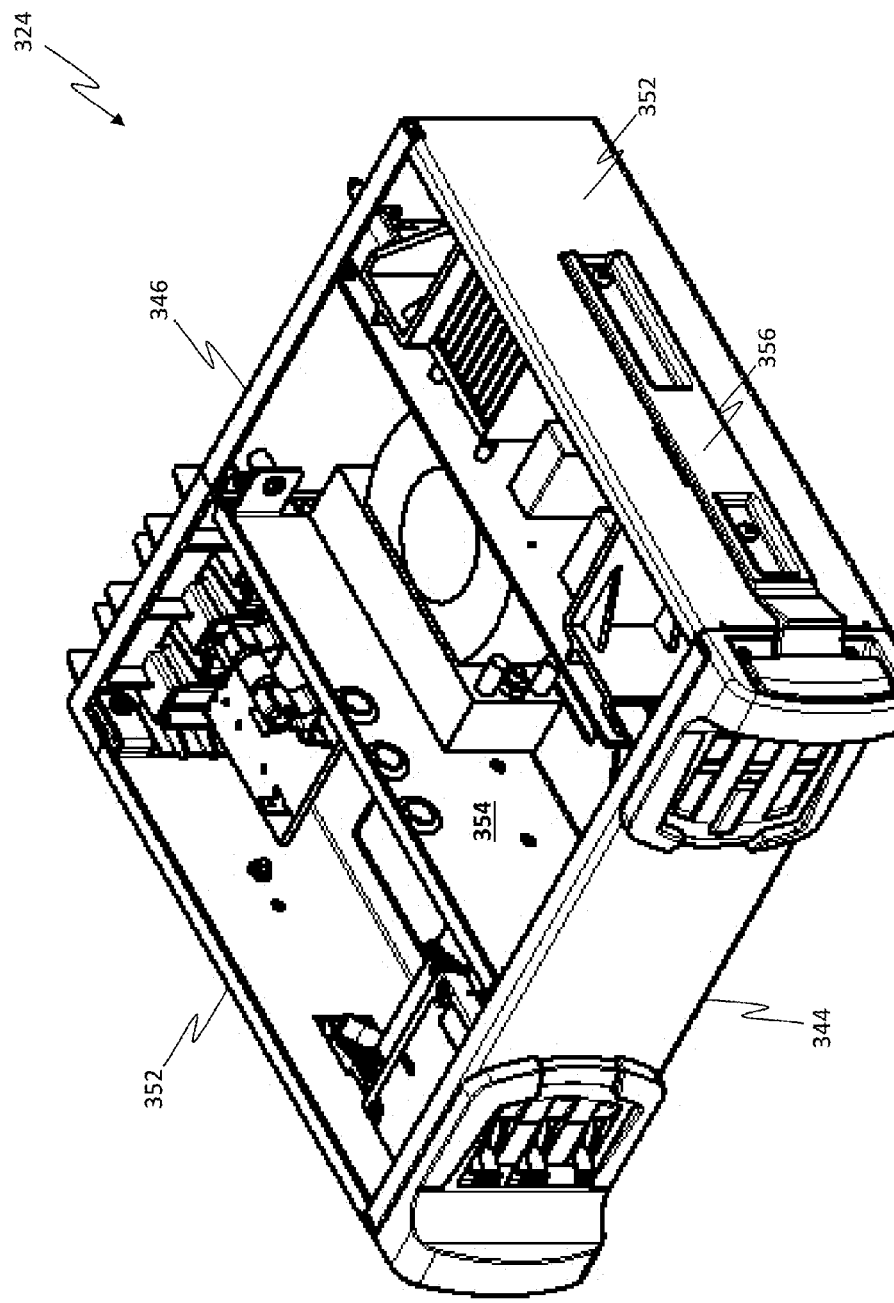
FIG. 31 is a top down perspective view of the module of FIG. 30 illustrating the module cavity.
Figure 32:
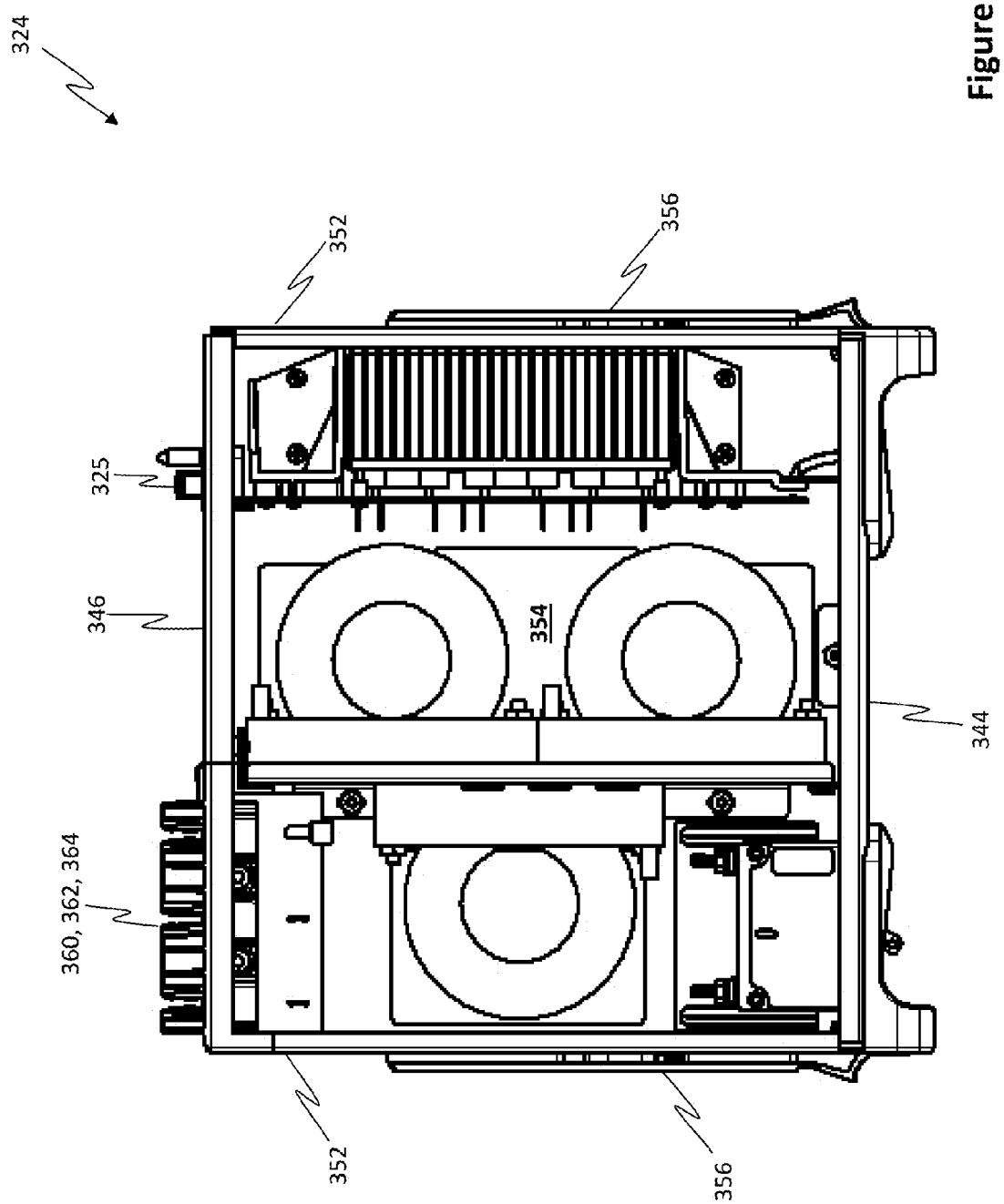
FIG. 32 is a top down view of a module for use in the MPCS of FIG. 17 illustrating the module cavity, in accordance with still yet another embodiment of the invention.

Referring to FIG. 22A and FIG. 22B, the MPCS 300 includes a first bus bar 326, a second bus bar 328 and a third bus bar 330, wherein the first bus bar 326, second bus bar 328 and third bus bar 330 are connected to the enclosure rear 310 via an electrically insulated mount. It should be appreciated that the first bus bar 326 includes a Phase A power input terminal 332 connected to the first bus bar 326, a Phase B power input terminal 334 connected to the second bus bar 328 and a Phase C power input terminal 336 connected to the third bus bar 330. It should be further appreciated that the first bus bar 326, second bus bar 328 and third bus bar 330 are configured to extend vertically between the enclosure top 316 and enclosure bottom 314 to be proximate to and extend away from the enclosure rear 310. The MPCS 300 further includes a neutral terminal 338 and a ground terminal 340 located proximate the enclosure rear 310 and the enclosure top 316 (and/or enclosure bottom 314 as desired) includes one or more openings of which input power are brought into and output power is brought out of the system enclosure 302. Thus, the ground connection for the modules 324 is provided through the system chassis. Referring to FIG. 22B, it should be appreciated that although the bus bars 326, 328, 330 are shown as being generally rectangular plates of a conductive material, the bus bars 326, 328, 330 may be any shape desired. Additionally it should be appreciated that the bus bars 326, 328, 330 are securely connected to the enclosure rear 310 via a bus bar mounting device 327 wherein the bus bars 326, 328, 330 are connected to the bus bar mounting device 327 via an insulated mounting block 329.

As discussed briefly above the MPCS includes at least one first module internal support slot 321 and at least one second module internal support slot 323, wherein the first module internal support slot 321 and second module internal support slot 323 are located within the enclosure cavity 304. It should be appreciated that the first module internal support 320 is securely connected to the internal surface of one enclosure side 312 and the second module internal support 322 is securely connected to the internal surface of the other enclosure side 312, such that the first module internal support slot 321 and the second module internal support slot 323 form a slot pair and are located in approximately the same horizontal plane. It should be appreciated that in the embodiment disclosed herein, MPCS 300 includes four (4) modules 324 wherein each of the modules 324 is removably associated with the system enclosure 302 via a pair of first and second module internal support slots 321, 323. It is contemplated that in other embodiments, the MPCS 300 may be configured to have as many modules 324 as desired, such as one (1) module 324 or ten (10) modules 324. Additionally, it is contemplated that multiple first module internal supports slots 321 and/or multiple second module internal support slots 323 may be combined in a single structure (See FIG. 22A) and/or may be single units that are connected to the internal side wall of the system enclosure 302.

Referring to FIG. 23 to FIG. 33B, the module(s) 324 are similar to the modules as discussed hereinabove and includes a module front 344, a module rear 346, a module top 348, a module bottom 350 and two module sides 352, wherein the module rear 346, module top 348, module bottom 350 and module sides 352 define a module cavity 354 for containing multiple components. It should be appreciated that as discussed hereinabove, the module components are dependent upon the function of the module 324. For example, if the module 324 is a dimmer module, then the module 324 may contain dimmer power components (such as two (2) or more SCR 120V 10 A dimmers) as well as dimmer control circuitry. In another embodiment, if the module 324 is a relay module, then the module 324 may contain single-pole (such as two (2) Single-Pole 20 A 120V relays) or double-pole (such as one (1) Double-Pole 20 A 220V relay) relays as well as relay control circuitry/switches. It is contemplated that the MPCS 300 may include any mix of modules 324 as desired. For example, although the MPCS 300 is described herein as using relay and dimmer modules, any type of modules that may be used for power distribution applications (i.e. for architectural, entertainment, etc.) may be used, such as modules that provide power and control of fluorescent ballasts and various other dimming techniques. Also, the modules may be used for power distribution and control to various other types of electronic/electrical equipment. It should be appreciated that the present invention advantageously provides access to all power phases as desired without having to reconfigure the entire system. Furthermore, the modules 324 include a module output terminal 325 electrically associated with one or more of the module components to allow the power that was conditioned by the module components to be distributed out of the MPCS 300, wherein the module output terminal 325 includes a Phase A conductor electrically connected to the conditioned Phase A signal, a Phase B conductor electrically connected to the conditioned Phase B signal and a Phase C conductor electrically connected to the conditioned Phase C signal.

Additionally, similar to the module shown in FIG. 7C, it should be appreciated that module 324 may also be configured as a chimney airflow module 324, where the module cavity 354 is left unpopulated (or only sparsely populated) with an area that is substantially free of obstruction to allow airflow there through. The configuration of the chimney airflow module 324 advantageously acts as a flow path guide to direct airflow between the enclosure bottom 314 and the enclosure top 316. Referring to FIGS. 23-33B, the module sides 352 include a side channel guide 356 that is configured (i.e. size and shape) to slidingly and supportingly interact with the first and second module internal supports 320, 322, where the side channel guide 356 on one module side 352 interacts with the first module internal support 320 and the side channel guide 356 on the other module side 356 interacts with the second module internal support 322, such that the module 324 is securely and removably contained with the enclosure cavity 304. This may be accomplished via a resilient member 358 (associated with the first and/or second module internal support 320, 322 and/or the side channel guide 356) that prevents the module 324 from being removed from the side channel guide 356. When the resilient member 358 is compressed, the module 324 may be removed from the side channel guide 356.

Figure 33A:
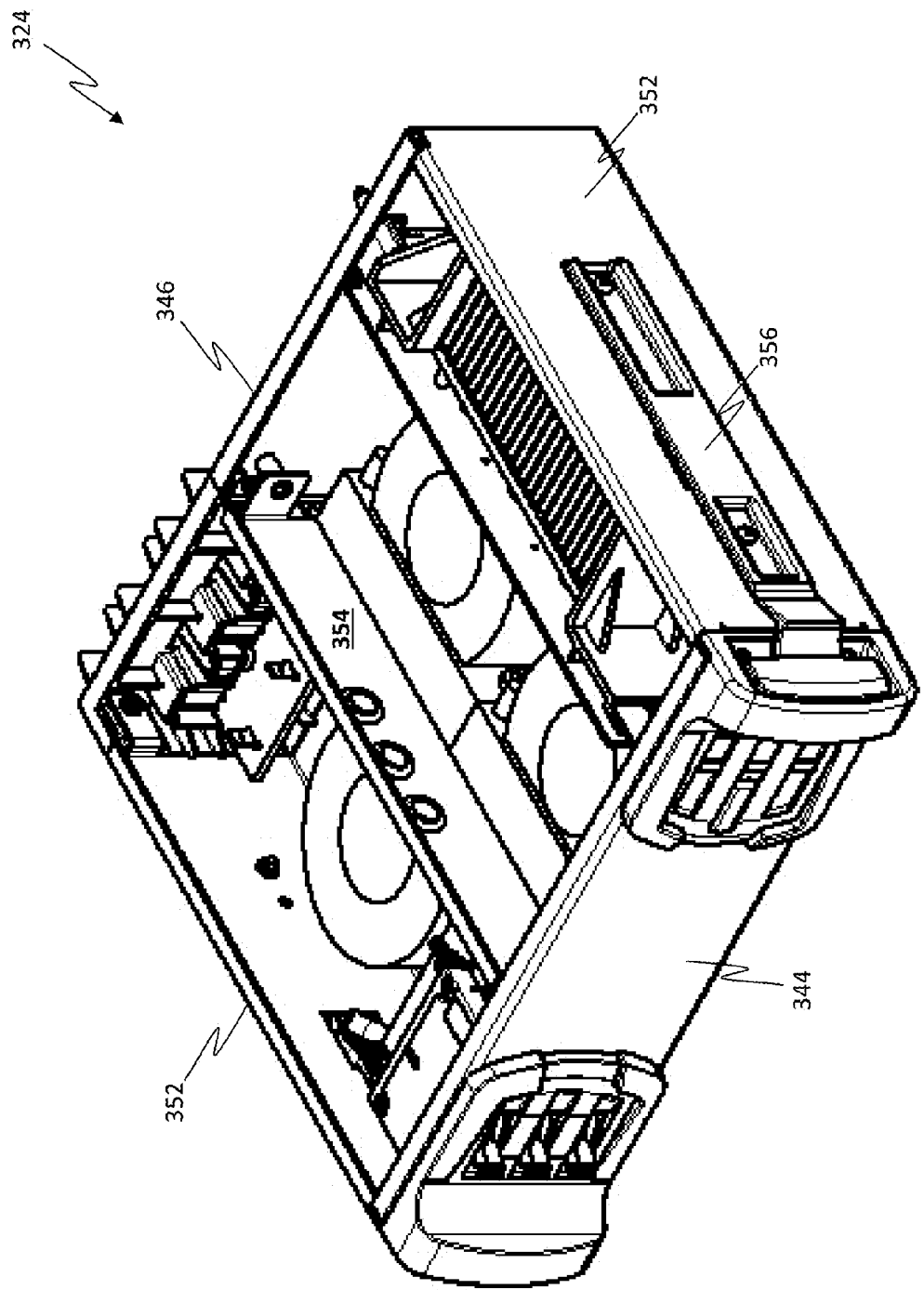
FIG. 33A is a top down perspective view of the module of FIG. 32 illustrating the module cavity.
Figure 34:
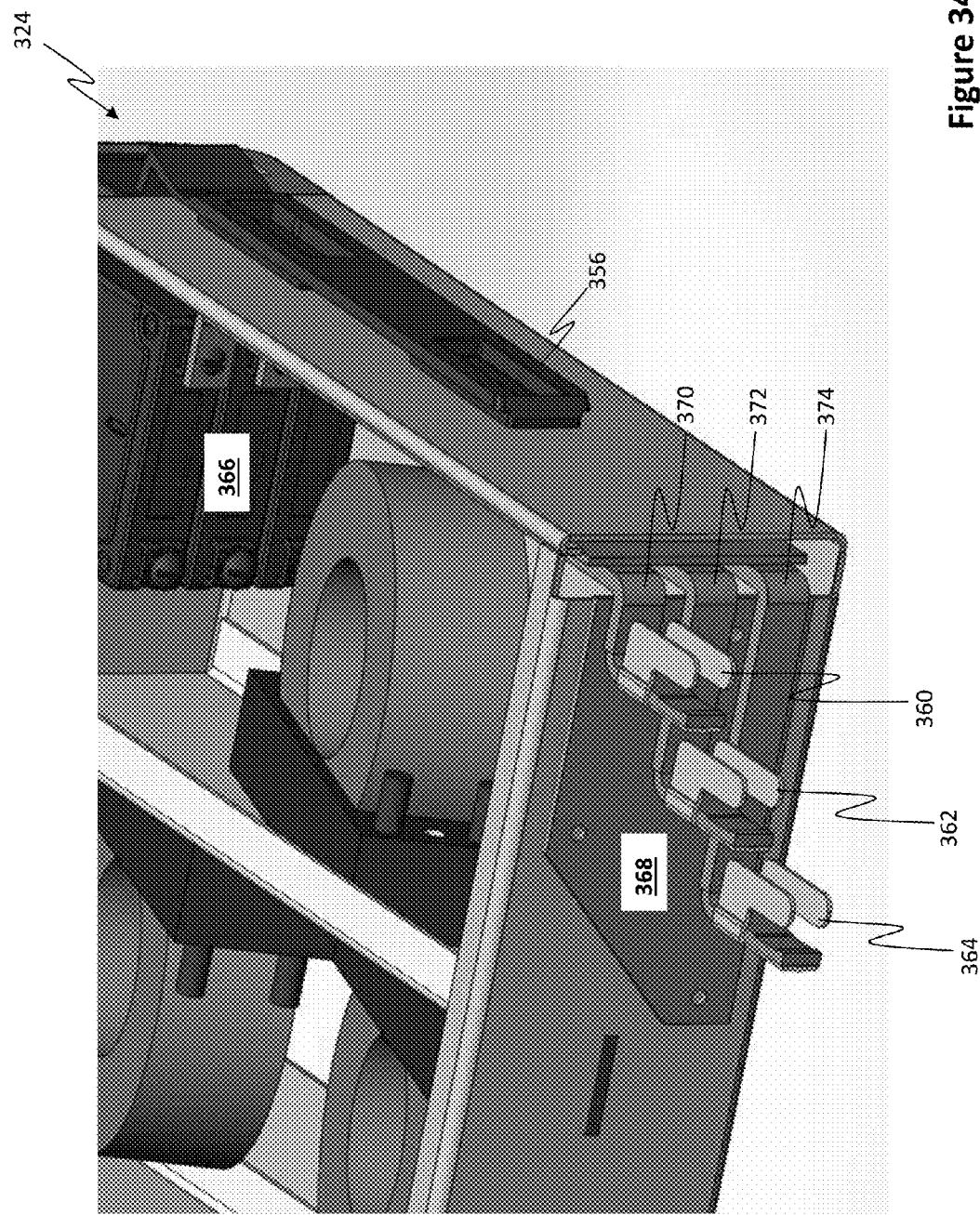
FIG. 34 is left side rear perspective view of one embodiment of a module for use with the MPCS of FIG. 17 illustrating the module input power connectors, in accordance with one embodiment of the invention.
Figure 35:
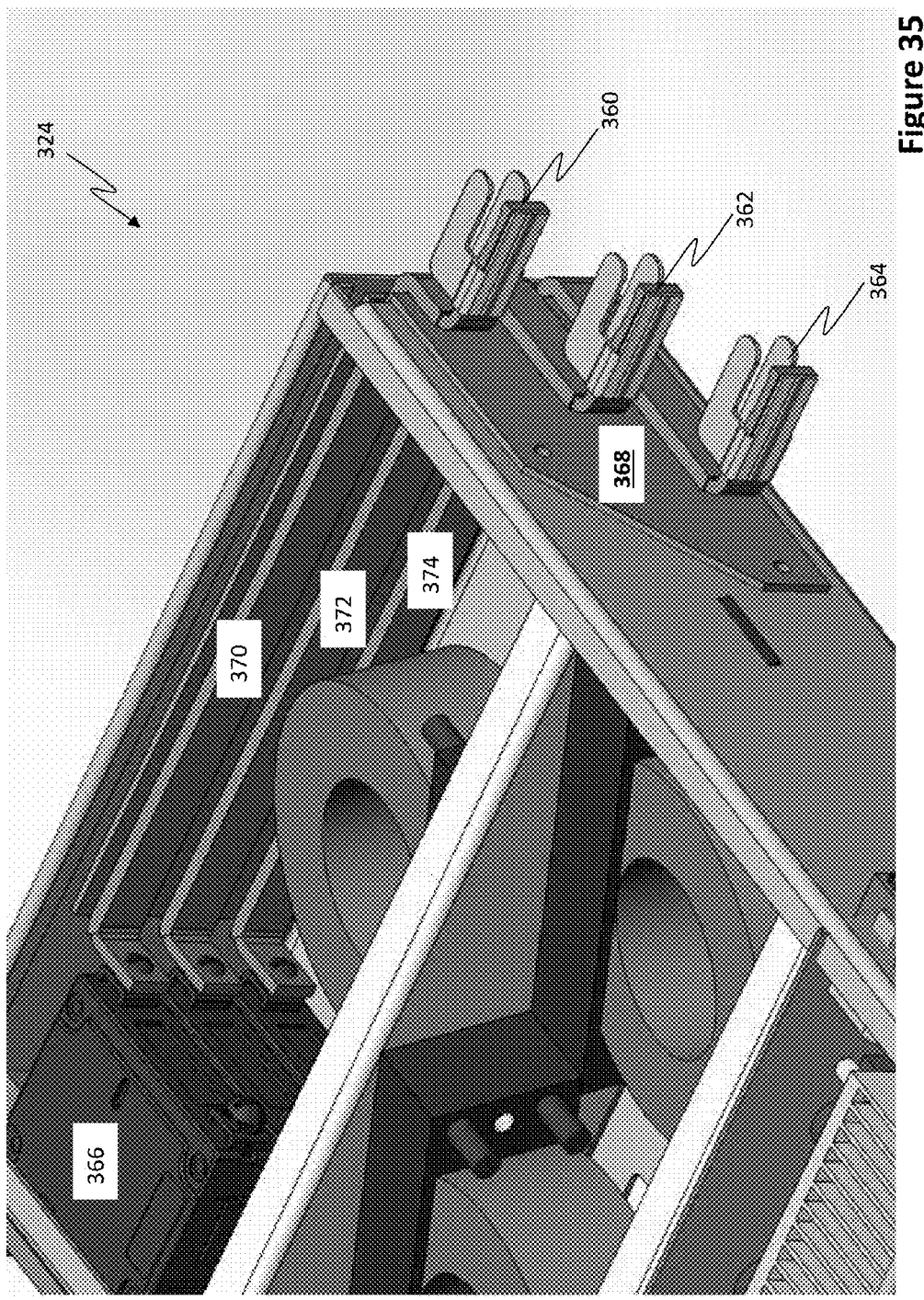
FIG. 35 is right side rear perspective view of the module of FIG. 34 illustrating the module input power connectors.
Figure 36:
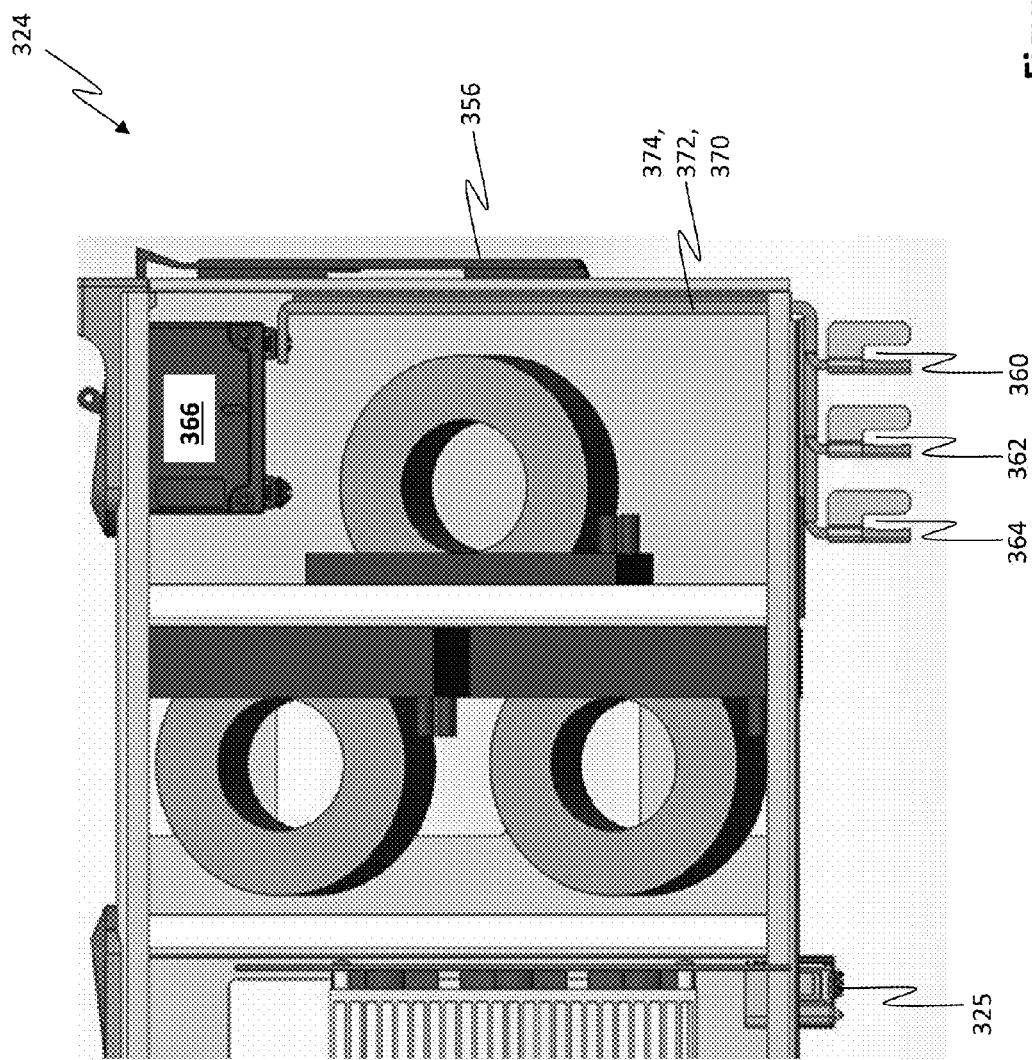
FIG. 36 is a top down view of the module of FIG. 34 illustrating the module cavity.
Figure 37:
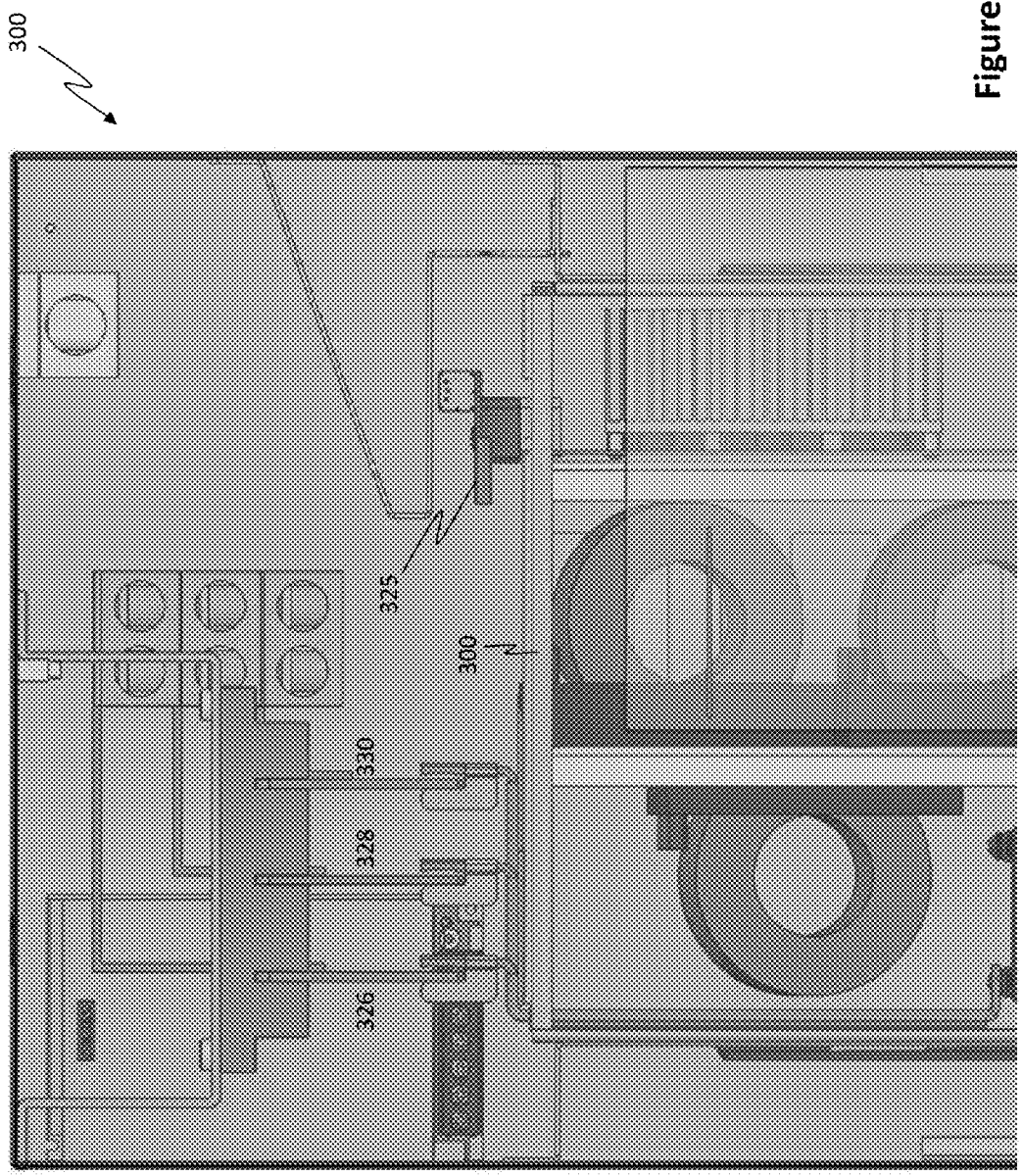
FIG. 37 is a top down sectional view of the MPCS and the module of FIG. 34 located within the enclosure cavity and connected to the input power bus bars of FIG. 22B.

Referring again to FIGS. 23-33B, as discussed above it should be appreciated that various types of modules 324 may be used with the MPCS 300, wherein the MPCS 300 may include only one type of module or various types of modules, as desired. In one embodiment, a module 324 may be a Triple Single Pole Relay Module which is rated for 120V, 20 A power per circuit. In another embodiment, a module 324 may be a Triple Dimmer Module which is rated for 120V, 20 A power per circuit. In this embodiment, the dimmer may include a toroidal filter assembly which modifies the rate of current rise ("rise time") within that circuit and may operate with a rise time of 350 microseconds (μs). In still yet another embodiment, a module 324 may be a Single Pole Relay/Double Pole Relay Module which is rated for 120V, 20 A power per circuit. In still yet another embodiment, a module 324 may be a Single Dimmer/Dual Single Pole Relay Module which is rated for 120V, 20 A power per circuit. In this embodiment, the dimmer may include a toroidal filter assembly which modifies the rate of current rise ("rise time") within that circuit and may operate with a rise time of 350 microseconds (μs). In still yet another embodiment, a module 324 may be a Single Dimmer/Double Pole Relay Module which is includes one SCR Dimmer Circuit rated for 120V, 20 A and one Double Pole Relay Circuit each rated for 240V, 20 A. In still yet another embodiment, a module 324 may be a Plenum Module which may occupy unpopulated module chamber slots. It should be appreciated that the MPCS 300 may be rated for any voltage/amperage needed per application and as suitable to the desired end purpose. For example, FIG. 33B, illustrates embodiments of MPCS 300 configured for four (4), eight (8) and sixteen (16) modules.

Referring to FIGS. 34-37, the module 324 further includes a Phase A bus bar connector 360, a Phase B bus bar connector 362 and a Phase C bus bar connector 364 located proximate the module rear 346, wherein the Phase A bus bar connector 360 is configured to conductively associate with the first bus bar 326, the Phase B bus bar connector 362 is configured to conductively associate with the second bus bar 328 and the Phase C bus bar connector 364 is configured to conductively associate with the third bus bar 330. It should be appreciated that the Phase A bus bar connector 360, Phase B bus bar connector 362 and Phase C bus bar connector 364 are configured to have a receiving slot 365 that is sized and shaped to receive and conductively interact with the bus bars 326, 328, 330 such that a conductive connection is made between the bus bar connectors 360, 362, 364 and the bus bars 326, 328, 330.

It should be appreciated that the Phase A, B, C connectors 360, 362, 364 are securely associated with the module rear 346 to extend therefrom and are connected to a circuit breaker 366 (or other switch or component that is located within the module). Additionally, an electrically insulated material 368 (such as Mylar and/or FR4 (Epoxy Laminate)) is used to separate the module rear 346 from the electrically conductive bus bars 326, 328, 330. The Phase A connector 360 is connected to the circuit breaker 366 via a first bus bar 370, the Phase B connector 362 is connected to the circuit breaker 366 via a second bus bar 372 and the Phase C connector 364 is connected to the circuit breaker 366 via a third bus bar 374, wherein the first, second and third bus bars 370, 372, 374 are isolated via an insulating material (such as Powder Coat or Lamination). It should be appreciated that the Phase A, Phase B and Phase C power is then distributed to the module 324 following the circuit breaker 366 to allow the power phases to be isolated from the rest of the module 324 as desired. It should be appreciated that in other embodiments, the MPCS may be configured such that the electrically conductive bus bars 326, 328, 330 may be located on the rear of the module 324 and the bus bar connectors 360, 362, 364 are located on the rear of the enclosure. Additionally, it should be appreciated that the electrically conductive bus bars 326, 328, 330 may also include a neutral bus bar and a ground bus bar and the bus bar connectors may include a neutral bus bar connector and a ground bus bar connection for connection to the module 324. This would allow the neutral and ground to be connected directly to the modules 324 if desired. It is contemplated that any number and/or arrangement of bus bars and bus bar connectors may be used as desired.

Figure 38:
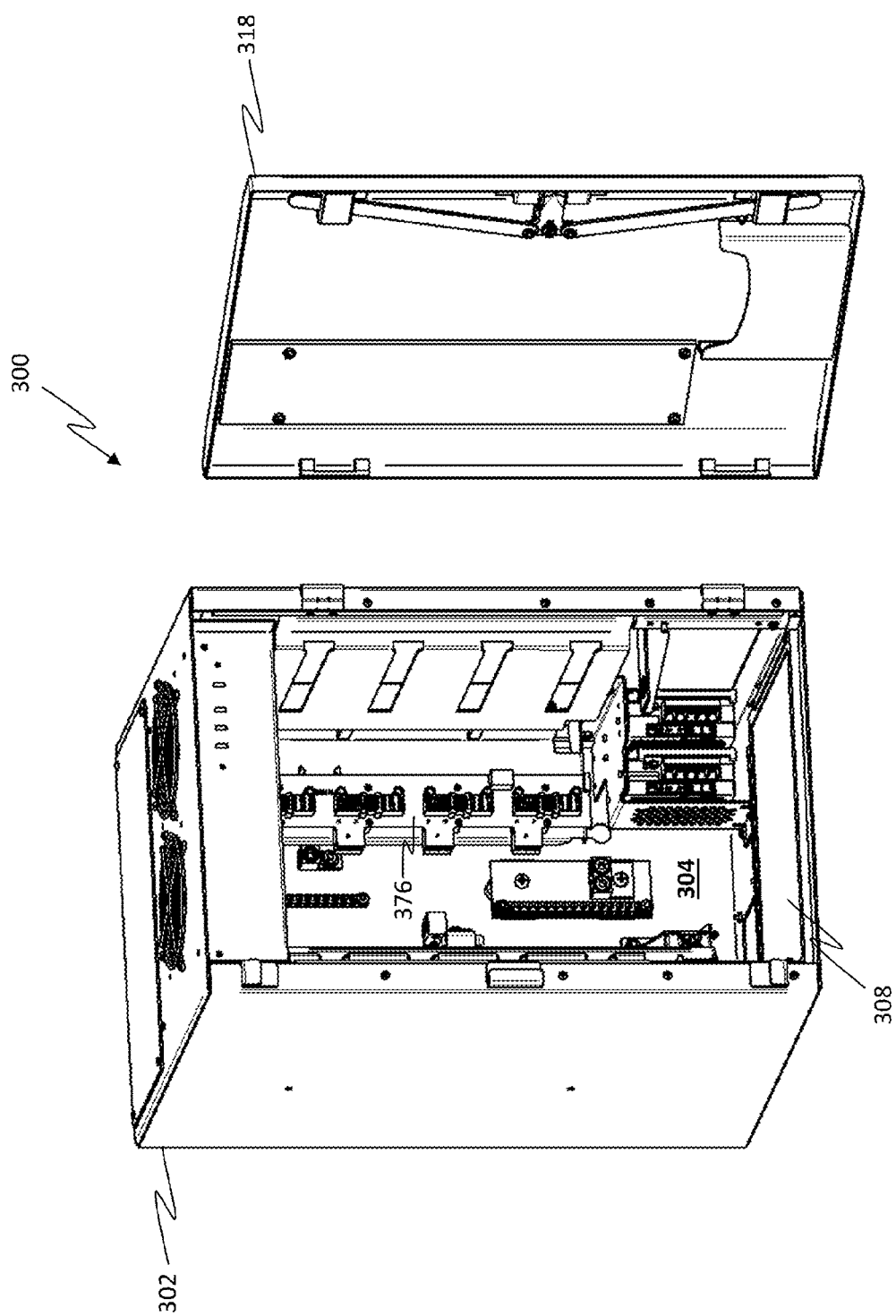
FIG. 38 is a partially exploded front side view of the MPCS of FIG. 17 illustrating the enclosure cavity.
Figure 39:
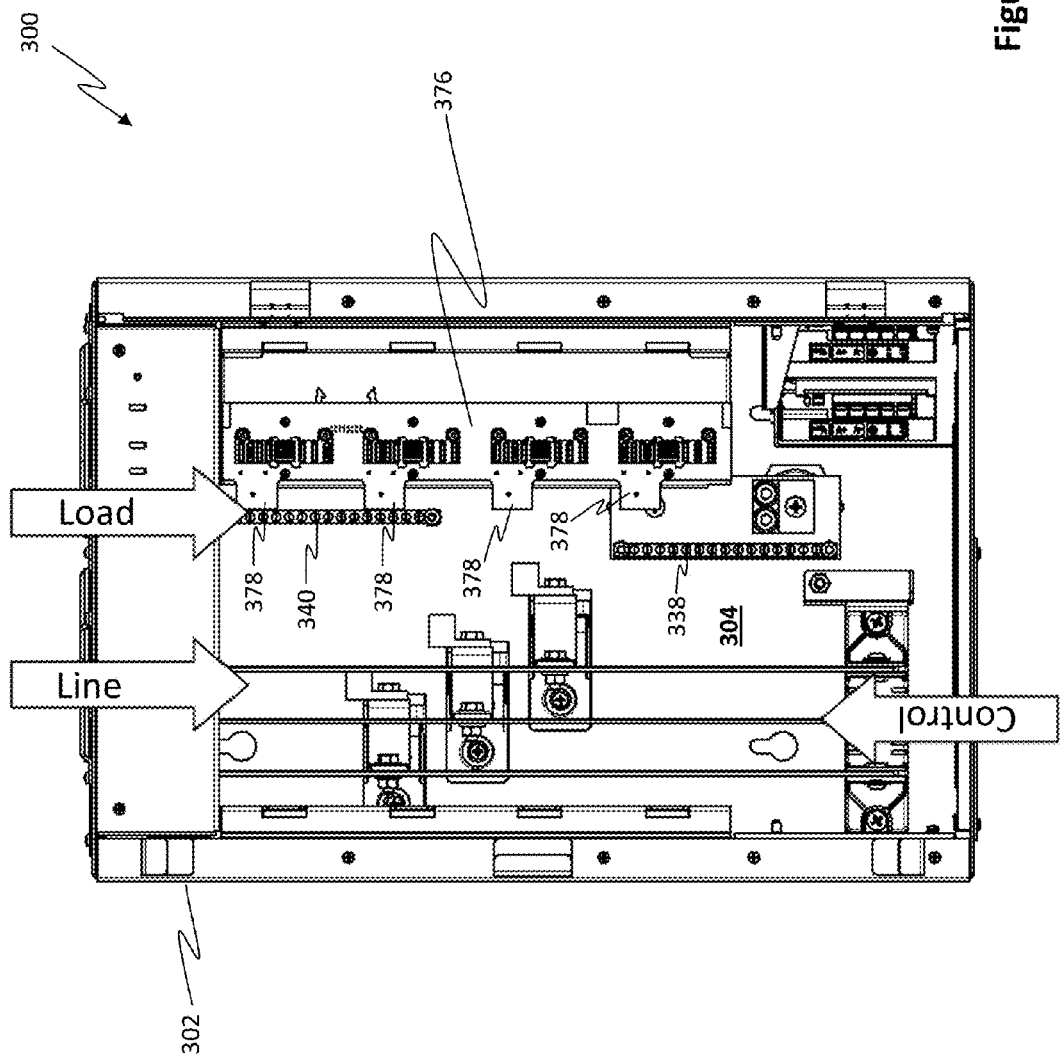
FIG. 39 is a front view of the MPCS of FIG. 17 illustrating the input power bus bars and the terminal backplane located within the enclosure cavity.
Figure 40:
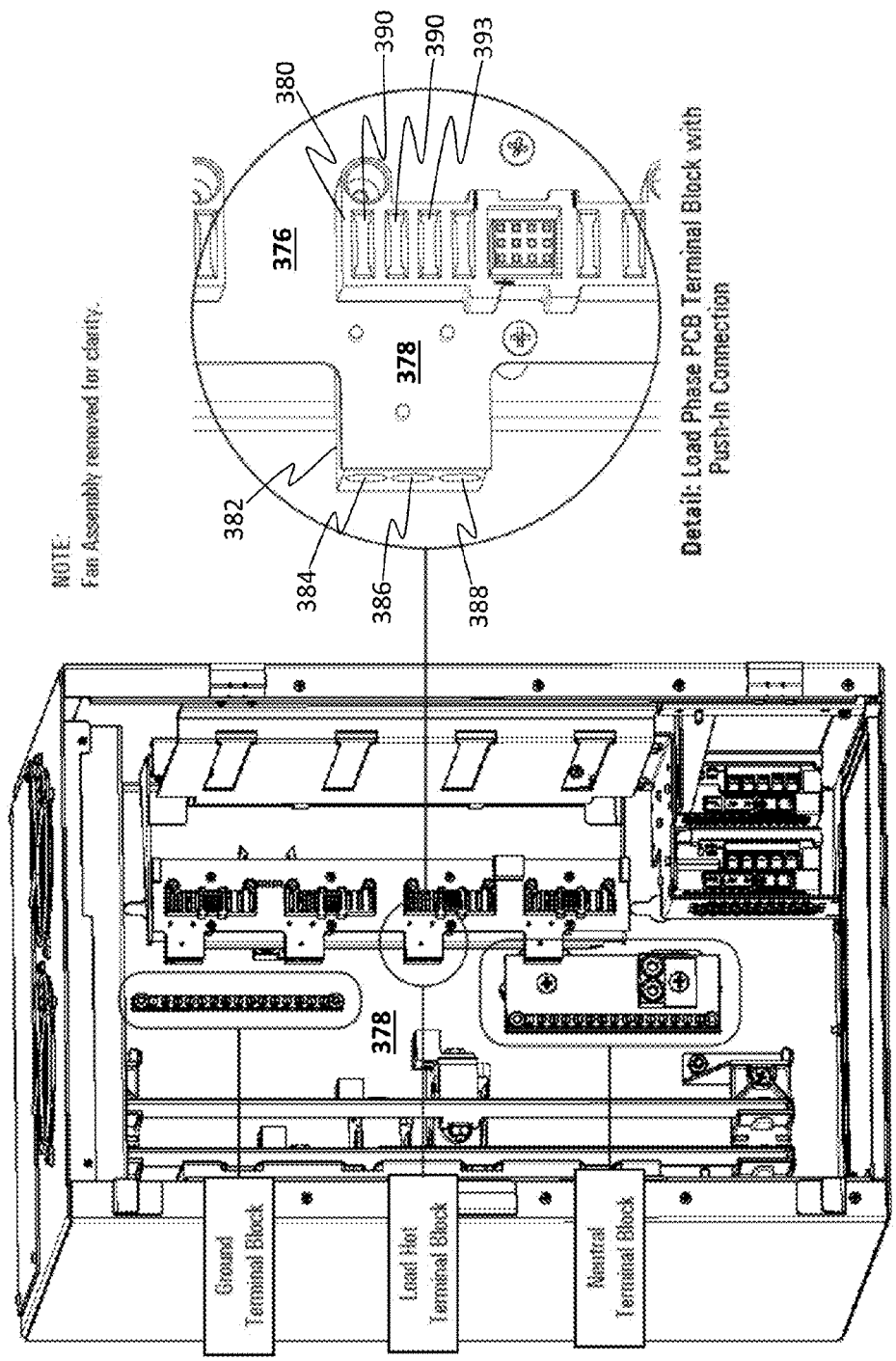
FIG. 40 is a front view of the MPCS of FIG. 17 illustrating the terminal backplane located within the enclosure cavity and an exploded view of a terminal block, in accordance with one embodiment of the invention.

Additionally, referring to FIG. 38 to FIG. 40, the MPCS 300 further includes a terminal backplane 376 having one or more Terminal Blocks (TB) 378, wherein each of the Terminal Blocks (TB) 378 include a Terminal-Module Interface (TMI) 380 and an output distribution block 382. It should be appreciated that the output distribution block 382 includes a Phase A output wire connector 384, a Phase B output wire connector 386 and a Phase C output wire connector 388 and the TMI 380 includes a TMI Phase A connector 390, a TMI Phase B connector 392 and a TMI Phase C connector 394, wherein the Phase A output wire connector 384 is electrically connected to the TMI Phase A connector 390, the Phase B output wire connector 386 is electrically connected to the TMI Phase B connector 392 and the Phase C output wire connector 386 is electrically connected to the TMI Phase C connector 392. Moreover, it should be appreciated that in one embodiment the TMI 380 is configured to receive and frictionally contain the module output terminal 325 of the module 324 via a "push-in" connection.

When the module 324 is associated with the MPCS 300, the side channel guide 356 on one module side 352 interacts with the first module internal support 320 and the side channel guide 356 on the other module side 356 interacts with the second module internal support 322 to lockingly and securely locate the module with the MPCS 300. When the module 324 is fully inserted into the MPCS 300 the first bus bar 326 slides into and is contained within the Phase A bus bar connector 360 to conductively associate with the first bus bar 326, the second bus bar 328 slides into and is contained within the Phase B bus bar connector 362 to conductively associate with the second bus bar 328 and the third bus bar 330 slides into and is contained within the Phase C bus bar connector 364 to conductively associate with the third bus bar 330.

Figure 41:
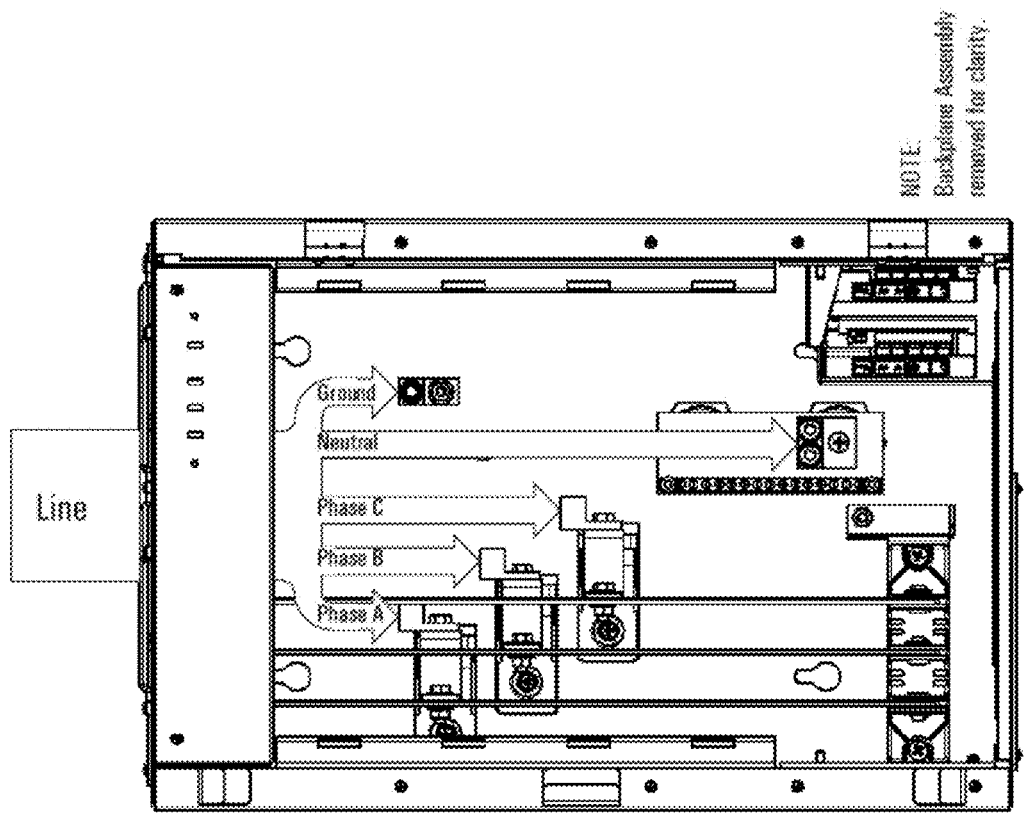
FIG. 41 is a front view of the MPCS of FIG. 17 illustrating the input power bus bars configured for three-phase operation, in accordance with one embodiment of the invention.
Figure 42:
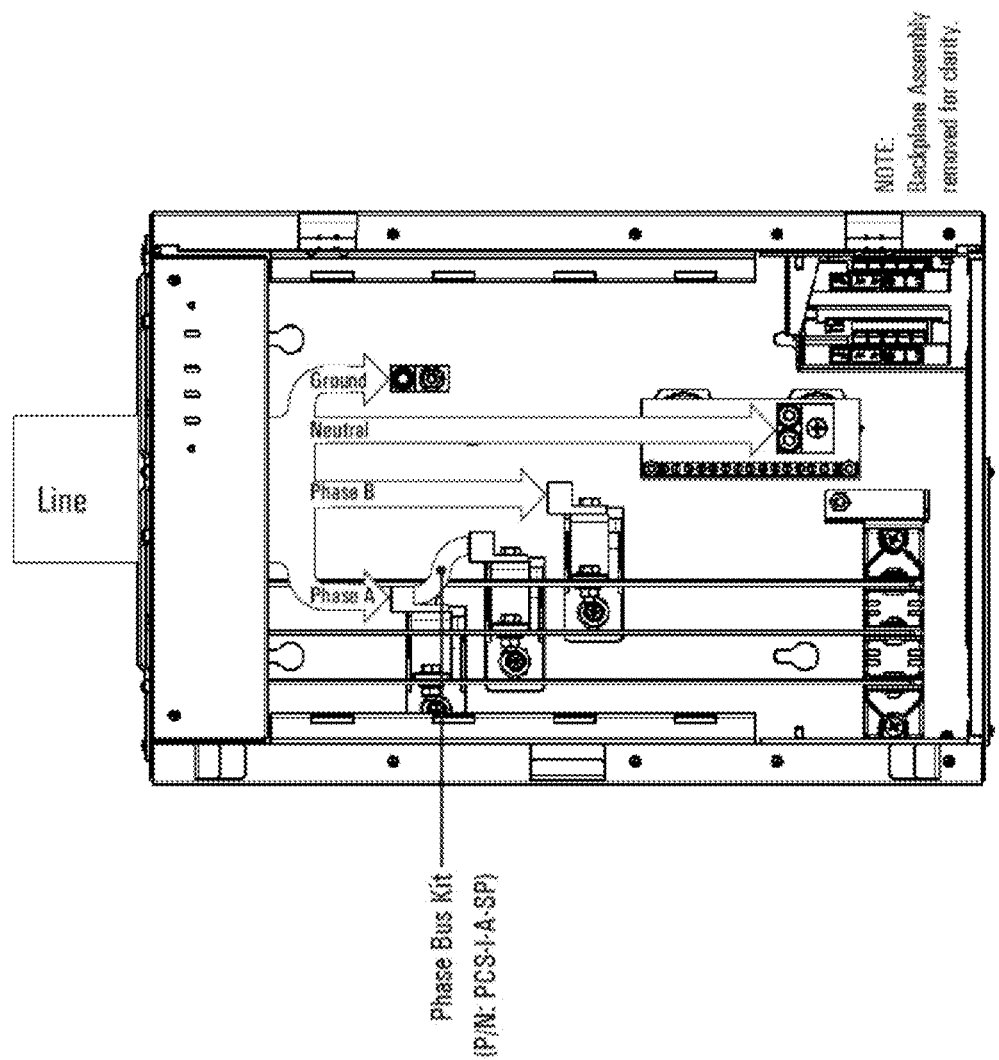
FIG. 42 is a front view of the MPCS of FIG. 17 illustrating the input power bus bars configured for single-phase operation, in accordance with one embodiment of the invention.
Figure 43:
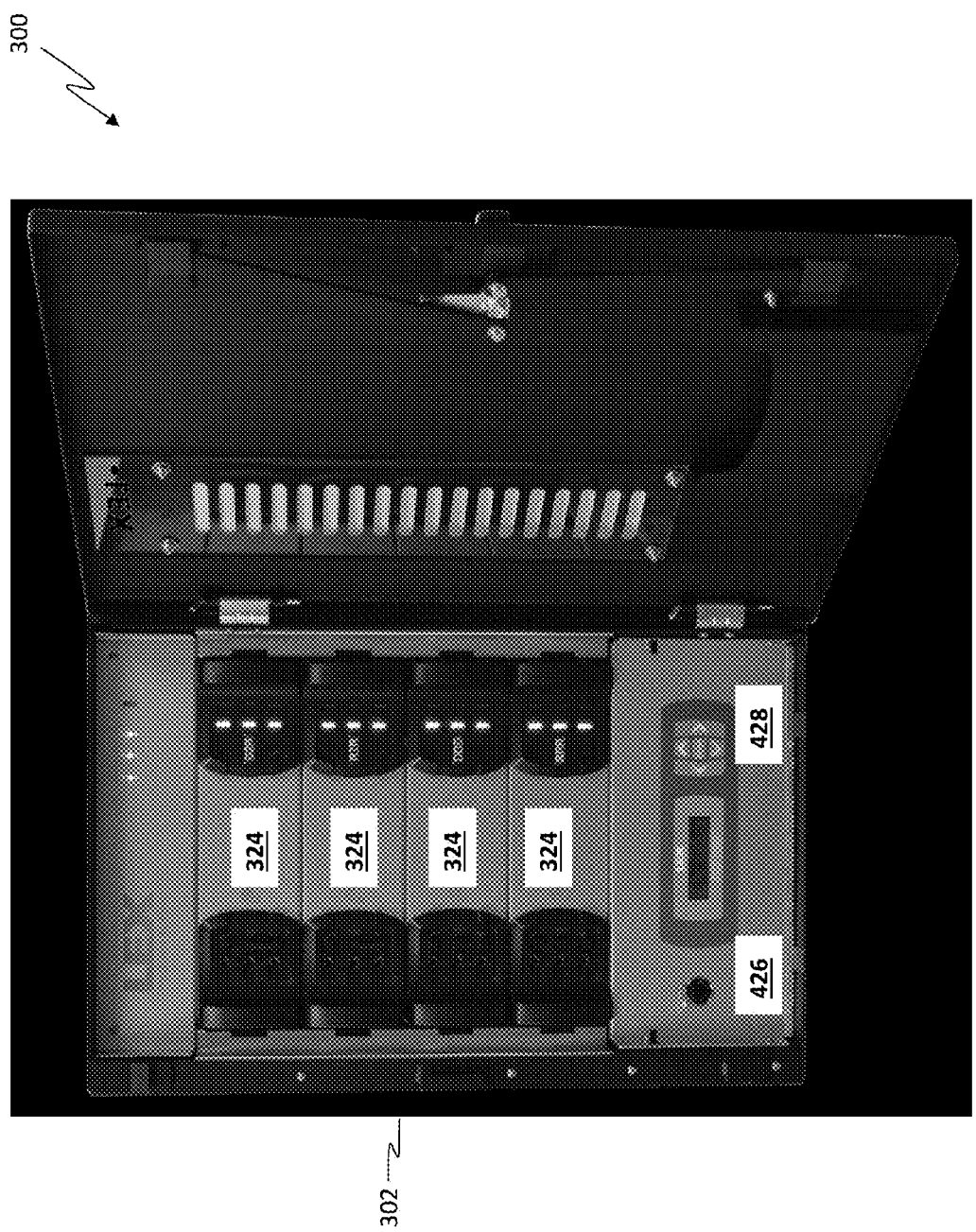
FIG. 43 is a front view of the MPCS of FIG. 17.
Figure 44:
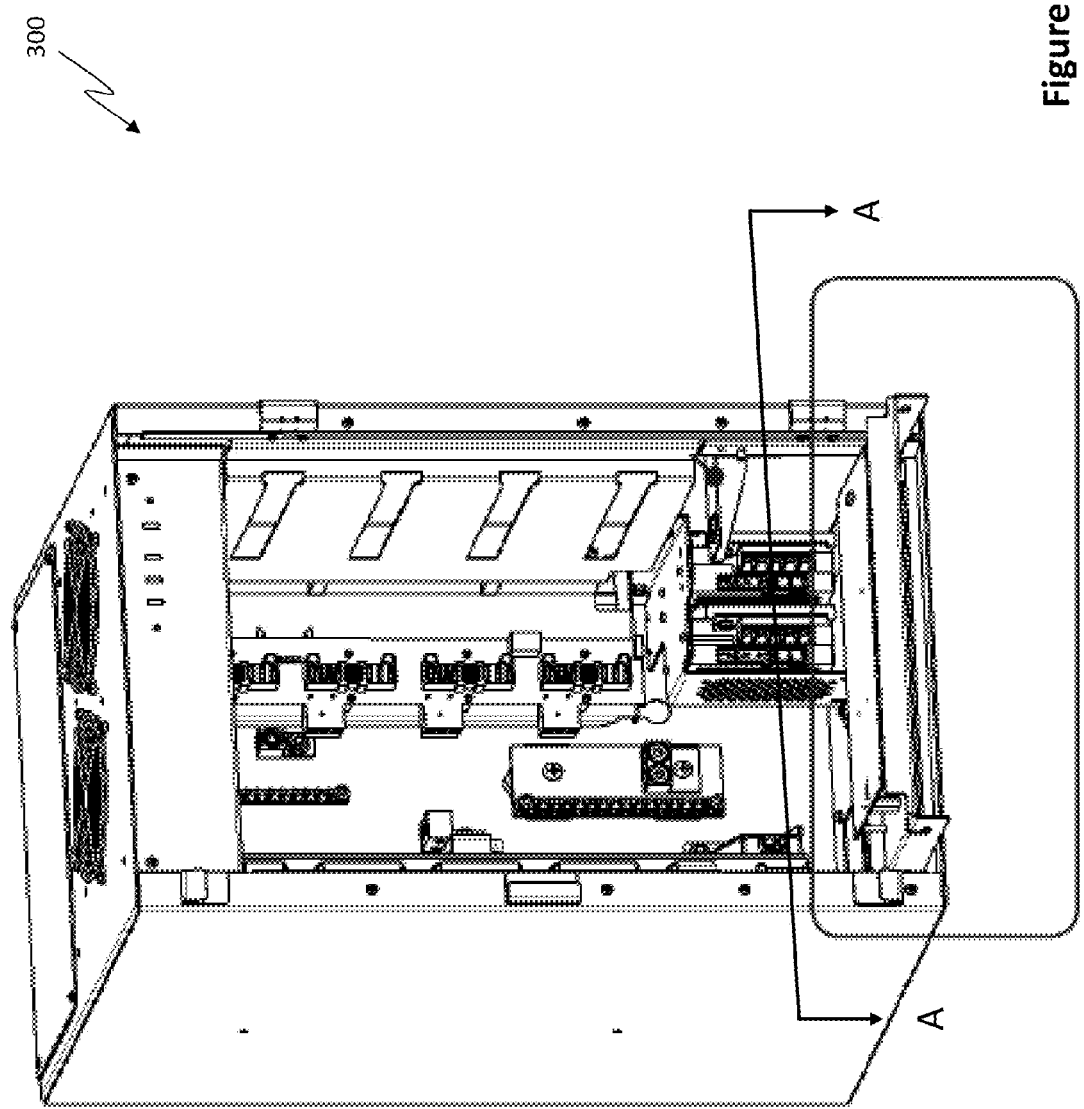
FIG. 44 is a front view of the MPCS of FIG. 17 illustrating the MPCS controller front panel and showing the controller backplane.
Figure 45:
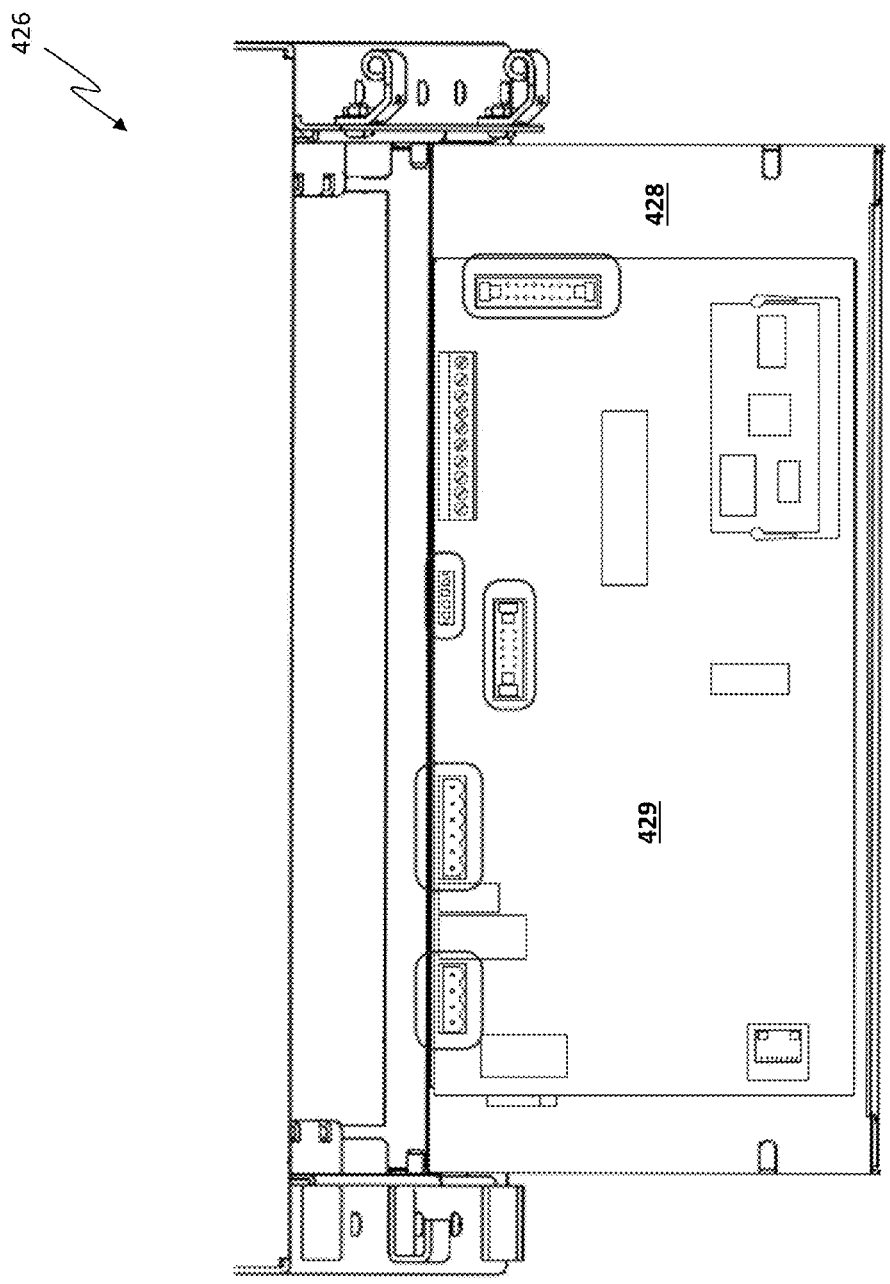
FIG. 45 is a rear view of the controller front panel of FIG. 44 showing the controller backplane, in accordance with one embodiment of the invention.
Figure 46:
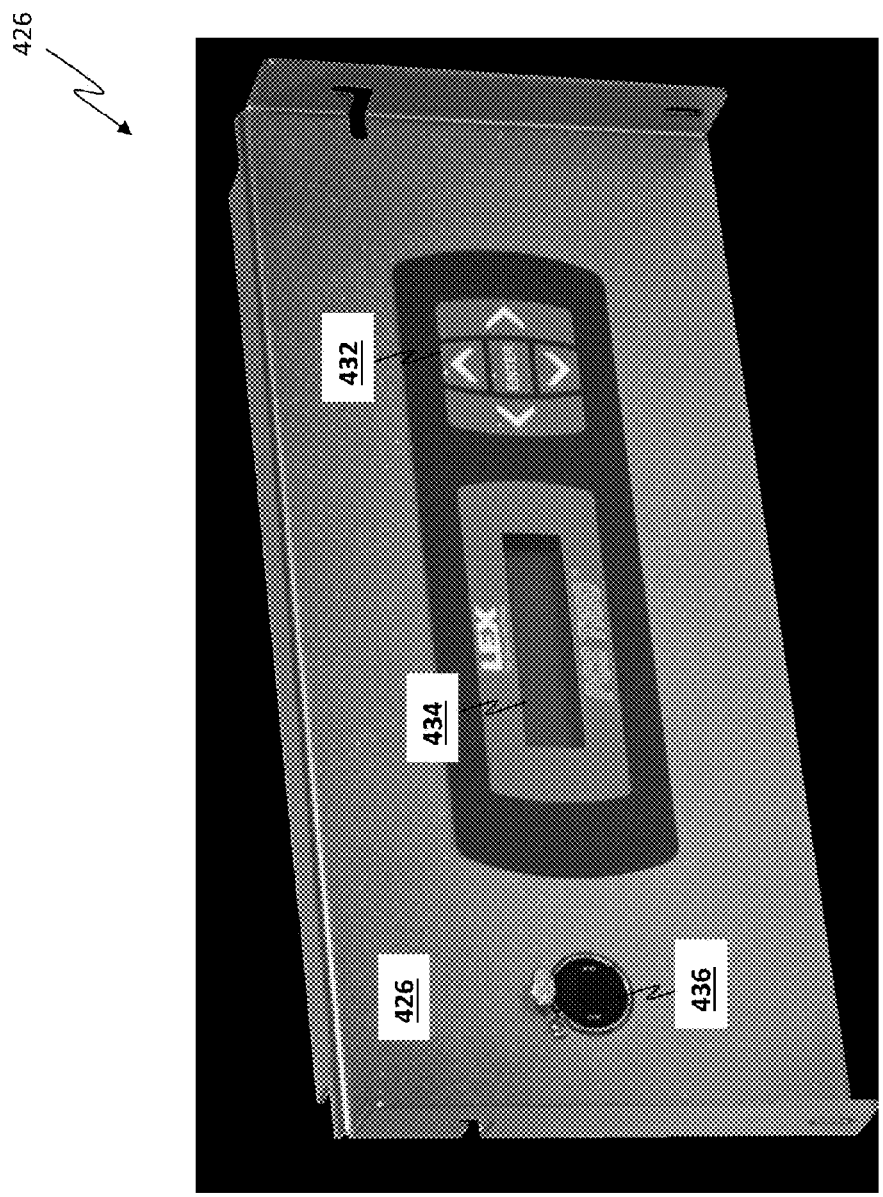
FIG. 46 is front view of the controller front panel the MPCS of FIG. 17, in accordance with one embodiment of the invention.

Referring again to FIG. 37 the bus bar 326, 328, 330 fits within the Phase A, B, C connectors 360, 362, 364 such that a conductive connection between the bus bar 326, 328, 330 and the Phase A, B, C connectors 360, 362, 364 exists. In this way, the Phase A, Phase B and Phase C power is connected to the modules 324. It should be appreciated that this conductive connection may be accomplished via any method suitable to the desired end purpose, such as, but not limited to, a friction fit connection. Additionally, as the module 324 is lockingly and securely located within the MPCS 300, the module output terminal 325 is pressingly and frictionally associated with the TMI 380 such that the Phase A conductor of the module output terminal 325 is electrically connected to the TMI Phase A connector 390, the Phase B conductor of the module output terminal 325 is electrically connected to the TMI Phase B connector 392 and the Phase C conductor of the module output terminal 325 is electrically connected to the TMI Phase C connector 394. As shown in FIG. 41 and FIG. 42, it should be appreciated that the MPCS 300 may be configured for three-phase use or for single-phase use as desired.

Referring to FIGS. 43-46, the MPCS controller 426 includes a controller front panel 428, a controller backplane 429 and a system controller which may include a processing device and may be configured to accept multiple control communication protocols, distribute communications to modules 324 within the MPCS 300 and provide a user interface for panel commissioning and configuration. In accordance with one embodiment of the invention, the MPCS controller 426 may be configured to support a plurality of control protocols (such as, but not limited to DMX-512A, RDM, E1.31, sACN and ArtNET) and the front panel 428 may include a multi-button keypad 432 (that may be hard and/or soft (Touch Menu Items) keys) to control the MPCS 300 and input information and commands. The front panel 428 may further include a display 434 (for example, one embodiment may include a back-lit, two line, 20 character display visible on the front panel 428 that provides information for panel configuration and status indication) and may be configured to store multiple preset commands/parameters, wherein the preset commands/parameters may be user programmable and executable. Additionally, the MPCS controller 426 may be accessed and operated remotely and/or on-site and may be configured with a recorded preset that serves as an 'emergency' look (UL924) and that may be activated from the remote source. Furthermore, the MPCS controller 426 is communicated with the modules 324 to control the operation of the modules 324. The MPCS controller 426 is configured to allow a user to set individual circuits to specific levels and allows the modules 324 to be active. Moreover, the front panel further includes a Ethernet connector 436 (for example, Neutrik®, etherCON®) which allows for connection to Ethernet-based communication networks. Additionally, the controller backplane 429 is configured to distribute power (and/or control the distribution of power) throughout the system for operation of the MPCS 300. In still yet other embodiments, the MPCS 300 may be operated via the MPCS controller 426 to be fully automatic and/or each of the modules 324 may be configured to include a controller to assume partial or full control of the function of the modules 324 and may be configurable to operate in a parallel and/or a serial configuration.

Figure 20:
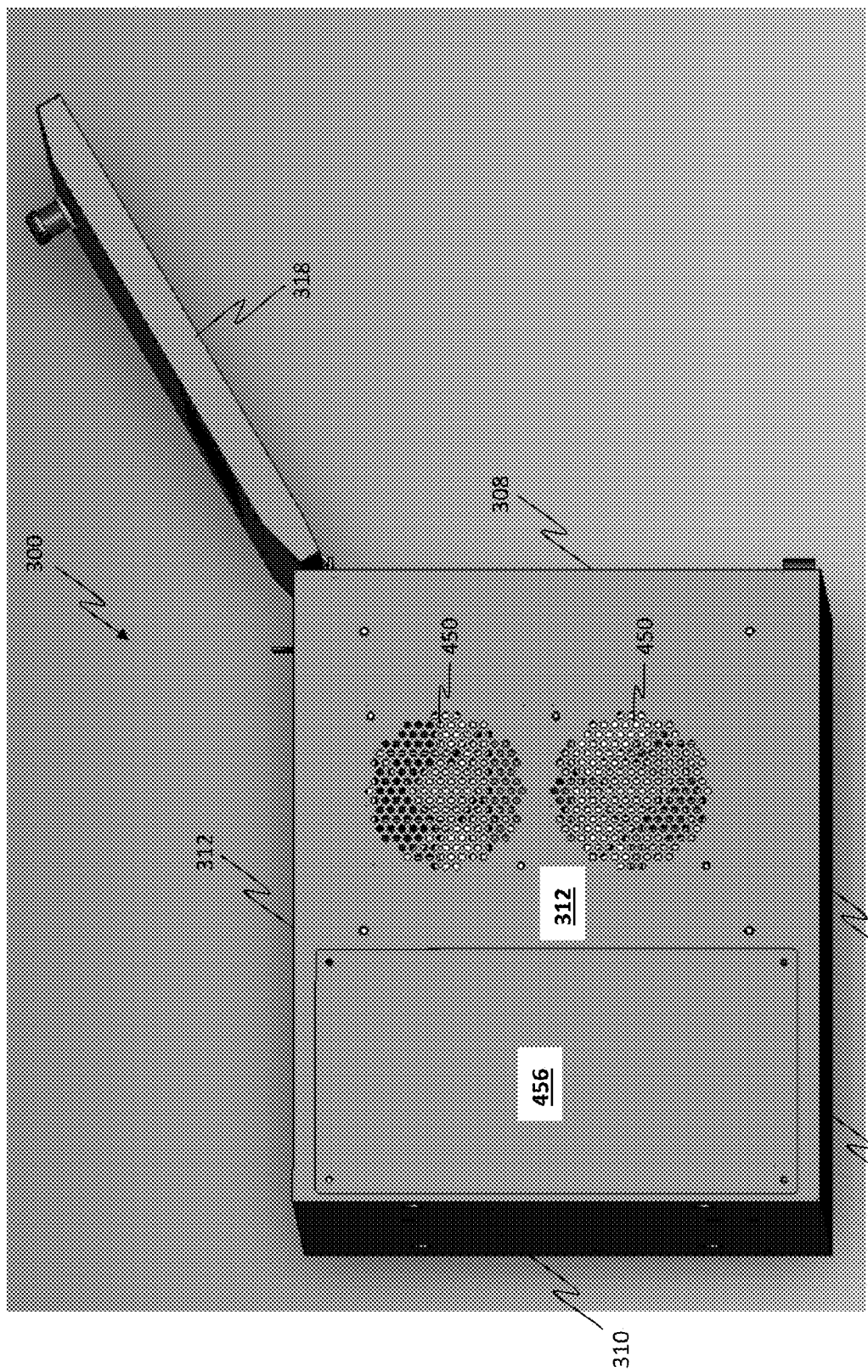
FIG. 20 is a top down view of the MPCS of FIG. 17.
Figure 21:
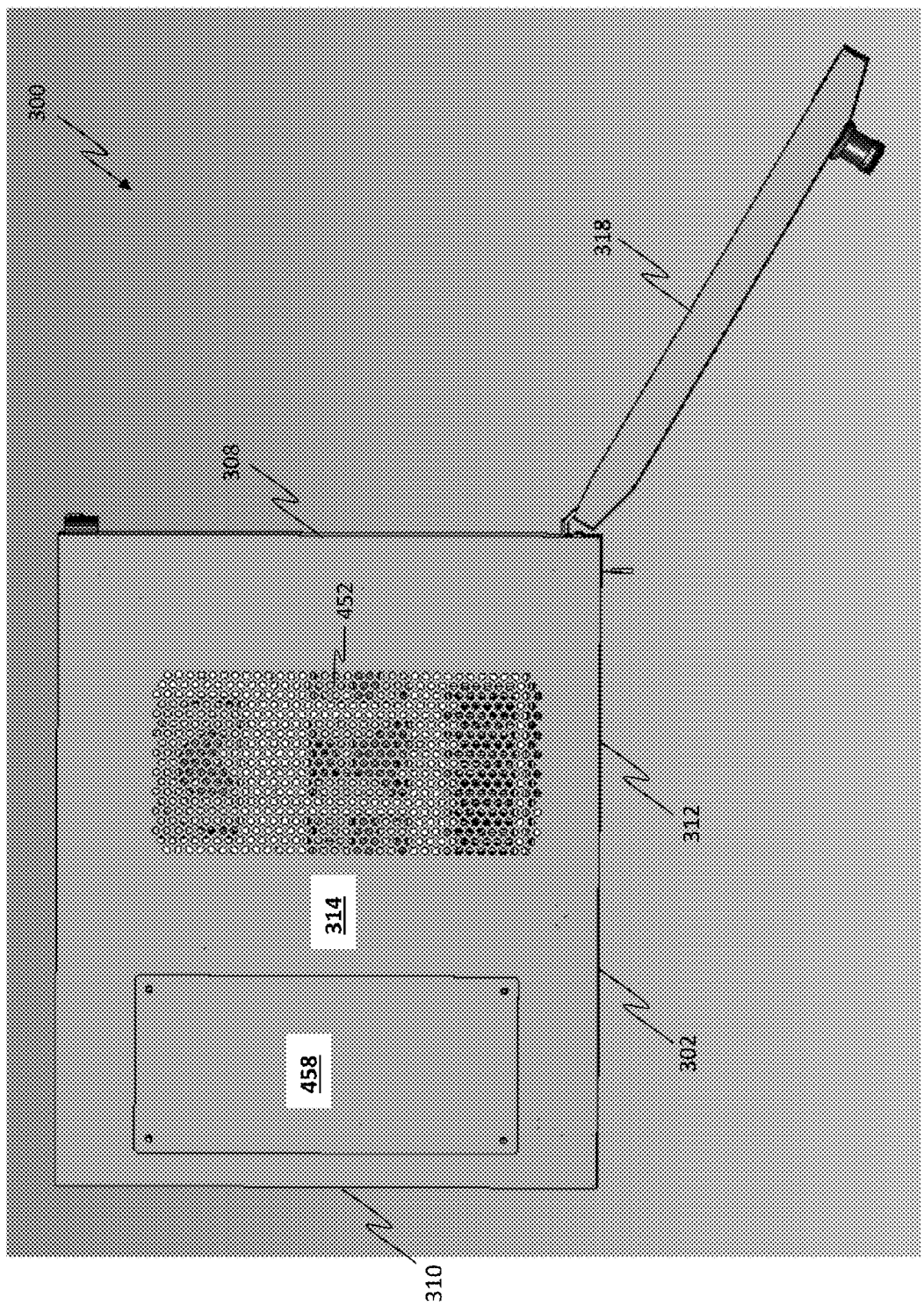
FIG. 21 is a bottom up view of the MPCS of FIG. 17.
Figure 47:
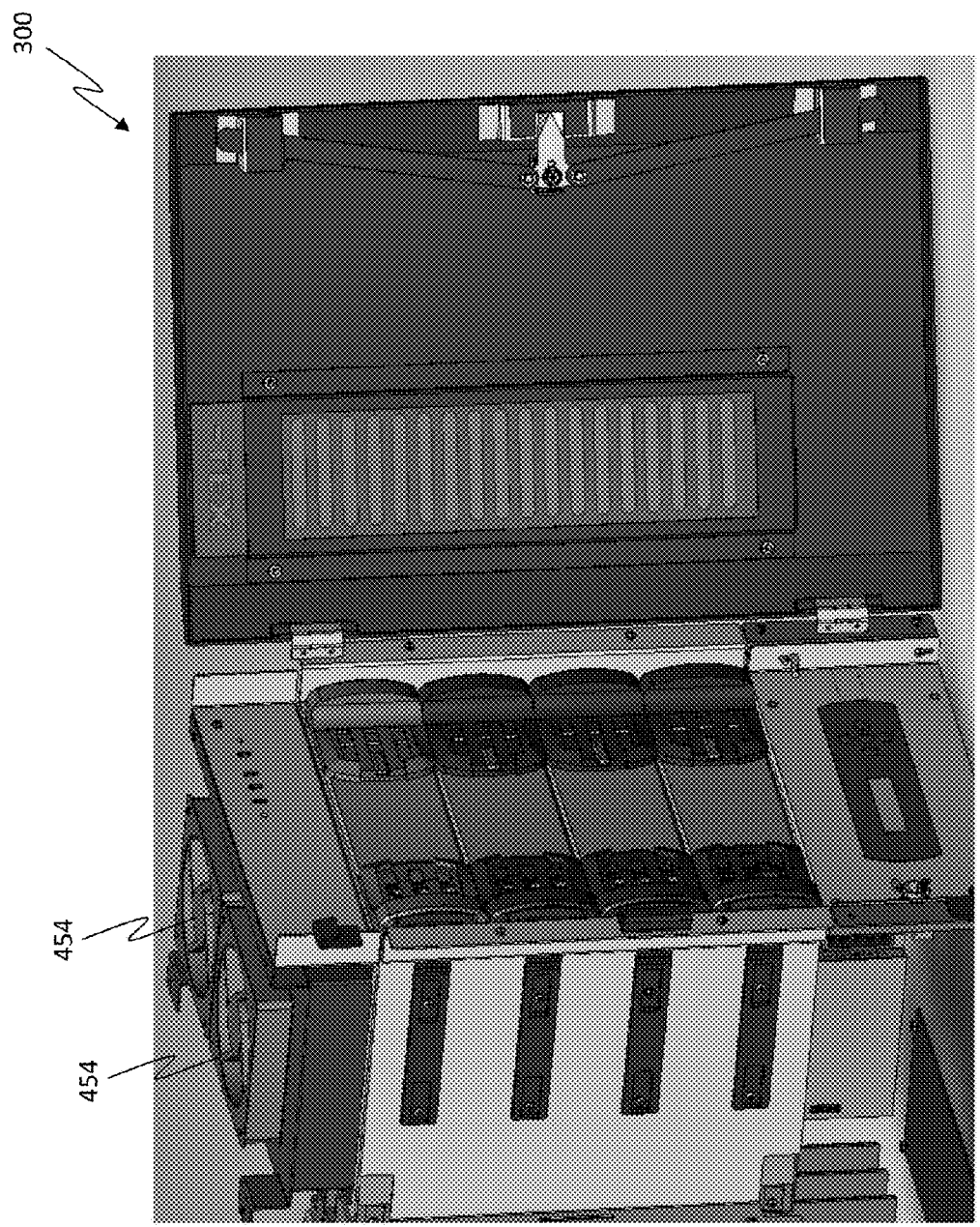
FIG. 47 is a front side view of the MPCS of FIG. 17 with the system enclosure removed showing the cooling fans, in accordance with one embodiment of the invention.

Referring to FIG. 47 and again to FIG. 20, FIG. 21 and FIG. 39, the enclosure top 316 includes one or more upper vents 450 and the enclosure bottom 314 includes a lower vent 452, wherein the upper vent 450 is located to be directly over the modules 324 and the lower vent 452 is located to be directly under the modules 324. The MPCS 300 further includes one or more fans 454 which are located above the modules 324 to be between the modules 324 and the upper vent 450. It should be appreciated that in other embodiments the fans 454 and/or additional fans may be located below the modules 324 to be between the modules 324 and the lower vent 452. Referring to FIG. 48, it should be appreciated that this configuration allows for a combination of convention and forced-air airflow to flow into the lower vent 452, over and/or through the module components and cavities 354 and out of the upper vent 450. Additionally, the enclosure top 316 includes one or more top openings 456 (which may have removable covers) to allow input power to be brought in and output power to be brought out and the enclosure bottom 314 may include one or more bottom openings 458 (which may have removable covers) to allow control signals to be brought in.

It is contemplated that MPCS 100, 300 may include processing circuitry that is configurable to monitor the modules 324 and/or perform a self-check diagnostic procedure in a manner responsive to a predetermined algorithm on a system wide basis and/or on a module by module basis. Additionally, it is contemplated that the MPCS 100, 300 may also include a storage device that may store the results of the diagnostic procedure and/or performance history, wherein the storage device may be a volatile and/or a non-volatile memory suitable to the desired end purpose. Accordingly, the processing circuitry may include, but not be limited to, a processor(s), computer(s), memory, storage, register(s), timing, interrupt(s), communication interface(s), and input/output signal interface(s), as well as combination comprising any of the foregoing.

The invention may include (at least in part) a computer or controller implemented processes which may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

It should be appreciated that while the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A modular power control system, comprising:
    an enclosure having an enclosure top, an enclosure bottom, an enclosure front, an enclosure rear, a first enclosure side and a second enclosure side, wherein the enclosure defines an enclosure cavity and wherein the enclosure further includes an input power connector;
    a module internal support, wherein the module internal support includes a first module support connected to the first enclosure side and a second module support connected to the second enclosure side, wherein the first module support includes a first module channel and the second module support includes a second module channel;
    at least one module, wherein the at least one module includes a module top, a module bottom, a module rear, a module front and module sides which define a module cavity, wherein each of the module sides include a side channel guide for interacting with the first and second module channels to support the module, wherein the module includes at least one module power connector configured to conductively associate with the input power connector when the at least one module is located within the enclosure cavity and wherein the module top and module bottom are at least partially open to allow airflow through the module cavity.

2. The modular power control system of claim 1, wherein the at least one module power connector includes a module Phase A connector, a module Phase B connector and a module Phase C connector.

3. The modular power control system of claim 2, wherein each of the module Phase A connector, module Phase B connector and module Phase C connector defines a connector slot for interacting with the input power connector.

4. The modular power control system of claim 2, wherein the input power connector includes a Phase A bus bar, a Phase B bus bar and a Phase C bus bar, wherein the Phase A bus bar, Phase B bus bar and Phase C bus bar are proximate to and extend away from the enclosure rear.

5. The modular power control system of claim 4, wherein the module Phase A connector, module Phase B connector and module Phase C connector each define a connector slot and wherein when the at least one module is located within the enclosure cavity, the Phase A bus bar is located within the connector slot of the module Phase A connector, the Phase B bus bar is located within the connector slot of the module Phase B connector and the Phase C bus bar is located within the connector slot of the module Phase C connector.

6. The modular power control system of claim 1, wherein the enclosure top includes at least one opening configured to receive input power for distribution to the input power connector.

7. The modular power control system of claim 1, wherein the at least one module includes a plurality of modules located within the enclosure cavity such that one of the plurality of modules is located either directly below or directly above another of the plurality of modules.

8. The modular power control system of claim 7, wherein the enclosure top includes a top vent opening and the enclosure bottom includes a bottom vent opening, wherein the plurality of modules are located within the enclosure cavity to be below the top vent opening and above the bottom vent opening.

9. The modular power control system of claim 8, further including at least one fan located within the enclosure cavity to be above the plurality of modules and below the top vent opening, such that when operated an airflow is created from the bottom vent opening through the plurality of modules to the top vent opening.

10. The modular power control system of claim 1, further comprising at least one of a neutral connection and a ground connection located proximate to the enclosure rear.

11. A modular power control system, comprising:
- an enclosure having an enclosure rear and defining an enclosure cavity,
- an input power Phase A bus bar,
- an input power Phase B bus bar,
- an input power Phase C bus bar;
- a first module support and a second module support located within the enclosure cavity and connected to the enclosure, wherein the first module support includes a first module channel and the second module support includes a second module channel; and
- at least one module, wherein the at least one module includes a module top, a module bottom, a module rear, a module front and module sides, wherein each of the module sides include a side channel guide configured to slidingly interacting with the first and second module channels to support the module within the enclosure cavity and wherein the module rear includes a module power Phase A connector configured to conductively mate with the input power Phase A bus bar, a module power Phase B connector configured to conductively mate with the input power Phase B bus bar and a module power Phase C connector configured to conductively mate with the input power Phase C bus bar when the module is contained within the enclosure cavity and wherein the module top and module bottom are at least partially open to allow air to flow through the module.

12. The modular power control system of claim 11, wherein the module power Phase A connector defines a connector slot configured to interact with the input power Phase A bus bar, the module power Phase B connector defines a connector slot configured to interact with the input power Phase B bus bar and the module power Phase C connector defines a connector slot configured to interact with the input power Phase C bus bar.

13. The modular power control system of claim 12, wherein when the at least one module is located within the enclosure cavity, the Phase A bus bar is located within the connector slot of the module Phase A connector, the Phase B bus bar is located within the connector slot of the module Phase B connector and the Phase C bus bar is located within the connector slot of the module Phase C connector.

14. The modular power control system of claim 11, wherein the input power Phase A bus bar, input power Phase B bus bar and input power Phase C bus bar are located proximate to and extend away from the enclosure rear.

15. The modular power control system of claim 11, wherein the enclosure includes an enclosure top and an enclosure bottom, wherein the enclosure top includes at least one opening configured to receive input power for distribution to at least one of the input power Phase A bus bar, input power Phase B bus bar and input power Phase C bus bar.

16. The modular power control system of claim 11, wherein the at least one module includes a plurality of modules located within the enclosure cavity such that one of the plurality of modules is located either directly below or directly above another of the plurality of modules.

17. The modular power control system of claim 11, wherein the enclosure includes an enclosure top and an enclosure bottom, wherein the enclosure top includes a top vent opening and the enclosure bottom includes a bottom vent opening, wherein the at least one module is located within the enclosure cavity to be below the top vent opening and above the bottom vent opening.

18. The modular power control system of claim 15, further comprising at least one fan located within the enclosure cavity to be above the at least one module and below the top vent opening, such that when operated an airflow is created from the bottom vent opening through the at least one module to the top vent opening.

19. The modular power control system of claim 11, further comprising at least one of a neutral connection and a ground connection located proximate to the enclosure rear.

* * * * *